(12) United States Patent
Sasaki et al.

(10) Patent No.: US 7,392,578 B2
(45) Date of Patent: Jul. 1, 2008

(54) THIN FILM MAGNETIC HEAD AND MANUFACTURING METHOD THEREOF

(75) Inventors: Yoshitaka Sasaki, Milpitas, CA (US); Takehiro Kamigama, Kwai Chung (HK)

(73) Assignees: Headway Technologies, Inc., Milpitas, CA (US); SAE Magnetics (H.K.) Ltd., Shatin, N.T. (HK)

( * ) Notice: Subject to any disclaimer, the term of this patent is extended or adjusted under 35 U.S.C. 154(b) by 0 days.

(21) Appl. No.: 11/748,919

(22) Filed: May 15, 2007

(65) Prior Publication Data

US 2007/0214635 A1 Sep. 20, 2007

Related U.S. Application Data

(62) Division of application No. 10/782,930, filed on Feb. 23, 2004, now Pat. No. 7,239,479.

(51) Int. Cl.
*G11B 5/127* (2006.01)
(52) U.S. Cl. ............ 29/603.15; 29/603.14; 360/122; 360/125.46
(58) Field of Classification Search . 29/603.07–602.18; 360/125, 126, 122, 125.41, 125.43, 125.45, 360/125.46
See application file for complete search history.

(56) References Cited

U.S. PATENT DOCUMENTS

| | | | |
|---|---|---|---|
| 6,043,959 A | 3/2000 | Crue et al. | |
| 6,259,583 B1 | 7/2001 | Fontana, Jr. et al. | |
| 6,466,401 B1 | 10/2002 | Hong et al. | 360/126 |
| 6,975,486 B2 * | 12/2005 | Chen et al. | 360/126 |
| 7,009,812 B2 * | 3/2006 | Hsu et al. | 360/126 |
| 7,060,207 B2 | 6/2006 | Sasaki et al. | 360/126 |
| 7,062,839 B2 * | 6/2006 | Sasaki et al. | 29/603.15 |

* cited by examiner

*Primary Examiner*—William J. Klimowicz
(74) *Attorney, Agent, or Firm*—Oblon, Spivak, McClelland, Maier & Neustadt, P.C.

(57) ABSTRACT

A method for manufacturing a thin film magnetic head with a write element, the write element having a first yoke portion and a second yoke portion connected to each other by a back gap portion, a first pole portion and a second pole portion disposed in the medium-facing surface side of the first yoke portion and the second yoke portion respectively, a gap film disposed between the first pole portion and the second pole portion, and a coil surrounding in a spiral form the back gap portion, and the manufacturing method including the steps of forming the coil above the first yoke portion, forming a part which the first pole portion is composed of so that the part extends to cover the upper surface of the coil, forming the gap film on the first pole portion, forming the second yoke portion, which includes the second pole portion, above the gap film, and trimming the first pole portion so as to have a width fitting the second pole portion.

7 Claims, 53 Drawing Sheets

THIN FILM MAGNETIC HEAD AND MANUFACTURING METHOD THEREOF

CROSS-REFERENCE TO RELATED APPLICATIONS

This application is a divisional of and claims the benefit of priority under 35 U.S.C. §120 from U.S. Ser. No. 10/782,930, now U.S. Pat. No. 7,239,479, filed Feb. 23, 2004. The entire content of this application is incorporated herein by reference.

BACKGROUND OF THE INVENTION

The present invention relates to a thin film magnetic head, a magnetic recording device using the same and a method for manufacturing the same, and particularly to improvement of a write element provided in a thin film magnetic head.

DESCRIPTION OF THE RELATED ART

In recent years, the improvement in performance of a thin film magnetic head is demanded with the improvement in areal recording density of a hard disk device. A thin film magnetic head is composed of a layered structure of a write element for writing and a read element utilizing a magnetoresistance effect for reading. Particularly, recent GMR heads are close to exceed 150 to 200 (GB/P) in areal recording density. A GMR film is of a multilayer structure having a plurality of layers combined with one another. There are some kinds of mechanisms for generating GMR, and the layered structure of a GMR film varies according to the mechanism. As a GMR film for mass production, there are known a spin valve film (hereinafter, referred to as an SV film) and a ferromagnetic tunnel junction film (hereinafter, referred to as a TMR film).

On the other hand, with the improvement in performance of a read element, the improvement in performance of a write element also is demanded. In order to improve a write element in recording density, it is necessary to achieve a narrow track structure, which provides an increased track density. As a means for achieving a narrow track structure, there is known a technique of applying a submicron process onto an upper pole by a semiconductor process technology. However, if the track width is reduced by a semiconductor process technology, difficulty in obtaining a sufficient write magnetic flux arises. To compensate for this disadvantage, a high saturation magnetic flux material (hereinafter, referred to as a HiBs material) is usually used for a narrow track pole.

And in case of a thin film magnetic head for a notebook-sized personal computer, a desktop personal computer, or a high frequency type computer often used as a server or a workstation, excellent high-frequency response characteristic is required. And in a recent hard disk drive, greater access speed is required, and in order to meet the requirement for speed, a compact thin-film magnetic head is required.

The high-frequency characteristic can be improved by shortening the yoke length from a back gap to a pole. Combination of shortening the yoke length YL and using a HiBs material for a pole makes it possible to keep high levels in NLTS, an over-write characteristic (hereinafter, referred to as an O/W characteristic) or the like up to a high-frequency band (500 MHz to 1000 MHz).

Various kinds of techniques for shortening the yoke length are conceivable. One technique is to make a coil pitch as narrow as possible. However, this technique has the following problems.

First, if the coil pitch is narrowed, the coil decreases in width and increases in resistance. As a result, the coil generates heat and the heat raises thermal expansion in the periphery of a pole, namely, thermal protrusion of pole. Since the thermal protrusion causes the possibility of collision between a magnetic head and a recording medium, the thermal protrusion hinders the reduction in floating height of a slider indispensable for high-density recording. Therefore, a technique of shortening the yoke length by narrowing the coil pitch has a limit.

Next, with the advance of narrowing the coil pitch, a photolithography process for forming a coil becomes more difficult. The reason is that the narrower the coil pitch is, the worse the reflection in exposure affects a photolithography process for forming the coil. Unless some prevention of the reflection is taken, it is impossible to form an accurate and vertical coil. For example, in cases where a coil of 1.5 µm or more in coil height and 0.3 to 0.5 µm in coil pitch is formed by means of an existing photolithography technique, the yield rate remarkably lowers.

Another technique for shortening the yoke length YL is to reduce the number of coil turns. In this case, the resistance of coil can be reduced by increasing the height of coil. However, since this method reduces the number of coil turns, it cannot provide a sufficient write magnetic flux and causes a defective O/W characteristic. And it is very difficult to make high a coil having a narrow coil pitch and particularly, when the coil is formed by plating and then a seed layer is etched by ion beams, short-circuiting between the coil turns occurs frequently.

Generally, a write element of a thin film magnetic head is designed so that the minimum coil width of the coil closest to the air bearing surface (hereinafter, referred to as ABS) determines the yoke length YL. Since the total length of this minimum coil width determines a coil resistance of 60 to 70% or more of the total coil resistance, it is necessary to make the total length of the minimum coil width as short as possible in order to shortening the yoke length YL. If a coil with wide coilturns is used to reduce the coil resistance, the yoke length YL cannot be shortened and such a write element has an inferior high-frequency characteristic, and inferior NLTS and O/W characteristic in a high frequency range, which causes the reduction in yield rate.

A conceivable structure for increasing the coil sectional area (increasing the coil height) to increase the number of coilturns and decrease the coil resistance as keeping the yoke length YL short, is a structure in which coils are stacked in the layered form such as two layers or three layers. However, such a layered structure increases the distance between a write gap film and a GMR sensor and so, it has difficulty in achieving both a narrow GMR height (reader portion) and a narrow throat (write portion) in case of polishing the ABS in the polishing process for forming the slider. In some angles of polishing the slider, the throat height varies greatly.

As a means for improving the high-frequency characteristic of a thin film magnetic head, various prior arts have been proposed up to now. For example, the specification of U.S. Pat. No. 6,043,959 discloses a technique in which a second yoke (upper yoke) is made flat to reduce the mutual inductance of coils and thus improve the high-frequency characteristic. The specification of U.S. Pat. No. 6,259,583B1 discloses a structure in which high-permeability and low-anisotropy layers and non-magnetic layers are alternately stacked to form a second flat yoke.

The flat pole structures as disclosed in the above-mentioned prior arts are defined by photolithography. In order to enhance the recording density in the flat pole structures, it is necessary to apply a submicron process onto the pole portion through a semiconductor processing technique and achieve a narrow-track structure. However, in the submicron process there are the problems described above. The above-mentioned prior arts do not disclose a means for solving those problems.

As another conceivable technique for shortening the yoke length YL, there is a technique of narrowing the width of the lower pole disposed in the ABS side of the coil (the distance from the ABS to the coil), other than the above-mentioned technique of increasing the coil sectional area. Generally, the yoke length YL relates to the distance from the back gap to the ABS. Accordingly, narrowing the width of the lower pole, namely, the distance from the ABS to the coil is effective for shortening the yoke length, while narrowing the coil pitch is also effective for that.

However, in case where the width of the lower pole is narrowed (for example, into 0.8 to 1.0 µm and the throat height is also shortened into 0.8 to 1.0 µm), the lower pole is trimmed with a great depth. For example, the lower pole is trimmed with a depth of 0.35 to 0.4 µm and a track width of not greater than 0.2 µ. As a result, the trimmed portion of the lower pole is made narrow and deep, which causes degradation in O/W characteristics relating to the trimming depth. In actual fact, it is necessary to etch the gap portion and the lower pole in the vicinity of the track pole by ion milling and make the lower pole into a great depth of 0.3 to 0.4 µm in order to prevent increase in effective writing track width.

A thin film magnetic head with a track width of 0.1 to 0.2 µm is demanded for a hard disk with a recording density of 100 GB/Platter or 200 GB/Platter per disk. However, the narrowed track width of the head might cause a side-write problem in that magnetic records are given to a track adjacent to the appropriate track, a side-erase problem in that magnetic records on a track adjacent to or 2 or 3 tracks away from the appropriate track are erased, or the like. Specifically in the adjacent track erase (ATE), a phenomenon frequently occurs in that magnetic fluxes at the gap portion on the ABS spread to a greater wide than the track width, and a defect frequently occurs in that magnetic fluxes leak out of the little-depth portion of the lower pole trimmed with a little depth, and the phenomenon and defect are the main factors decreasing yield rates of most hard disks. As a technique for improving the ATE, there have been a conventional technique of trimming with a great depth. However, trimming with a great depth causes another defect, namely the degradation in O/W characteristics as described above.

The conventional thin film magnetic heads, which are fabricated in this way, have many problems especially in its recording heads, and the problems have inhibited improvements in recording head characteristics many times.

An object of the present invention is to provide a thin film magnetic head, a method for manufacturing the head and a magnetic recording device of a high frequency type with a shortened yoke length and improved high-frequency characteristics.

Another object of the present invention is to provide a thin film magnetic head, a method for manufacturing the head and a magnetic recording device of a high areal recording density type in which sufficient O/W characteristics are assured even if the lower pole portion is trimmed with a great depth in order to shorten the width of the lower pole portion in the front of the coil and prevent resultant increase in writing track width.

A further object of the present invention is to provide a thin film magnetic head, a method for manufacturing the head and a magnetic recording device of a high areal recording density type in which attacks on the coil are prevented even if the lower pole portion is trimmed with a great depth in order to shorten the width of the lower pole portion in the front of the coil and prevent resultant increase in writing track width.

DESCRIPTION OF THE RELATED ART

In order to achieve the above-mentioned objects, the present invention relates to a thin film magnetic head with a write element, the write element comprising a first yoke portion, a second yoke portion, a first pole portion (lower pole portion), a second pole portion (upper pole portion), a gap film, a back gap portion and a coil. The first yoke portion is connected to the second yoke portion by the back gap portion in the opposite side in relation to the medium-facing surface side. The first pole portion and the second pole portion are disposed in the medium-facing surface side of the first yoke portion and the second yoke portion respectively. The first pole portion includes a trimmed portion in such a position that the trimmed portion faces the second pole portion in the medium-facing surface side, and the trimmed portion has a reduced width to fit the second pole portion. The second pole portion has a reduced width in the medium-facing surface side. The gap film is disposed between the first pole portion and the second pole portion. The coil surrounds in a spiral form the back gap portion. The first pole portion includes an extending portion that extends so as to cover one surface of the coil facing the second pole portion.

According to the above-mentioned structure, there is no exposure of the coil even if the trimming mask recedes in the process of trimming the first pole portion. Consequently, it is possible to prevent attacks on the coil. In the rear of the trimmed portion of the first pole portion, there is the portion extending so as to cover one surface of the coil facing the second pole portion, and the extending portion functions as a large magnetic volume region. Consequently, excellent over-write characteristics is obtained.

Preferably, the first pole portion comprises a first pole piece, a second pole piece and a third pole piece. The first pole piece is formed of an end of a first magnetic film supporting the coil. The second pole piece has one surface adjacent to the first pole piece. The third pole piece has one surface adjacent to the other surface of the second pole piece. The second pole piece is disposed on the medium-facing surface side of the coil. The third pole piece includes an extending portion that extends so as to cover said other surface of the second pole piece and said one surface of the coil facing the second pole portion.

According to this structure, the third pole piece functions as the region which prevents attacks on the coil and provides a large magnetic volume even after the trimming process.

Preferably, the first pole portion further comprises a fourth pole piece having one surface adjacent to the other surface of the third pole piece. Extending portions that extend so as to cover one surface of the coil facing the second pole portion are at all levels in the height of the third pole piece and at some levels in the height of the fourth pole piece.

According to this structure, the prevention of the attacks on the coil and the improvement in over-write characteristics are achieved by the third pole piece and the fourth pole piece.

Preferably, the first pole portion further comprises a fourth pole piece having one surface adjacent to the other surface of the third pole piece. The extending portion that extends so as to cover one surface of the coil facing the second pole portion is at all levels in the height of the third pole piece.

According to this structure, the prevention of the attacks on the coil and the improvement in over-write characteristics are achieved by the third pole piece, and the form of the fourth pole piece, which determines the throat height, is simplified.

Preferably, the extending portion that extends so as to cover one surface of the coil facing the second pole portion is at some levels in the height of the third pole piece.

According to this structure, the prevention of the attacks on the coil and the improvement in over-write characteristics are achieved by the third pole piece.

Preferably, the trimmed portion has a trimming depth that reaches the extending portion of the third pole piece.

According to this structure, the prevention of the attacks on the coil and the improvement in over-write characteristics are achieved even in the case of trimming with a great depth.

Preferably, the trimmed portion has a trimming bottom surface on the fourth pole piece.

Preferably, the coil comprises a first coil and a second coil. The first and second coils surround in a spiral form the back gap portion, and one of the first and second coils is fitted into the space between coil turns of the other, insulated from the coil turns of the other by an insulating film, and the first and second coils are connected to each other so as to generate magnetic flux in the same direction.

In order to achieve the above-mentioned objects, in a method for manufacturing a thin film magnetic head, which relates to the present invention, a write element of the thin film magnetic head comprises a first yoke portion, a second yoke portion, a first pole portion, a second pole portion, a gap film and a coil. The first yoke portion and the second yoke portion are connected to each other by a back gap portion. The first pole portion and the second pole portion are disposed in the medium-facing surface side of the first yoke portion and the second yoke portion respectively. The gap film is disposed between the first pole portion and the second pole portion. The coil surrounds in a spiral form the back gap portion.

In the manufacturing method, the coil is formed above the first yoke portion, and a part which the first pole portion is composed of is formed so that said part extends to cover the upper surface of the coil, and the gap film is formed on the first pole portion, and the second yoke portion, which includes the second pole portion, is formed above the gap film, and the first pole portion is trimmed so as to have a width fitting the second pole portion.

According to the above-mentioned method, there is no exposure of the coil even if the trimming mask recedes in the process of trimming the first pole portion. Consequently, it is possible to prevent attacks on the coil. In the rear of the trimmed portion of the first pole portion, there is the portion extending so as to cover one surface of the coil facing the second pole portion, and the extending portion functions as a large magnetic volume region. Consequently, excellent over-write characteristics is obtained.

Preferably, the first pole portion is trimmed to have a trimming depth that reaches the extending portion of the material, which extends so as to cover the upper surface of the coil.

According to this structure, the prevention of the attacks on the coil and the improvement in over-write characteristics are achieved even in the case of trimming with a great depth.

Preferably, forming the first pole portion comprises the steps of: forming a first pole piece at an end of a first magnetic film supporting the coil; forming a second pole piece on the medium-facing surface side of the coil after forming the coil; and forming a third pole piece that extends so as to cover the upper surface of the second pole piece and the upper surface of the coil.

According to this method, the third pole piece prevents the attacks on the coil in the process of trimming the first pole piece, and the third pole piece functions as a sufficient magnetic volume region even after the trimming process.

Preferably, forming the first pole portion further comprises the step of forming a fourth pole piece on the upper surface of the third pole piece. And, forming the fourth pole piece comprises the first step of forming the fourth pole piece in a prescribed major length, and the second step of forming a short portion of the fourth pole piece, which has a length less than the major length and determines a throat height.

According to this method, the prevention of the attacks on the coil and the improvement in over-write characteristics are achieved by the third pole piece and the fourth pole piece.

Preferably, forming the first pole portion further comprises the step of forming a fourth pole piece on the upper surface of the third pole piece. The fourth pole piece is formed in a prescribed major length throughout its thickness and the major length is less than the length of the third pole piece, so that the fourth pole piece determines a throat height.

According to this method, the prevention of the attacks on the coil and the improvement in over-write characteristics are achieved by the third pole piece. In addition, the fourth pole piece, which determines the throat height, is formed in a prescribed major length at a time so that simplification in the process of forming the fourth pole piece is achieved.

Preferably, forming the third pole piece comprises the first step of forming the third pole piece in a prescribed major length, and the second step of forming a short portion of the third pole piece, which has a length less than the major length and determines a throat height.

According to this method, the prevention of the attacks on the coil and the improvement in over-write characteristics are achieved by the third pole piece.

Preferably, the manufacturing method further comprises the step of forming an insulating film between the upper surface of the coil and the extending portion of the third pole piece that extends so as to cover the upper surface of the coil, after forming the second pole piece and before forming the third pole piece.

The present invention further discloses a magnetic head device comprising a thin film magnetic head and a head supporting device combined with each other, and a magnetic recording/reproducing apparatus comprising this magnetic head device and a magnetic recording medium (hard disk) combined with each other.

Other objects, structures and advantages of the present invention are described in more detail with reference to the attached drawings. The drawings are only exemplifications.

DESCRIPTION OF THE PREFERRED EMBODIMENTS

1. Thin Film Magnetic Head

Figure 1:
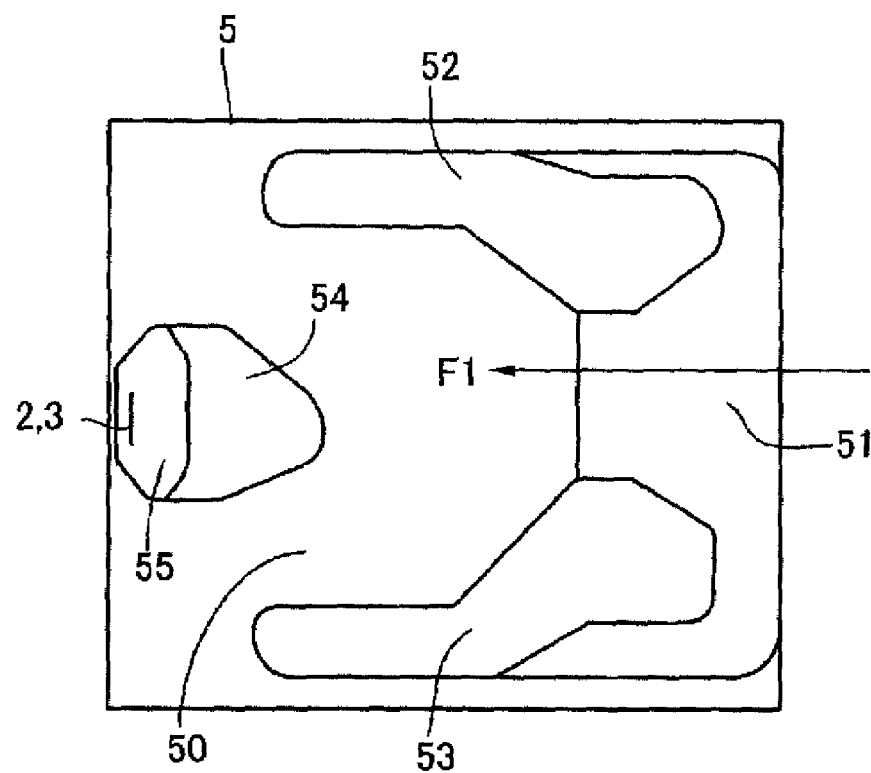
FIG. 1 is a plan view of a thin film magnetic head according to the present invention, seen from the ABS side.
Figure 2:
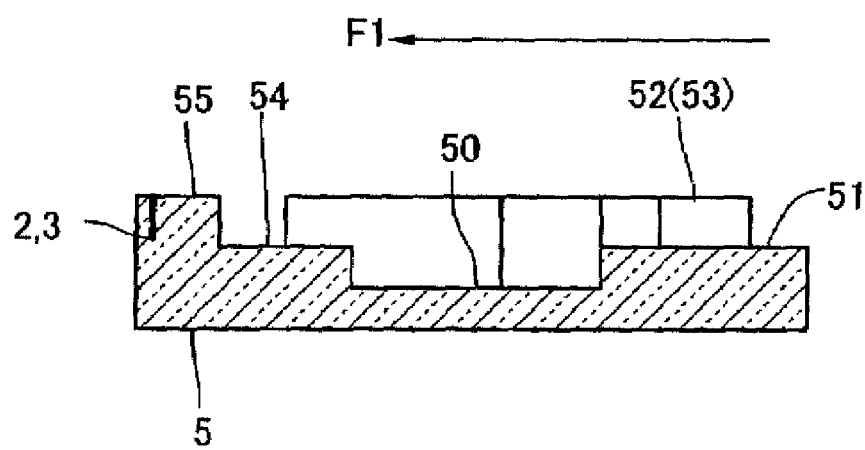
FIG. 2 is a sectional view of the thin film magnetic head shown in FIG. 1.

Referring to FIGS. 1 to 4, a thin film magnetic head according to the present invention comprises a slider 5, a write element 2 and a read element 3. The slider 5 is, for example, a ceramic structure having a base body 15 made of $Al_2O_3$—TiC or the like with an insulating film 16 of $Al_2O_3$, $SiO_2$ or the like provided on the surface thereof (see FIG. 3). The slider 5 has a geometrical shape for controlling a floating characteristic in the surface facing a medium. As a representative example of such a geometrical shape, there is shown an example being provided with a first step part 51, a second step part 52, a third step part 53, a fourth step part 54 and a fifth step part 55 on a base face 50 at the ABS side. The base face 50 becomes a negative pressure generating portion to the air flowing direction shown by the arrow F1, the second step part 52 and the third step part 53 form a step-shaped air bearing rising from the first step part 51. The surfaces of the second step part 52 and the third step part 53 form an ABS. The fourth step part 54 stands up in the shape of a step from the base face 50 and the fifth step part 55 stands up in the shape of a step from the fourth step part 54. Electromagnetic converter elements 2 and 3 are provided in the fifth step part 55.

The electromagnetic converter elements 2 and 3 comprise a write element 2 and a read element 3. The write element 2 and the read element 3 are provided at the air flowing-out end (trailing edge) side when seeing in the air flowing direction F1.

Figure 3:
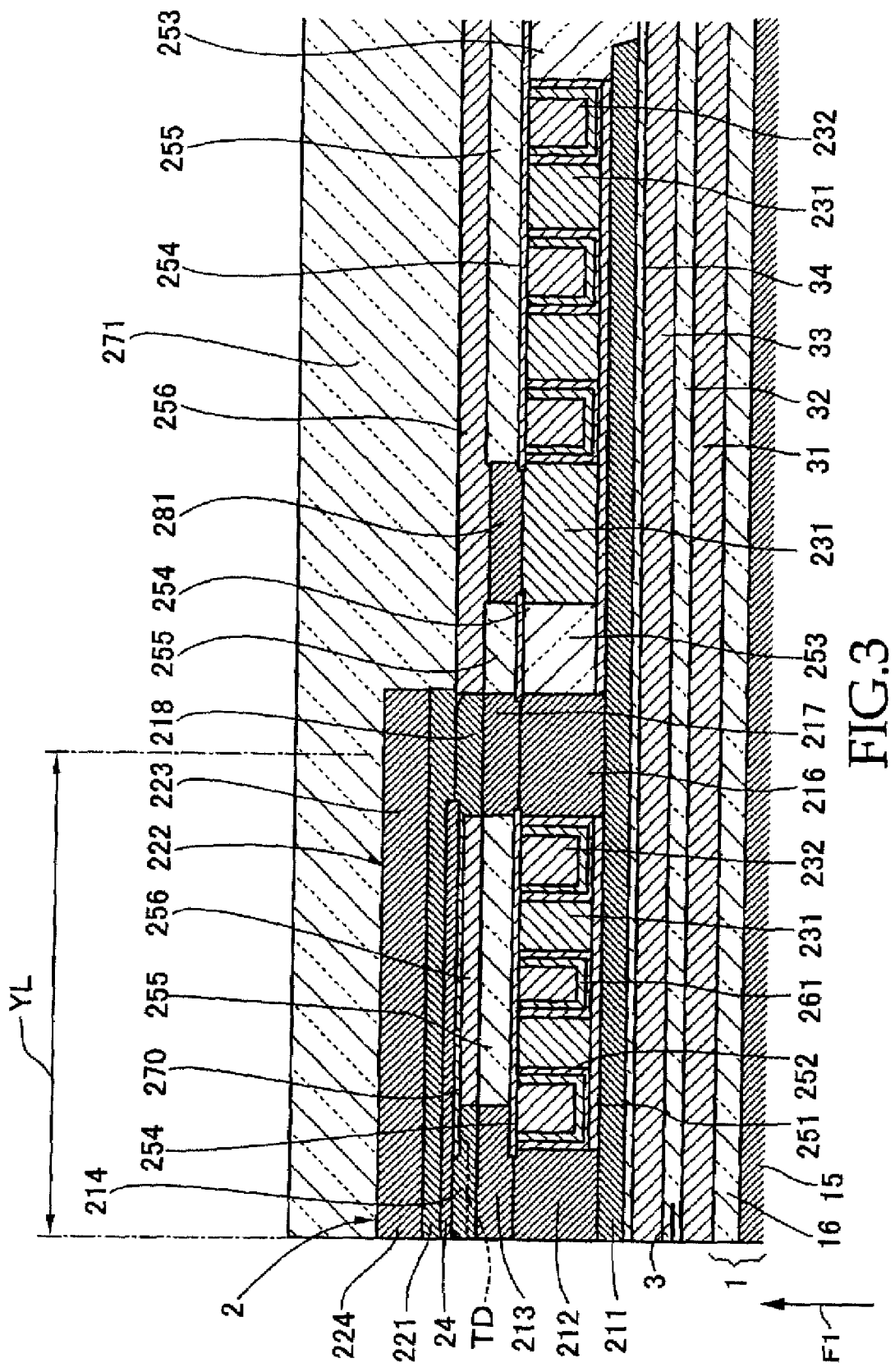
FIG. 3 is a magnified sectional view of an electromagnetic converter portion of embodiment 1 provided in the thin film magnetic head shown in FIGS. 1 and 2.
Figure 4:
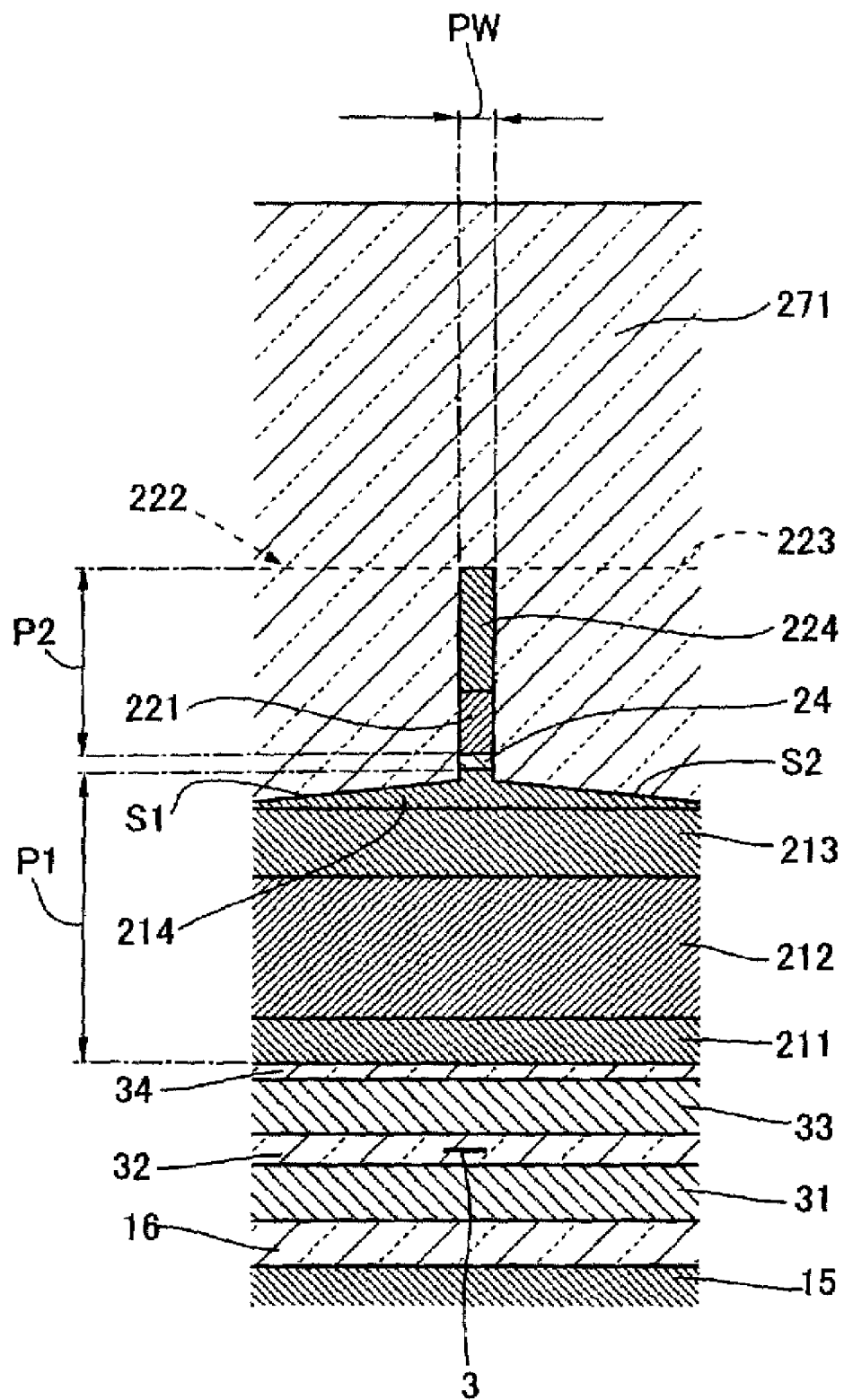
FIG. 4 is a diagram of the electromagnetic converter portion shown in FIG. 3, seen from the ABS side.
Figure 5:
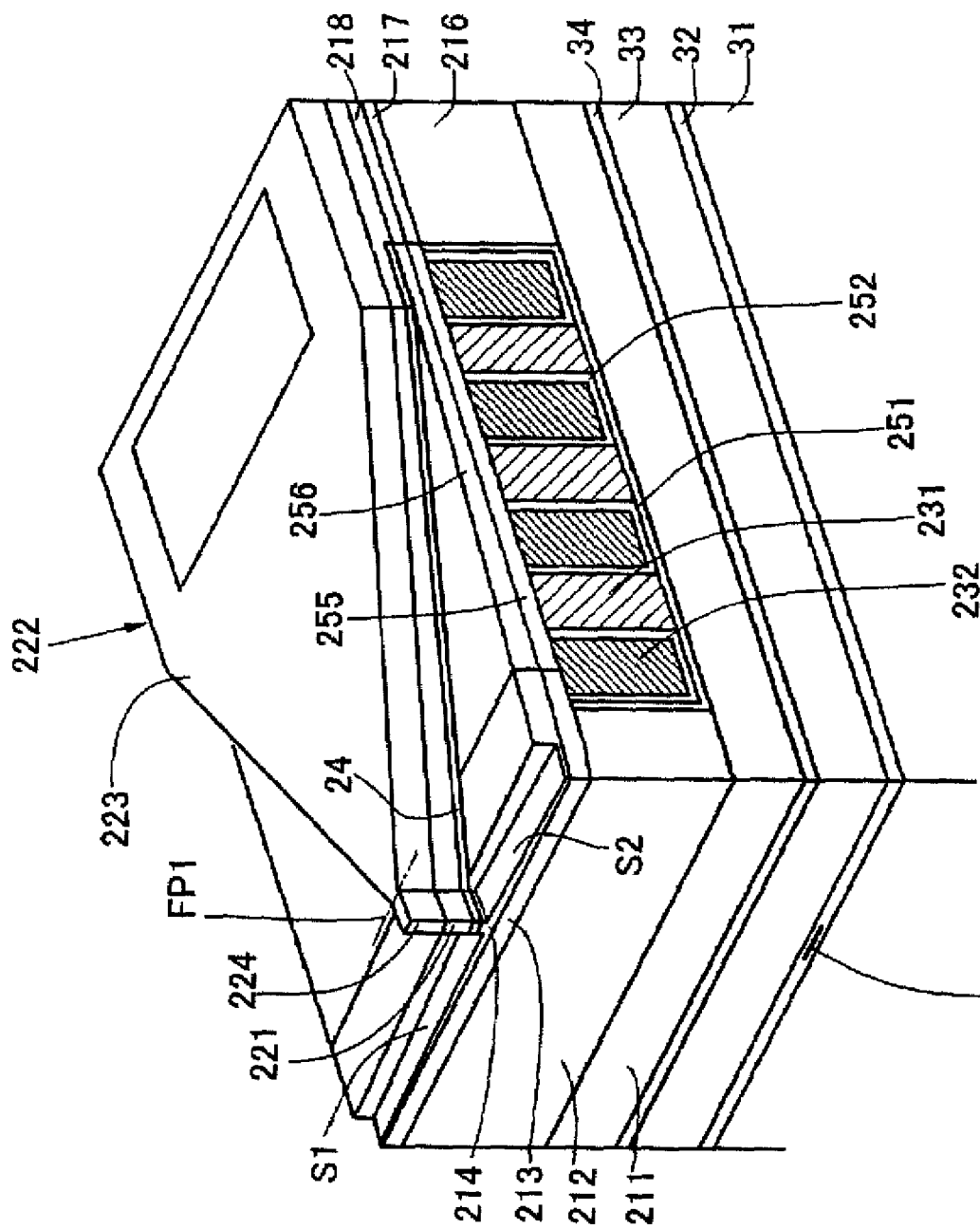
FIG. 5 is a perspective view showing a write element part cut out from the electromagnetic converter portion shown in FIGS. 3 and 4.

Referring to FIGS. 3 and 4, the write element 2 comprises a first yoke portion 211, a second yoke portion (221, 222), a gap film 24 made of alumina or the like, a first pole portion P1, a second pole portion P2, a first coil 231 and a second coil 232. The first yoke portion 211 is formed of a first magnetic film. In the illustrated embodiment, as the first yoke portion 211 is formed of a first magnetic film of one layer, the first yoke portion 211 has the same meaning as the first magnetic film. For simplification, the following description may sometimes represent the first yoke portion 211 as the first magnetic film 211.

The first magnetic film 211 is supported by an insulating film 34 and its surface is made substantially flat. The insulating film 34 is made of an inorganic insulating material such as $Al_2O_3$, $SiO_2$, AlN or DLC.

The second yoke portion (221, 222) faces the first yoke portion 211 with an inner gap between the second yoke portions and the inner gap. In the illustrated embodiment, the second yoke portion (221, 222) has a structure in which a second magnetic film 221 and a third magnetic film 222 are stacked. For simplification of the description, the second yoke portion (221, 222) may be sometimes represented as the second magnetic film 221 and the third magnetic film 222.

The first magnetic film 211, the second magnetic film 221 and the third magnetic film 222 can be made of at least one magnetic material selected from NiFe, CoFe, CoFeN, CoNiFe, FeN, FeZrN and the like. The first magnetic film 211, the second magnetic film 221 and the third magnetic film 222 are formed in thickness within the range of, for example, 0.5 to 4.0 μm. Such first magnetic film 211, second magnetic film 221 and third magnetic film 222 can be formed by a frame-plating method.

In the illustrated embodiment, it is assumed that the first magnetic film 211 is made of CoFeN or CoNiFe. The third magnetic film 222 can be made of CoNiFe, and the second magnetic film 221 can be made of CoFeN being high in saturation magnetic flux density.

The front end portions of the first magnetic film 211, the third magnetic film 222 and the second magnetic film 221 form parts of the first pole portion P1 and the second pole portion P2 opposite each other with a very thin gap film 24, and a write operation is performed in the first pole portion P1 and the second pole portion P2. The gap film 24 is made of a non-magnetic metal film or an inorganic insulating film such as alumina.

In the illustrated embodiment, the first pole portion P1 has a structure in which a second pole piece 212, a third pole piece 213 and a fourth pole piece 214 are deposited in this order on a first pole piece formed of an end portion of the first magnetic film 211. The second pole piece 212, the third pole piece 213 and the fourth pole piece 214 are made of an HiBs material such as CoFeN or CoNiFe.

The second pole portion P2 has a structure in which a fifth pole piece formed of an end portion of the second magnetic film 221 and a sixth pole piece 224 formed of an end portion of the third magnetic film 222 are deposited in this order on the gap film 24.

Referring to FIG. 4, the end portion of the first magnetic film 211, the second pole piece 212 and the third pole piece 213 spread in the track width direction of the ABS. However, the fourth pole piece 214 has the upper end portion narrowed at both sides in the track width direction to produce a narrow track width PW (see FIG. 4), and the gap film 24 deposited thereon, the fifth pole piece formed of the end portion of the second magnetic film 221 and a sixth pole piece 224 formed of the end portion of the third magnetic film 222 have also nearly the same narrow track width PW as the fourth pole piece 214. Consequently, the narrow track width PW for high-density recording is obtained.

The third magnetic film 222 and the second magnetic film 221 extend to the rear side in relation to the ABS 52, 53 (in the direction away from the ABS 52, 53) as keeping an inner gap between the first magnetic film 211 and them, and are connected to the first magnetic film 211 by back gap pieces 216, 217 and 218.

In the illustrated embodiment, the inner gap is filled up with insulating films 254 to 256 and the gap film 24. And, the second yoke portion, which is comprised of the second magnetic film 221 and the third magnetic film 222, is formed on the gap film 24.

The second yoke portion, which is comprised of the second magnetic film 221 and the third magnetic film 222, includes a wide portion 223 and a narrow portion 224. The wide portion 223 has a flat surface and is connected to the first magnetic film 211 by the back gap portion (216 to 218) at the rear side in relation to the ABS 52, 53. Consequently, a write magnetic circuit going through the first magnetic film 211, the back gap portion (216 to 218), the second magnetic film 221, the third magnetic film 222 and a write gap film 24 is formed. The narrow portion 224 forms the second pole portion P2.

The first pole portion P1 includes a trimmed portion. The trimmed portion is formed in which a magnetic film adjacent to the gap film 24, i.e. the fourth pole piece 214 is etched (trimmed) at both sides in the width direction so as to have a narrowed portion with substantially the same width as the second pole portion P2. On bottoms of the indentations, which are formed by etching on the both sides, there is a residual portion (S1, S2) of the fourth pole piece 214. The residual portion (S1, S2) increases in thickness toward the narrowed portion of the fourth pole piece 214. This structure makes it possible to avoid magnetic saturation in the fourth pole piece 214 adjacent to the gap film 24, and consequently improve the over-write characteristic. The residual portion (S1, S2), in the illustrated embodiment, has gently sloping surfaces, but it is not limited to gently sloping surfaces.

The fourth pole piece 214 adjacent to the gap film 24 is made of a magnetic material containing Co and Fe and, more specifically, is made of CoFe or CoFeN. CoFe or CoFeN is an HiBs material of 2 to 2.4 T in saturation magnetic flux density. The fourth pole piece 214 may be formed as a sputtering film of FeN, CoFe or CoFeN. Also, in the second pole portion P2, the second magnetic film 221 adjacent to the gap film 24 is preferably made of the above-mentioned magnetic material.

Consequently, it is possible to achieve a thin film magnetic head having a track width PW of 0.1 to 0.2 μm and suitable for a high areal recording density of 100 Gb/p or more.

In the illustrated embodiment, the coil comprises a first coil 231 and a second coil 232. The first and second coils 231, 232 surround in a spiral form the back gap portion (216 to 218) on a first insulating film 251 formed on the flat surface of the first magnetic film 211, which forms the first yoke portion. One of the first and second coils 231, 232 is fitted into the space between coil turns of the other, insulated from the coil turns of the other by a second insulating film 252. The first and second coils 231, 232 are connected to each other so as to generate magnetic flux in the same direction.

The second insulating film 252 between the first coil 231 and the second coil 232 can be formed as a very thin $Al_2O_3$ film of about 0.1 μm in thickness by applying chemical vapor deposition (hereinafter, referred to as CVD) or the like. Therefore, it is possible to maximize sectional areas of the first and second coils 231, 232 between the back gap portion (216 to 218) and the first pole portion P1, and consequently decrease the resistance of the coils and the quantity of generated heat as keeping the number of coil turns. This makes it possible to suppress occurrence of a thermal protrusion in the pole portions P1 and P2, and consequently avoid a head crash and the damage or destruction of a magnetic record on a magnetic recording medium and meet a demand for a low floating height for a high recording density.

As one of the first and second coils 231, 232 is fitted into the space between coil turns of the other, insulated from the coil turns of the other by the second insulating film 252, a high wiring density of coil conductors is achieved. This makes it possible to shorten the yoke length YL as keeping the same number of coil turns.

The first coil 231 and the second coil 232 are connected to each other so as to generate magnetic flux in the same direction. As the first and second coils 231, 232 are the same in winding direction, it is possible to generate magnetic flux in the same direction by making a series-connection structure in which the inner end of the first coil 231 is connected to the outer end of the second coil 232. Alternatively, magnetic flux may be generated in the same direction by connecting the first coil 231 to the second coil 232 in parallel. The parallel connection offers a reduction in coil resistance though a decrease in the number of coil turns.

In the illustrated embodiment, the upper surfaces of the first coil 231 and the second coil 232 form the same plane. This structure makes it possible to form the common insulating film 254 on the upper surfaces of the first and second coils 231, 232, which offers simplification of an insulating structure on the upper surfaces of the first and second coils 231, 232. And this structure provides a stable base for forming another coil above the first and second coils 231, 232, so said another coil can be formed as a high-accuracy pattern.

In case of providing another coil on the first and second coils 231 and 232, the upper surfaces of the second pole piece 212 and the back gap piece 216 are also made to form the same plane as the upper surfaces of the first and second coils 231 and 232 in addition to flattening the upper surfaces of the first and second coils 231 and 232. By doing so, a pole piece and a back gap piece required for providing another coil can be formed as a high-accuracy pattern on the flattened upper surfaces of the second pole piece 212 and the back gap piece 216.

Next, referring to FIGS. 3 to 6, the first and second coils 231 and 232 surround the back gap portion (216 to 218). The first coil 231 is in a spiral shape and is formed on the surface of the insulating film 251 formed on the flat surface of the first magnetic film 211, and the pattern of the first coil 231 is wound in a flat form around an axis perpendicular to the surface of the insulating film 251. The first coil 231 is made of a conductive metal material such as Cu (copper). The insulating film 251 is made of an inorganic insulating material such as $Al_2O_3$, $SiO_2$, AlN or DLC.

The second coil 232 is also in a spiral shape and is fitted into the space between coil turns of the first coil 231, insulated from the coil turns by the insulating film 252, and the pattern of the second coil 232 is wound in a flat form around the axis. The second coil 232 is also made of a conductive metal material such as Cu (copper). The insulating film 252 is made of an inorganic insulating material such as $Al_2O_3$, $SiO_2$, AlN or DLC.

The periphery of the first coil 231 and the second coil 232 is filled up with an insulating film 253 (see FIG. 3). The insulating film 253 is also made of an inorganic insulating material such as $Al_2O_3$, $SiO_2$, AlN or DLC.

The insulating film 252 between the first coil 231 and the second coil 232 can be formed as a very thin $Al_2O_3$ film of about 0.1 μm in thickness by applying a CVD process or the like. Therefore, it is possible to maximize the first coil 231 and the second coil 232 in sectional area, and consequently decrease the coil resistance and the quantity of generated heat as keeping the number of coil turns. This makes it possible to suppress occurrence of a thermal protrusion in the pole portions P1, P2 during a write operation, and consequently avoid a head crash, damage and destruction of a magnetic record on a magnetic recording medium to meet a demand for a low floating height for a high recording density.

As the second coil 232 is fitted into the space between coil turns of the first coil 231, insulated from the coil turns by the insulating film 252, high wiring density of coil conductors is achieved. This makes it possible to shorten the yoke length YL (see FIG. 3) as keeping the same number of coil turns and so, the high-frequency characteristic is improved.

The first coil 231 and the second coil 232 are connected to each other so as to generate magnetic flux in the same direction. As the first coil 231 and the second coil 232 have the same winding direction, it is possible to generate the magnetic flux in the same direction by making a series-connection structure in which the inner end 281 of the first coil 231 and the outer end 283 of the second coil 232 are connected to each other by a connecting conductor 282. The outer end 286 of the first coil 231 is connected to a terminal 284 by a connecting conductor 285, led outside by a lead conductor 291 and connected to a takeout electrode. The inner end 287 of the second coil 232 is connected to a terminal 289 by a connecting conductor 288, led outside by a lead conductor 292 and connected to a takeout electrode.

Figure 6:
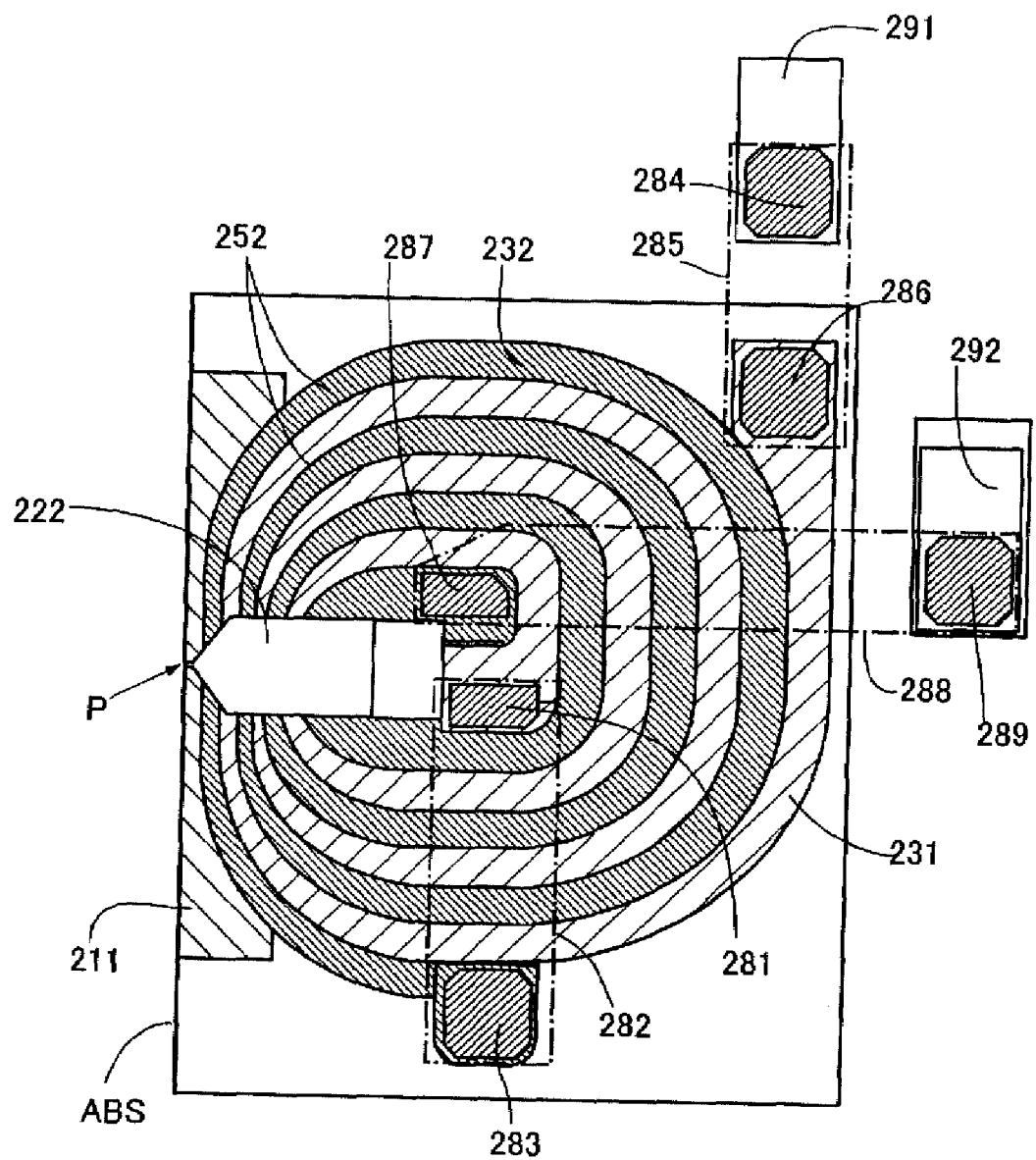
FIG. 6 is a plan view showing a coil structure of the write element part in the electromagnetic converter portion shown in FIGS. 3 to 5.

Unlike the structure shown in FIG. 6, magnetic flux may be generated in the same direction by connecting the first coil 231 and the second coil 232 in parallel with each other. The parallel connection offers a reduction in coil resistance though a decrease in the number of coil turns.

Moreover, the second coil 232 is separated from the second pole piece 212 and the back gap piece 216 by the insulating film 252 which can be formed as a very thin film of about 0.1 μm in thickness by applying CVD or the like. This makes it possible to promote shortening of the yoke length YL.

The upper surfaces of the first coil 231 and the second coil 232 form the same plane. This structure makes it possible to form a common insulating film 254 on the upper surfaces of the first coil 231 and the second coil 232 and so, an insulating structure on the upper surfaces of the first coil 231 and the second coil 232 is simplified. And this structure makes it possible to form a flat and stable base face on the first coil 231 and the second coil 232 and thereafter form a high-accuracy pattern.

In this case, the first coil 231 is a plating film and is formed on an insulating film 251 deposited on one surface of the first magnetic film 211. The second coil 232 is also a plating film and is formed on an insulating film 252 in the space between coil turns of the first coil 231. The insulating film 252 is formed on the bottom face and both side faces of the aforesaid space.

A protective film 257 covers the whole write element 2. The protective film 257 is made of an inorganic material such as Al$_2$O$_3$ or SiO$_2$.

In the vicinity of the read element 3, there are provided a first shield film 31, an insulating film 32 and a second shield film 33. The first shield film 31 and the second shield film 33 are made of NiFe or the like. The first shield film 31 is formed on an insulating film 16 made of Al$_2$O$_3$, SiO$_2$ or the like. The insulating film 16 is formed on the surface of a base body 15 made of Al$_2$O$_3$—TiC or the like.

The read element 3 is provided inside the insulating film 32 between the first shield film 31 and the second shield film 33. The end face of the read element 3 comes out at the ABS 52, 53. The read element 3 comprises a giant magneto-resistance effect element (GMR element). The GMR element can be formed of a spin valve film or a ferromagnetic tunnel junction element.

Figure 7:
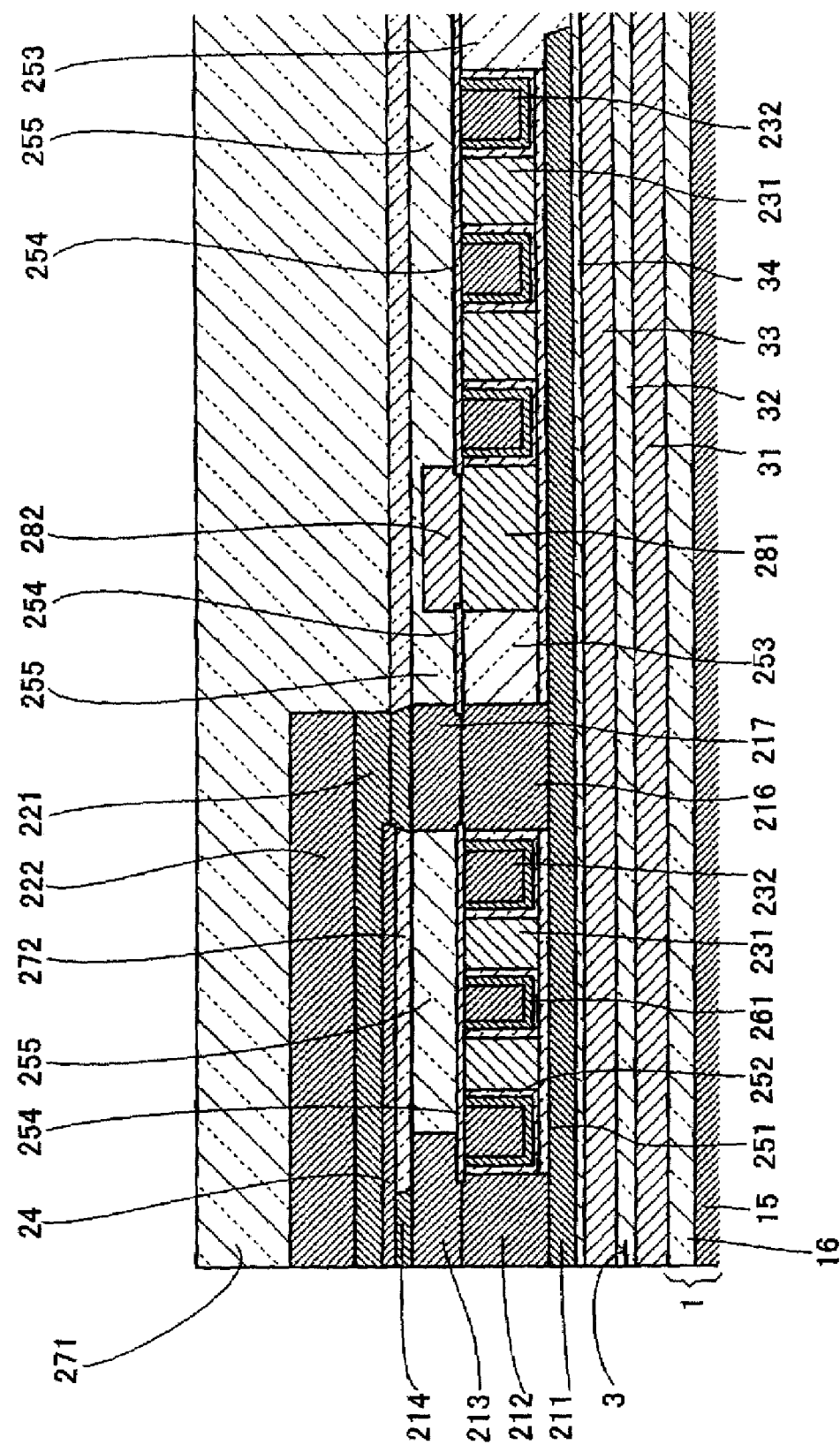
FIG. 7 is a magnified sectional view of an electromagnetic converter portion of embodiment 2 provided in a thin film magnetic head according to the present invention.
Figure 8:
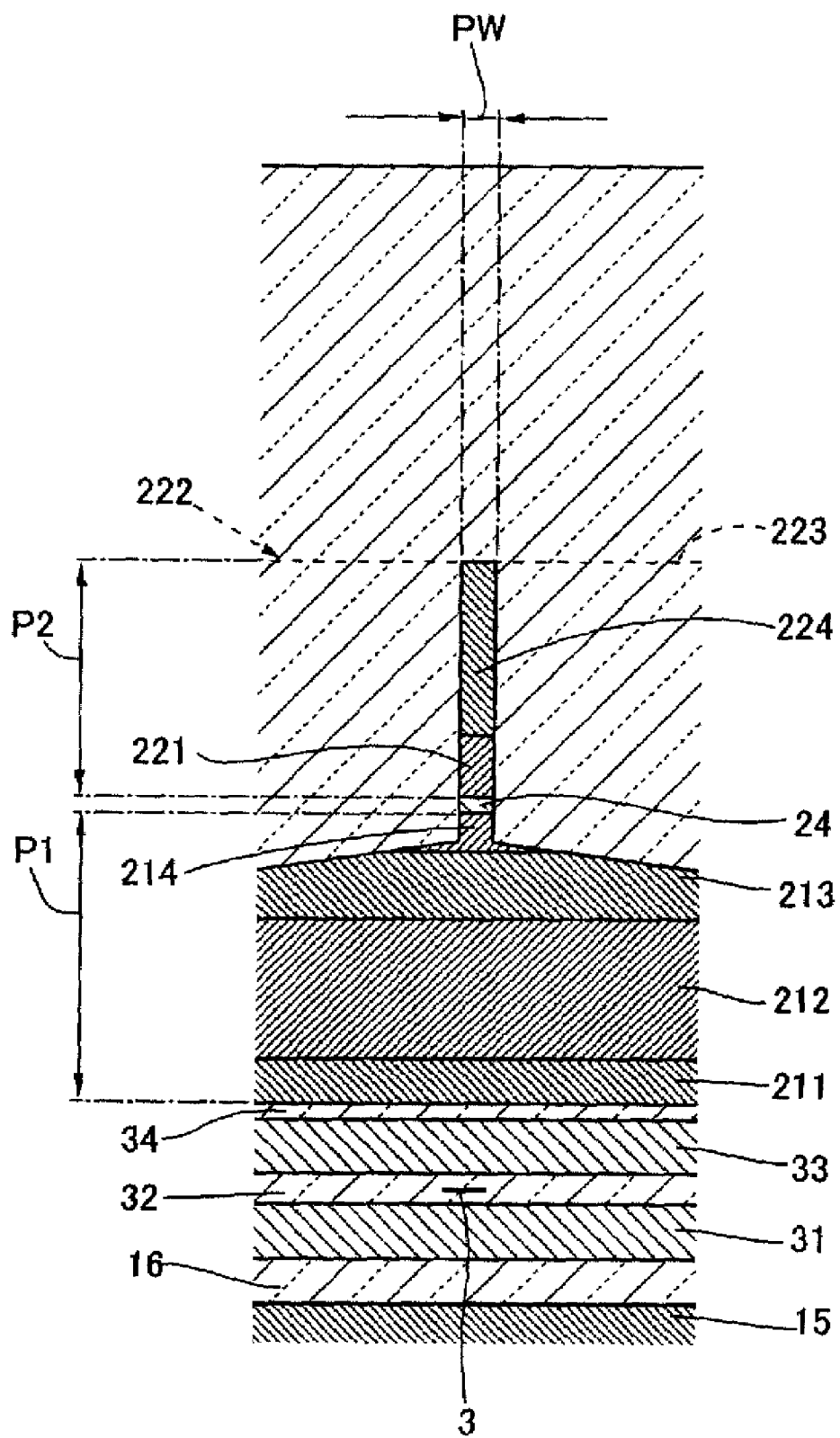
FIG. 8 is a diagram of the electromagnetic converter portion shown in FIG. 7, seen from the ABS side.

Next, another embodiment of a thin film magnetic head according to the present invention is described with reference to FIGS. 7 and 8. In FIGS. 7 and 8, the same components as those shown in FIGS. 1 to 6 are given the same reference symbols. The thin film magnetic head of the illustrated embodiment has the same basic structure as the thin film magnetic head shown in FIGS. 1 to 6.

One of features of the thin film magnetic head shown in FIGS. 7 and 8 over the thin film magnetic head illustrated and described in FIGS. 1 to 6 is that: the fourth pole piece 214 is shorter, throughout its thickness, than the third pole piece 213. Specifically, the rear end of the fourth pole piece 214 terminates so as not to reach the area above the second coil 232. This fourth pole piece 214 is formed at a time only by an etching process with a photoresist mask suitable to be lifted off, and the fourth pole piece 214 does not require two etching process with pattern plating and phtoresist, which are required in that of the thin film magnetic head shown in FIGS. 1 to 6.

Consequently, the thin film magnetic head shown in FIGS. 7 and 8 has the advantage that the process of forming the fourth pole piece 214 is simplified, in addition to the advantages of the thin film magnetic head shown in FIGS. 1 to 6.

Figure 9:
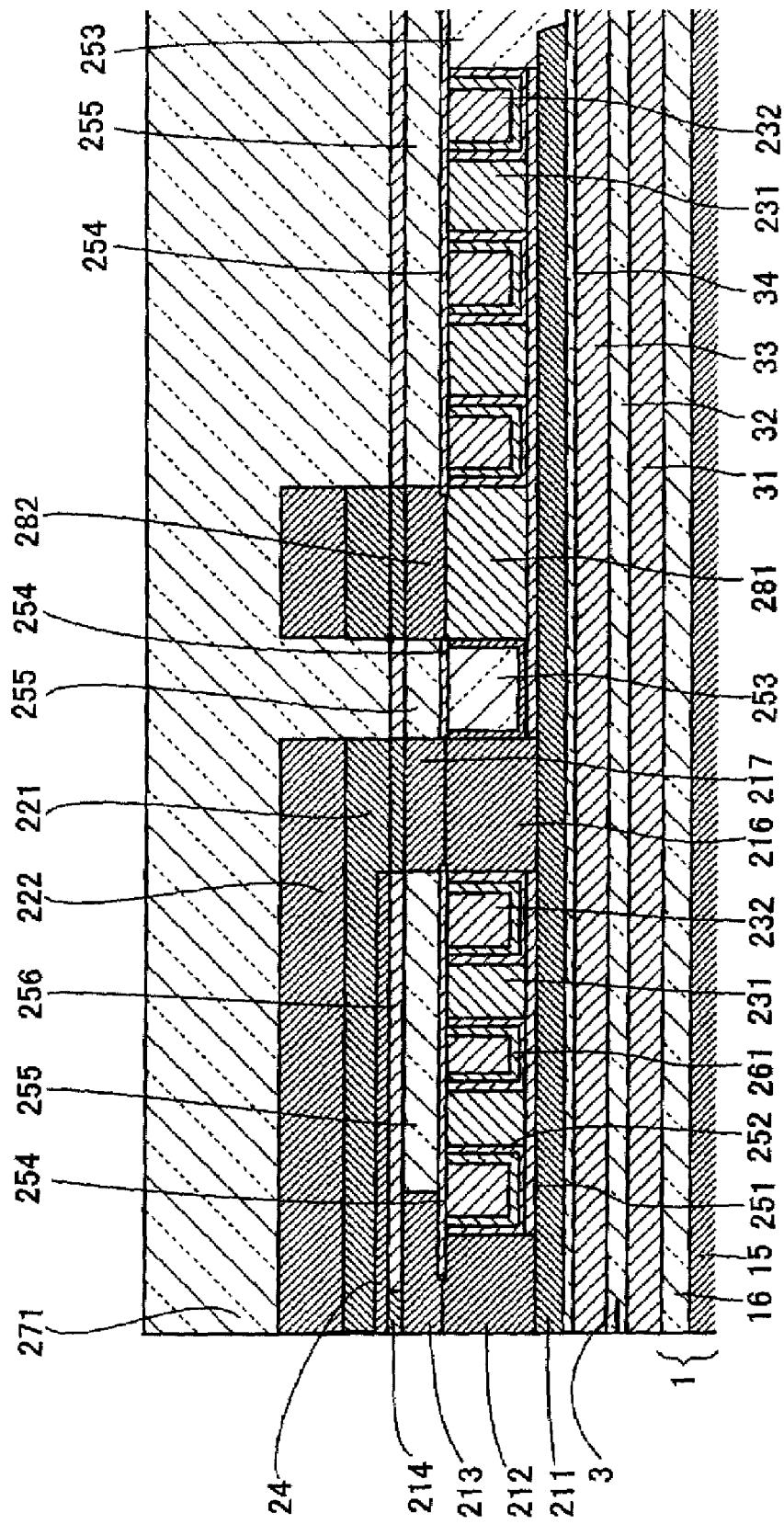
FIG. 9 is a magnified sectional view of an electromagnetic converter portion of embodiment 3 provided in a thin film magnetic head according to the present invention.
Figure 10:
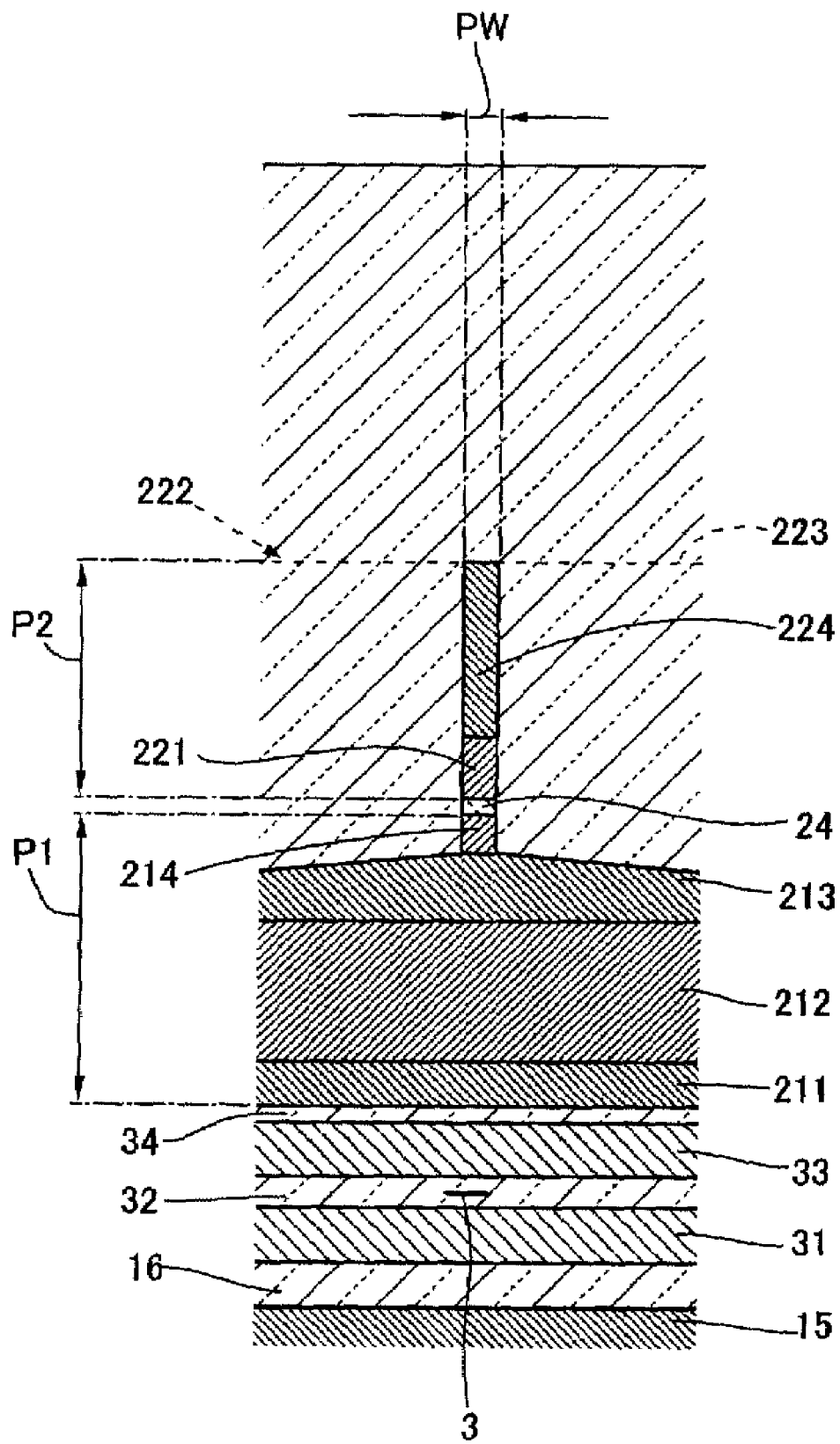
FIG. 10 is a diagram of the electromagnetic converter portion shown in FIG. 9, seen from the ABS side.

Next, yet another embodiment of a thin film magnetic head according to the present invention is described with reference to FIGS. 9 and 10. In FIGS. 9 and 10, the same components as those shown in FIGS. 1 to 6 are given the same reference symbols. The thin film magnetic head of the illustrated embodiment has the same basic structure as the thin film magnetic head shown in FIGS. 1 to 6.

One of features of the thin film magnetic head shown in FIGS. 9 and 10 over the thin film magnetic head illustrated and described in FIGS. 1 to 6 is that: the fourth pole piece 214 is shorter, throughout its thickness, than the third pole piece 213, as in the thin film magnetic head shown in FIGS. 7 and 8. Specifically, the rear end of the fourth pole piece 214 terminates so as not to reach the area above the second coil 232. This fourth pole piece 214 is formed at a time by an etching process with pattern plating, and the fourth pole piece does not require two etching process with pattern plating and phtoresist, which are required in that of the thin film magnetic head shown in FIGS. 1 to 6.

Consequently, the thin film magnetic head shown in FIGS. 9 and 10 also has the advantage that the process of forming the fourth pole piece 214 is simplified, in addition to the advantages of the thin film magnetic head shown in FIGS. 1 to 6.

Figure 11:
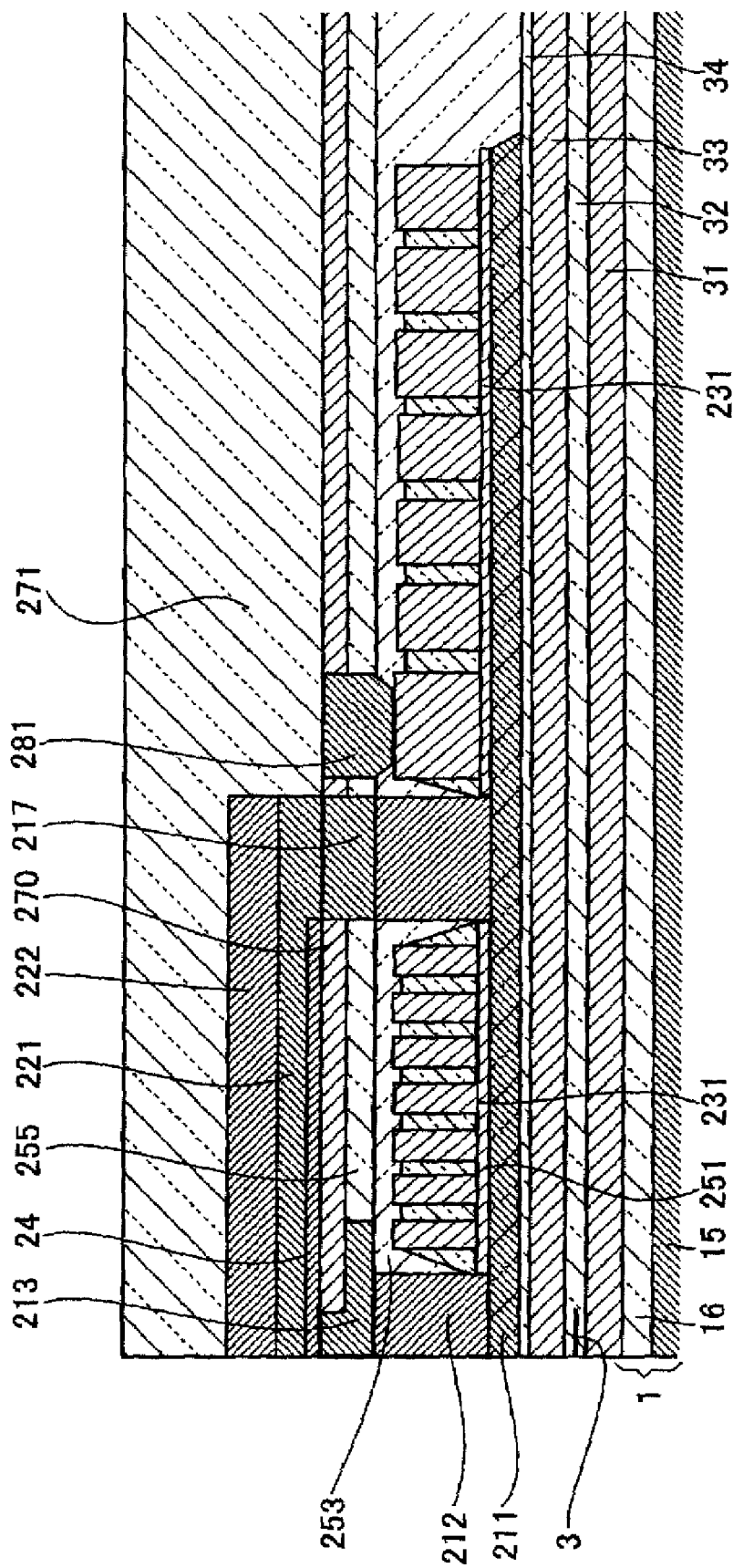
FIG. 11 is a magnified sectional view of an electromagnetic converter portion of embodiment 3 provided in a thin film magnetic head according to the present invention.
Figure 12:
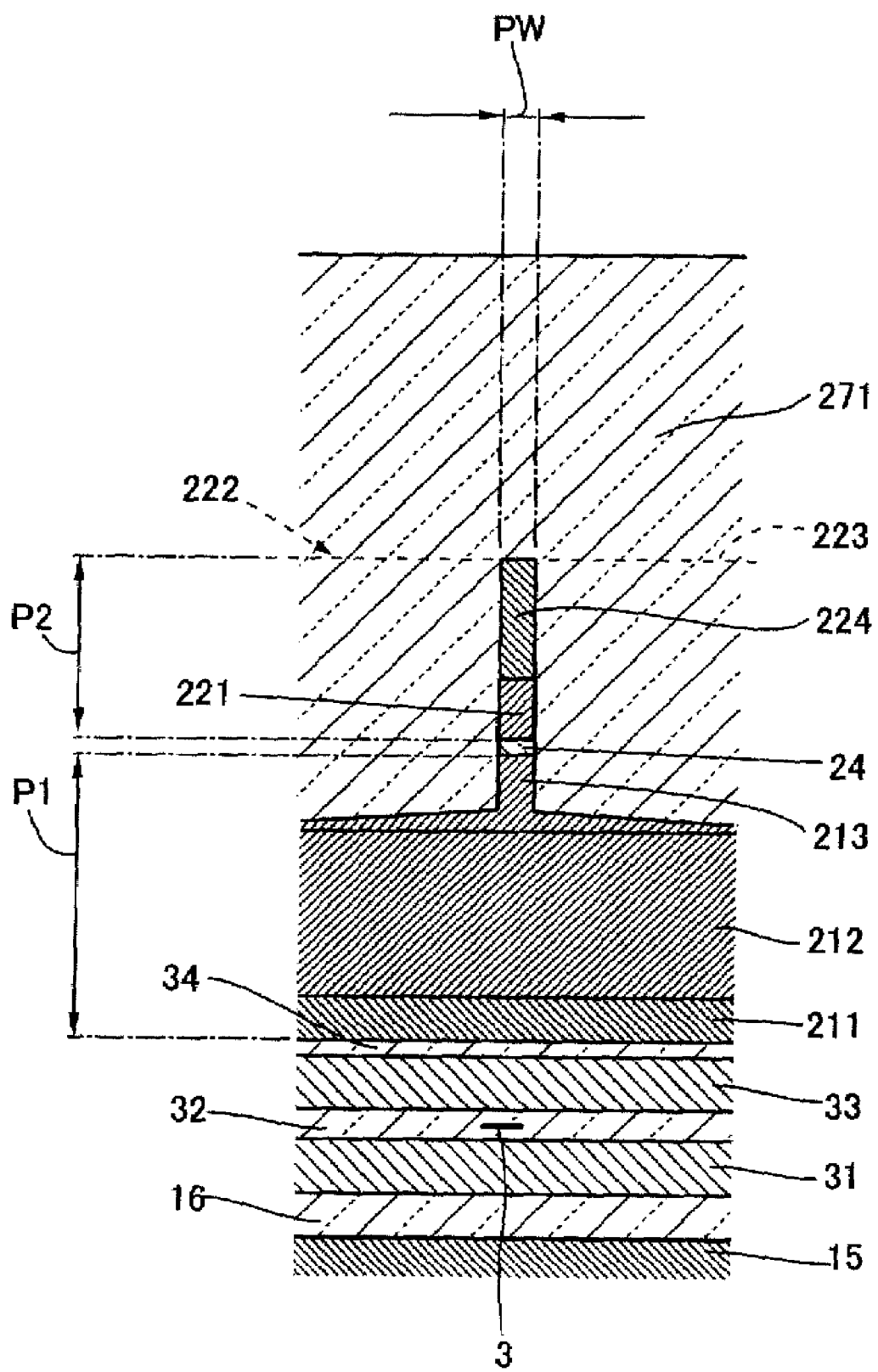
FIG. 12 is a diagram of the electromagnetic converter portion shown in FIG. 11, seen from the ABS side.

Next, yet another embodiment of a thin film magnetic head according to the present invention is described with reference to FIGS. 11 and 12. In FIGS. 11 and 12, the same components as those shown in FIGS. 1 to 6 are given the same reference symbols. The thin film magnetic head of the illustrated embodiment has the same basic structure as the thin film magnetic head shown in FIGS. 1 to 6, except the following features. Specifically, the features of the thin film magnetic head shown in FIGS. 11 and 12 over the thin film magnetic head illustrated and described in FIGS. 1 to 6 are that: the coil consists only of a first coil 231, not including a second coil; and the first pole portion (lower pole portion) P1 does not include a fourth pole piece.

2. Method for Manufacturing a Thin Film Magnetic Head (1) Embodiment 1

Embodiment 1 relating to a manufacturing method is a method for manufacturing a thin film magnetic head of a first aspect having a first coil 231 and a second coil 232 (FIGS. 1 to 6). It is notified in advance that processes illustrated in FIGS. 13 to 29 are performed on a wafer.

Figure 13:
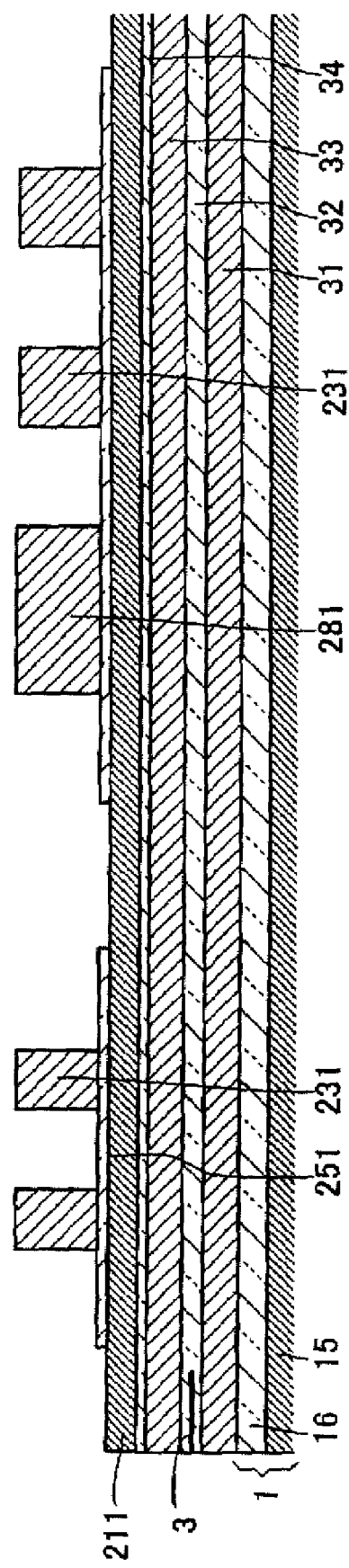
FIG. 13 is a diagram showing a process of manufacturing a thin film magnetic head having the electromagnetic converter portion shown in FIGS. 3 to 6.

<Process Leading to a State of FIG. 13>

Referring to FIG. 13, on an insulating film 16 deposited on a base body 15 there are formed a first shield film 31, a read element 3, an insulating film 32, a second shield film 33, an insulating film 34 and a first magnetic film 211 by means of publicly known processes.

In a specific example, the insulating film 16 is an alumina film, formed, for example, 3 μm in thickness. The first shield film 31 is made of a magnetic material such as NiFe and formed 2 to 3 μm in thickness by a frame-plating method. The insulating film 32 is, in general, formed by the following two steps: in the first step, an alumina film of 3 to 4 μm in thickness is formed, and then the surface of the alumina film is flattened by CMP, and after that an GMR element 3 to be the read element is formed; and in the second step, an alumina film covering the GMR element 3 is formed. The second shield film 33 is made of a magnetic material such as NiFe and formed 1.0 to 1.5 μm in thickness. The insulating film 34 is formed as an alumina film of 0.2 to 0.3 μm in thickness.

The first magnetic film 211 is made of CoNiFe (2.1T) or CoFeN (2.4T) and formed 3.0 to 4.0 μm in thickness. On the first magnetic film 211 end to be the first pole piece, there may be formed a plating film of NiFe (80%:20%) or NiFe (45%:55%), or a sputtering film of FeAlN, FeN, FeCo, CoFeN or FeZrN, which is formed 0.5 to 0.6μin thickness.

After that, an insulating film 251 of, for example, 0.2 μm in thickness is formed on the flat surface of the first magnetic film 211 so as to have an area slightly larger than an area necessary for forming a coil, and then a seed film (not shown) is formed on the insulating film 251. The seed film is formed so as to cover the surface of the insulating film 251 and the surface of the first magnetic film 211. The seed film is made of a material suitable for a Cu-plating ground and formed 50 nm to 80 nm thick by a Cu-CVD process.

Next, a photoresist film is formed on the seed film by applying a spin coating method or the like, and then is exposed through a mask having a coil pattern, and developed. Consequently, a resist frame having a prescribed pattern is formed. The photoresist film may be either positive photoresist or negative photoresist.

Next, a selective Cu-plating process is performed so that a first coil 231 is grown to be 3 to 3.5 μm thick on the seed film inside the coil forming pattern. FIG. 13 shows a state in which the above-mentioned selective Cu-plating process has been performed.

Figure 14:
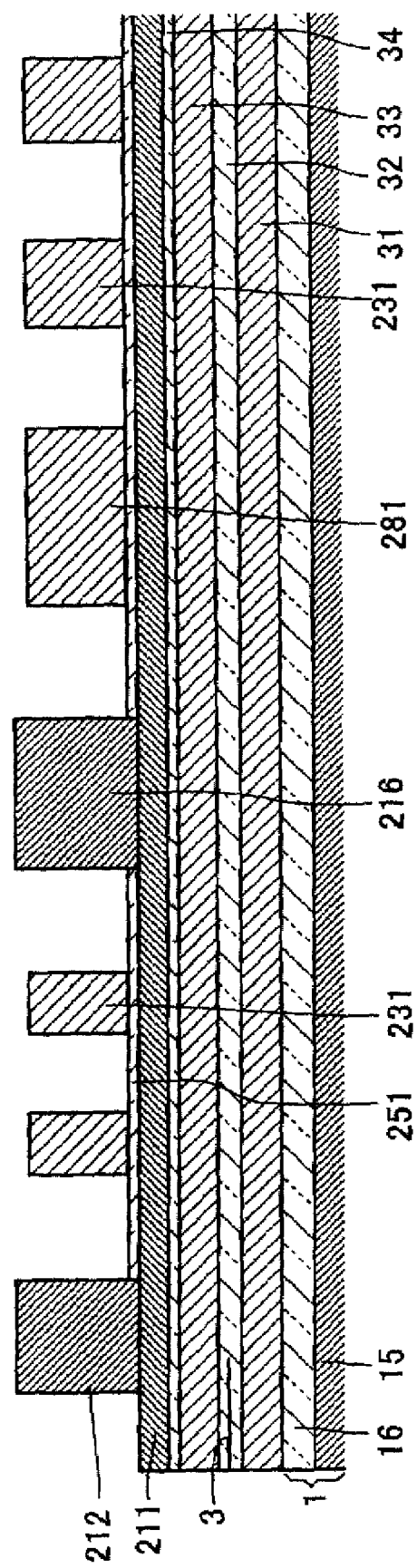
FIG. 14 is a diagram showing a process after the process shown in FIG. 13.

<Process Leading to a State of FIG. 14>

Next, a photolithography process for forming a second pole piece 212 and a back gap piece 216 is performed so that a resist frame for forming the second pole piece 212 and the back gap piece 216 is formed.

Next, a selective plating process is performed so that the second pole piece 212 and the back gap piece 216 are formed on the first magnetic film 211, and then the resist frame is removed by means of chemical etching or the like. Consequently, as shown in FIG. 14, the second pole piece 212 and the back gap piece 216 are formed with a space between them on one surface of the first magnetic film 211. The second pole piece 212 and the back gap piece 216 are made of, for example, CoNiFe (1.9 to 2.1T) and formed 3.5 to 4.0 μm thick.

Figure 15:
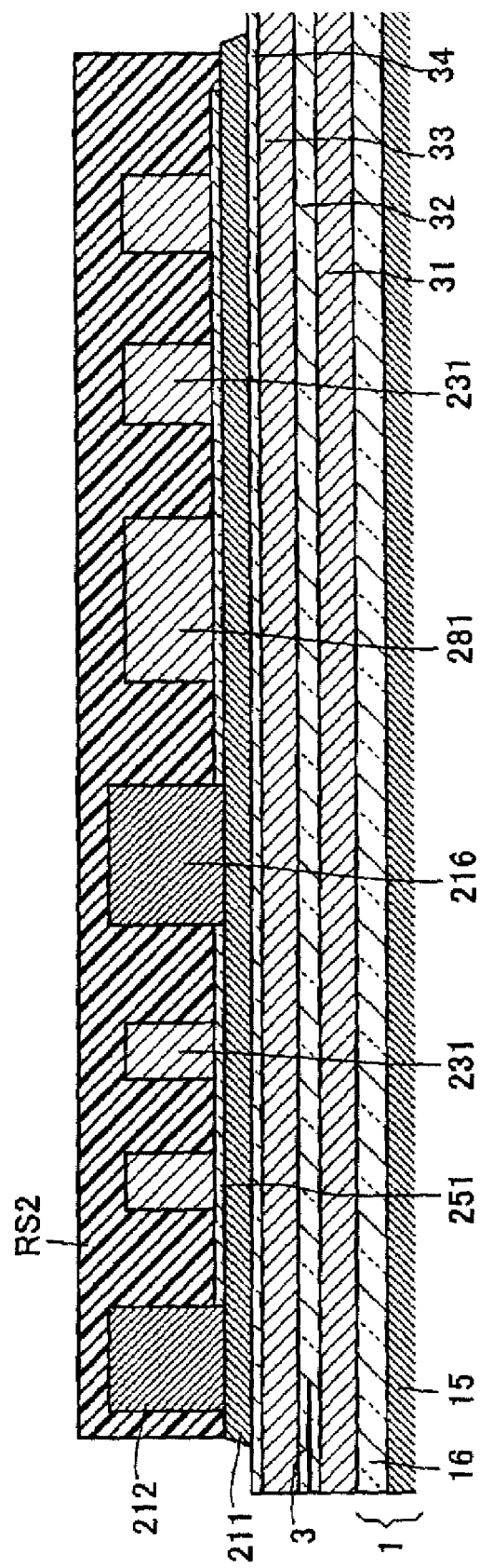
FIG. 15 is a diagram showing a process after the process shown in FIG. 14.

<Process Leading to a State of FIG. 15>

As shown in FIG. 15, a photoresist film RS2 covering the first coil 231, the pole piece 212 and the back gap piece 216 is formed. Then, a dry-etching such as reactive ion etching (hereinafter, referred to as RIE) or ion beam etching (hereinafter, referred to as IBE) is applied onto the first magnetic film 211, using the photoresist film RS2 as a mask, so as to pattern the first magnetic film 211.

Figure 16:
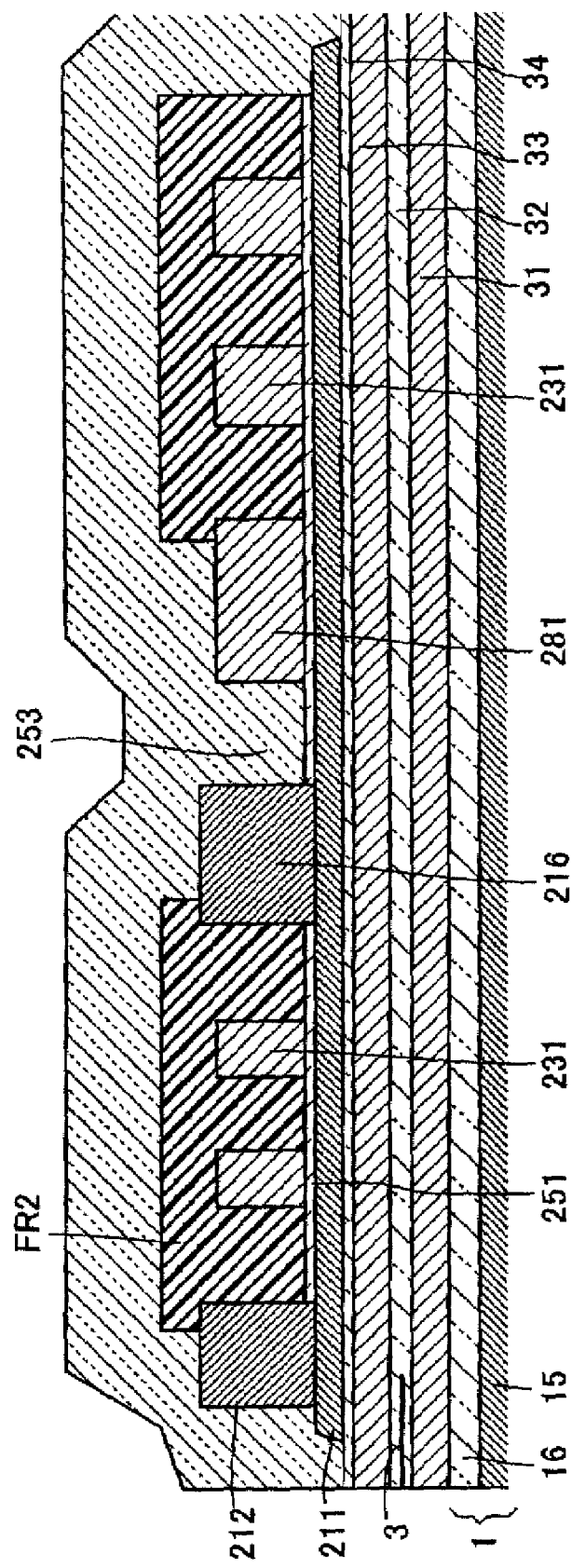
FIG. 16 is a diagram showing a process after the process shown in FIG. 15.

<Process Leading to a State of FIG. 16>

A photolithography process is applied onto the photoresist film RS2 in the state of FIG. 15, so that a resist cover FR2 covering the first coil 231 and the periphery thereof is formed as shown in FIG. 16, and then an insulating film 253 covering the whole resist cover FR2 is deposited thereon. The insulating film 253 is formed 4 to 5 μm in thickness. FIG. 16 shows a state in which the insulating film 253 has been formed.

Figure 17:
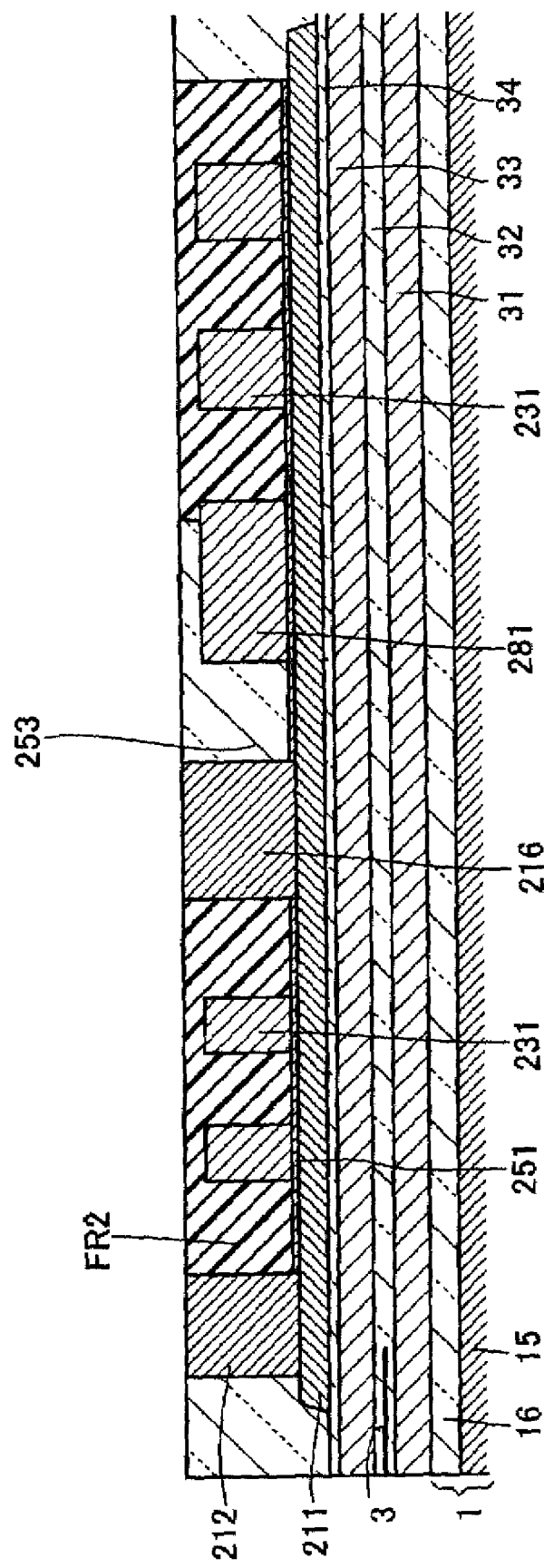
FIG. 17 is a diagram showing a process after the process shown in FIG. 16.

<Process Leading to a State of FIG. 17>

Next, the insulating film 253 and the resist cover FR2 are polished and flattened by chemical mechanical polishing (hereinafter, referred to as CMP). Alumina-based slurry is used in the CMP. FIG. 17 shows a state in which the CMP process has been performed.

Figure 18:
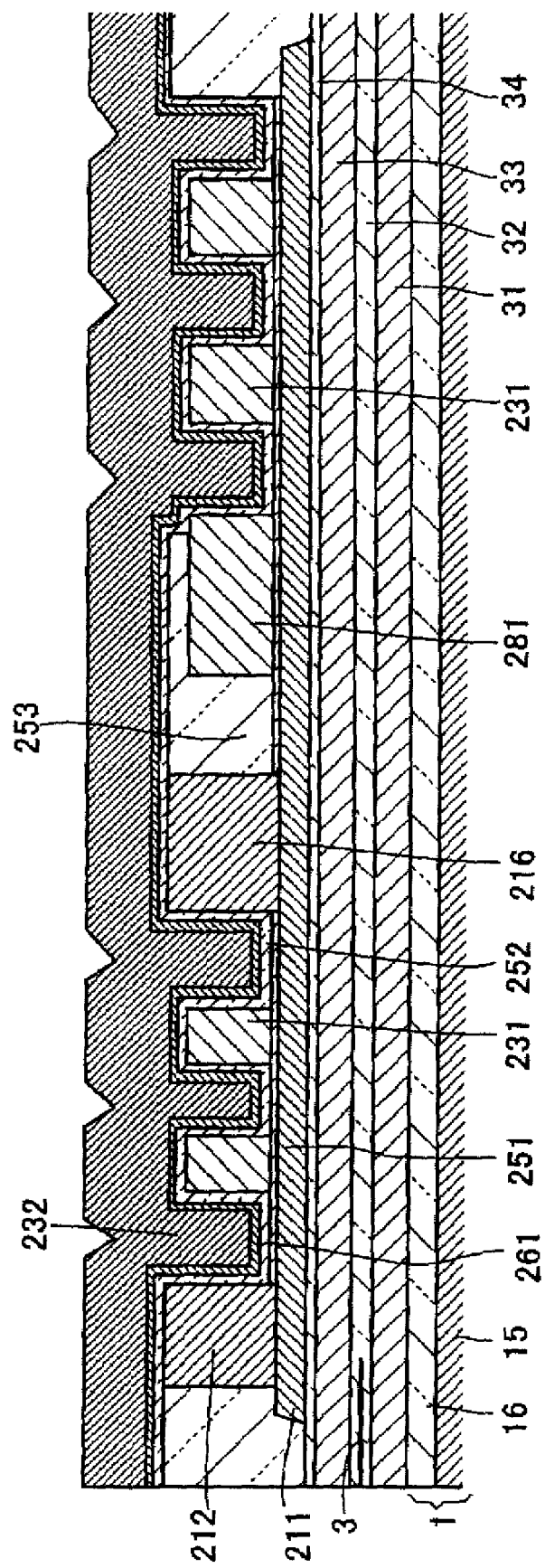
FIG. 18 is a diagram showing a process after the process shown in FIG. 17.

<Process Leading to a State of FIG. 18>

Next, the resist cover FR2 is removed and then, an insulating film 252 of 0.1 to 0.15 μm in thickness is deposited on the surfaces and side faces of the insulating films 251 and 253, the first coil 231, the second pole piece 212 and the back gap piece 216. If the insulating film 252 is formed as an $Al_2O_3$ film, it is possible to adopt an alumina-CVD film forming method, in which $Al(CH_3)_3$ and $AlCl_3$ are sprayed in an alternate and intermittent way under a low-pressure atmosphere of $H_2O$, $N_2$, $N_2O$ or $H_2O_2$.

Moreover, Cu-CVD is applied onto the surface of the insulating film 252 so that a seed film 261 is deposited 0.05 to 0.1 μm in thickness. The seed film 261 is obtained by sputtering Cu to form a Cu film of, for example, 50 nm in thickness and subsequently applying CVD thereon to form a Cu film of, for example, 50 nm in thickness. This method provides film-forming with an excellent step coverage in a small area.

Next, a plating film 232 to be the second coil is formed, for example, 3 to 4 μm in thickness on the seed film 261. The plating film 232 comprises Cu as its main constituent. FIG. 18 shows a state in which the plating film 232 has been formed.

Figure 19:
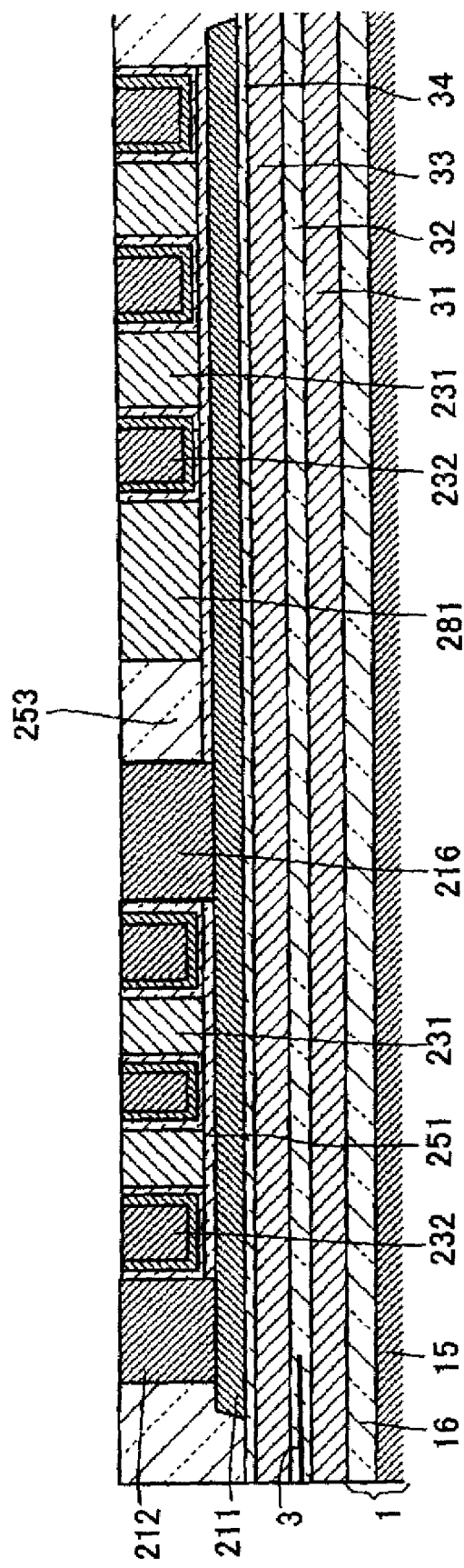
FIG. 19 is a diagram showing a process after the process shown in FIG. 18.

<Process Leading to a State of FIG. 19>

Next, as shown in FIG. 19, the plating film 232 is polished and flattened by CMP. Consequently, the second coil 232 of a spiral pattern is obtained, insulated from the first coil 231 by the insulating film 252. In the CMP, the second coil 232 becomes, for example, 2.5 to 3.0 μm in thickness. In the CMP, the surfaces of the second pole piece 212, the back gap piece 216 and the insulating film 253 are also polished so as to form the same plane as the surfaces of the first coil 231 and the second coil 232.

Figure 20:
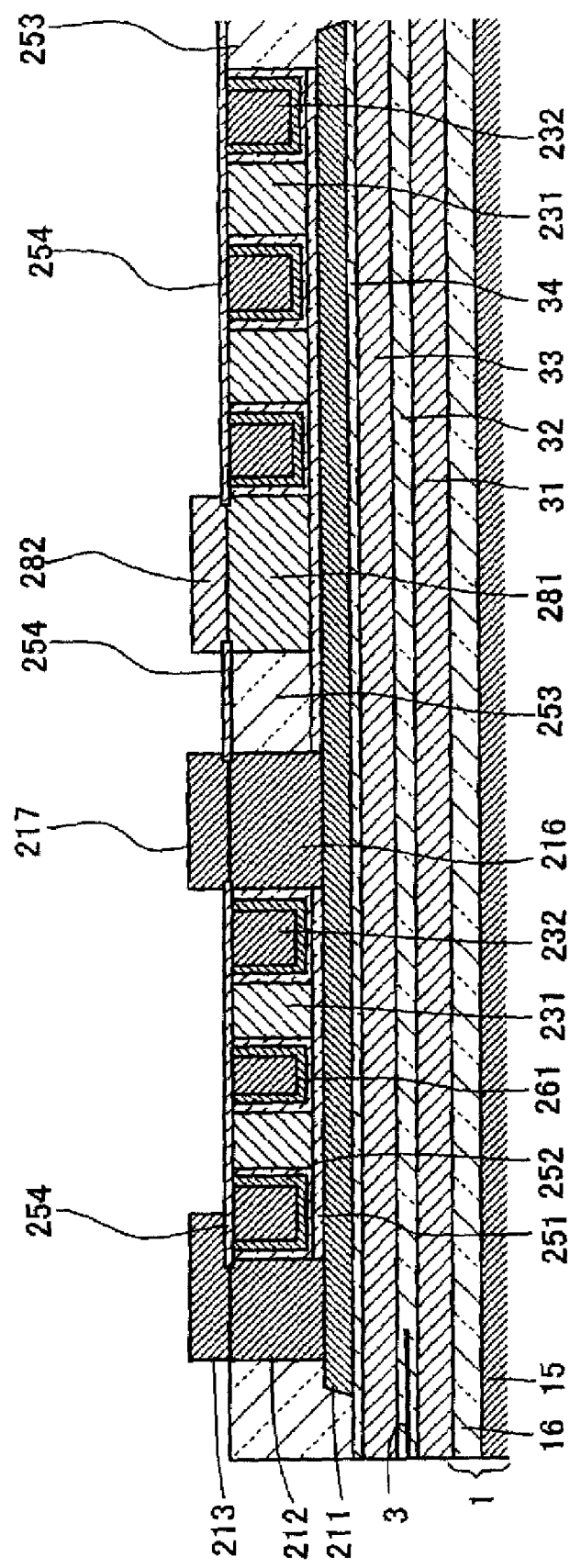
FIG. 20 is a diagram showing a process after the process shown in FIG. 19.

<Process Leading to a State of FIG. 20>

Next, an insulating film 254 covering the surfaces of the first coil 231 and the second coil 232 is deposited thereon. The insulating film 254 is made of $Al_2O_3$ and formed, for example, 0.2 to 0.3 μm in thickness.

Next, a photolithography process is performed on one surface where the insulating film 254 has been formed, so that a resist frame for forming a connecting conductor 282 for connecting the inner end 281 of the first coil 231 with the outer end 283 of the second coil 232 (see FIG. 6) and a resist frame for forming a third pole piece 213 and a back gap piece 217 are formed. According to the patterns defined by the resist frames thus obtained, a frame-plating method is performed. Consequently, as shown in FIG. 20, the connecting conductor 282, the third pole piece 213 and the back gap piece 217 are formed. The connecting conductor 282, in the embodiment, is made of Cu, but it may be made of the same material as the third pole piece 213. The third pole piece 213 and the back gap piece 217 are plating films of CoFe, CoNiFe (1.9 to 2.1T) or NiFe. The connecting conductor 282, the third pole piece 213 and the back gap piece 217 are, for example, 1 to 2 μm in thickness.

The third pole piece 213 extends so that the far end thereof in relation to the ABS is at a longer distance from the ABS than that of the second pole piece 212. Specifically, the third pole piece 213 extends above the first coil 231, insulated from the first coil 231 by the insulating film 254. More specifically, the third pole piece 213 includes an extending portion that extends so as to cover the upper surface of the second pole piece 212 and one surface of the coil facing the second pole portion P2 (namely, the upper surface of the coil).

Figure 21:
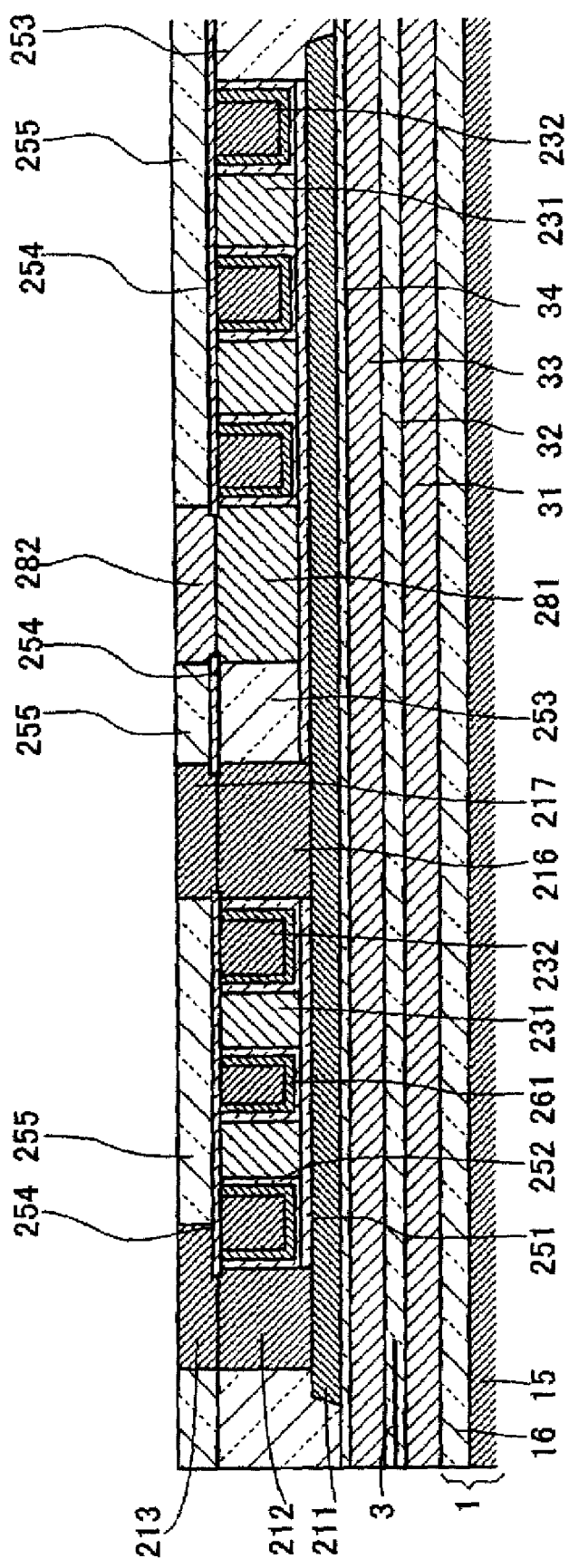
FIG. 21 is a diagram showing a process after the process shown in FIG. 20.

<Process Leading to a State of FIG. 21>

Next, an insulating film 255 of $Al_2O_3$ is deposited, for example, 1 to 2 μm in thickness on the surface where the connecting conductor 282, the third pole piece 213 and the back gap piece 217 have been formed. After that, the surfaces of the insulating film 255, the third pole piece 213, the back gap piece 217 and the connecting conductor 282 are polished by CMP, and the insulating film, the third pole piece, the back gap piece and the connecting conductor are reduced in thickness to 1 to 2 μm in the finished state. FIG. 21 shows a state in which the CMP has been performed.

Figure 22:
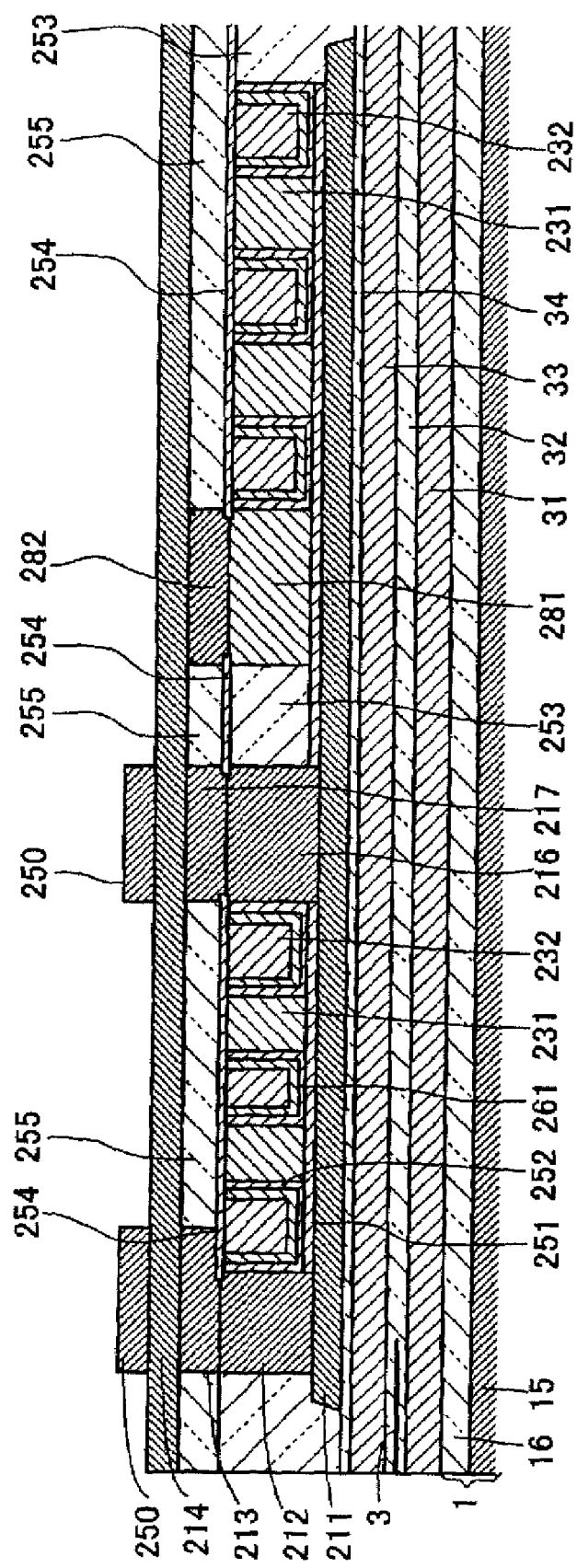
FIG. 22 is a diagram showing a process after the process shown in FIG. 21.

<Process Leading to a State of FIG. 22>

Next, as shown in FIG. 22, a magnetic film 214 to be the fourth pole piece 214 (see FIG. 3) is sputter-formed, for example, 0.3 μm to 1 μm in thickness on the polished surfaces of the insulating film 255, the third pole piece 213 and the back gap piece 217. The magnetic film 214 can be made of CoFeN (2.4 T), FeAlN, FeN, FeCo or FeZrN. In the embodiment, the magnetic film 214 is made of CoFeN (2.4 T). In addition, pattern-plating films 250 of NiFe, CoNiFe or the like are formed by a frame-plating method on the surface of the magnetic film 214. The pattern-plating films 250 are formed right above the back gap pieces 216 and 217 and right above the third pole piece 213. In the embodiment, a pattern-plating film 250 right above the third pole piece 213 has the same length as the third pole piece 213 as shown in FIG. 22, but the pattern-plating film is not limited to the above-mentioned length and may be short so as to terminate at a shorter distance from the ABS than the third pole piece 213.

Figure 23:
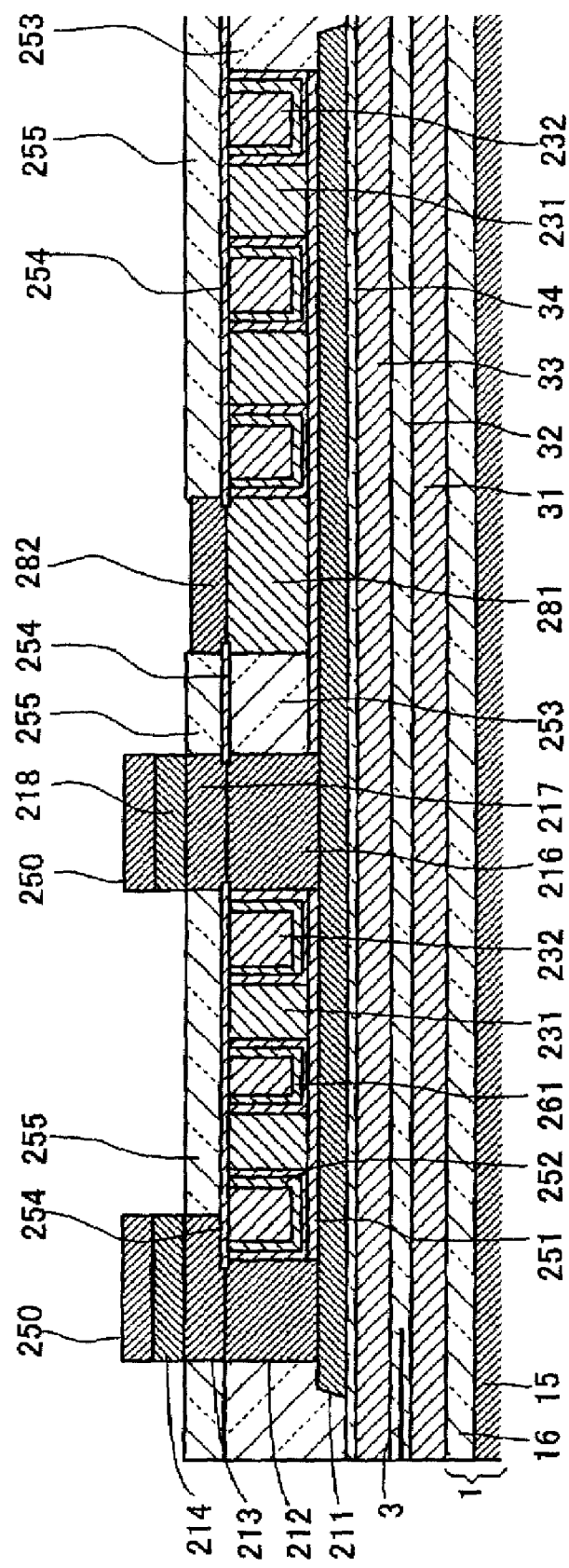
FIG. 23 is a diagram showing a process after the process shown in FIG. 22.

<Process Leading to a State of FIG. 23>

Next, as shown in FIG. 23, the magnetic film 214 is etched by ion beam using the pattern-plating film 250 as a mask. Consequently, the fourth piece 214 is formed in a prescribed major length according to the pattern-plating film 250.

Figure 24:
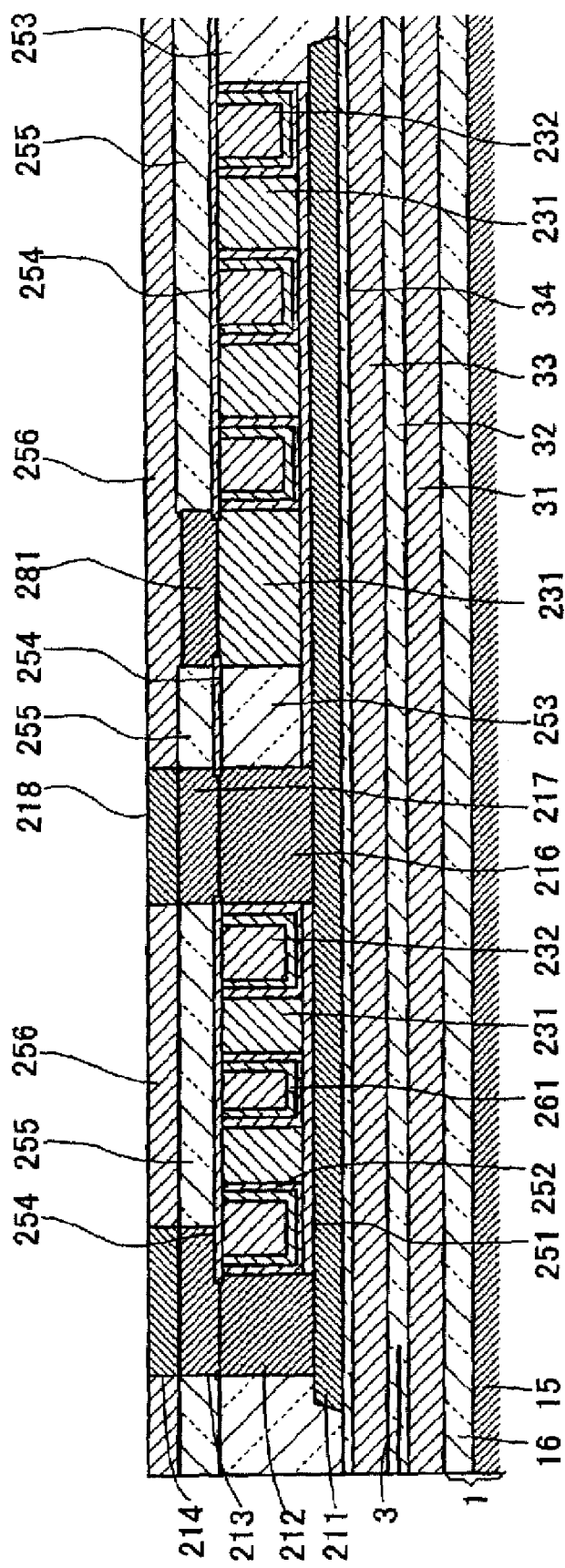
FIG. 24 is a diagram showing a process after the process shown in FIG. 23.

<Process Leading to a State of FIG. 24>

Next, an insulating film 256 of alumina or the like is sputter-formed 2 to 3 µm in thickness and then, the insulating film 256 is polished and flattened by CMP to such a level that the pattern-plating film 250 is removed. FIG. 24 shows a state in which this CMP process has been performed.

Figure 25:
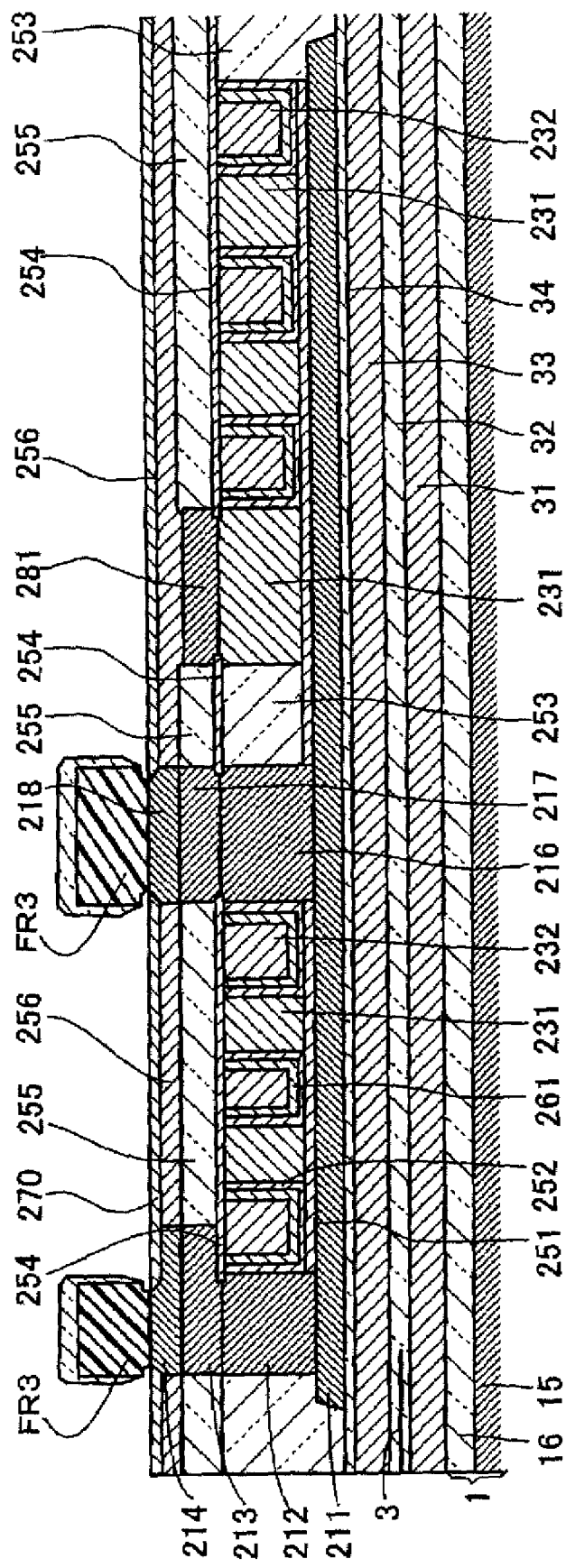
FIG. 25 is a diagram showing a process after the process shown in FIG. 24.

<Process Leading to a State of FIG. 25>

Next, a resist mask FR3 is formed on the fourth pole piece 214 and the back gap piece 218 by a photolithography process. The part of the resist mask FR3 that is on the fourth pole piece 214 is, however, formed in part so as not to cover the rear portion of the fourth pole piece 214.

After forming the resist mask FR3, the insulating film 256 and the rear portion of the fourth pole piece 214, which is not covered with the resist mask FR3, are etched by IBE with an etching depth of, for example, 0.2 to 0.3 µm. As a result, the residual upper portion of the fourth pole piece 214, which has not been etched, has a length less than the above-mentioned major length and determines the throat height.

The fourth pole piece 214 has substantially an L-shape in side view as shown in FIG. 25.

In the rear portion of the fourth pole piece 214, which has been etched to be reduced in thickness, the fourth pole piece 214 has the same length as the third pole piece 213. Specifically, extending portions in the first pole portion P1 that extend so as to cover the upper surface of the coil are at all levels in the height of the third pole piece 213 and at some levels in the height of the fourth pole piece 214.

After that, an insulating film 270 of Al$_2$O$_3$ is self-aligned and deposited on the etched surface by means of sputtering, using the resist mask FR3. The insulating film 270 is 0.2 to 0.35 µm in thickness. And, the resist mask FR3 shall be T-shaped so that the resist mask is suitable to be lifted off.

Figure 26:
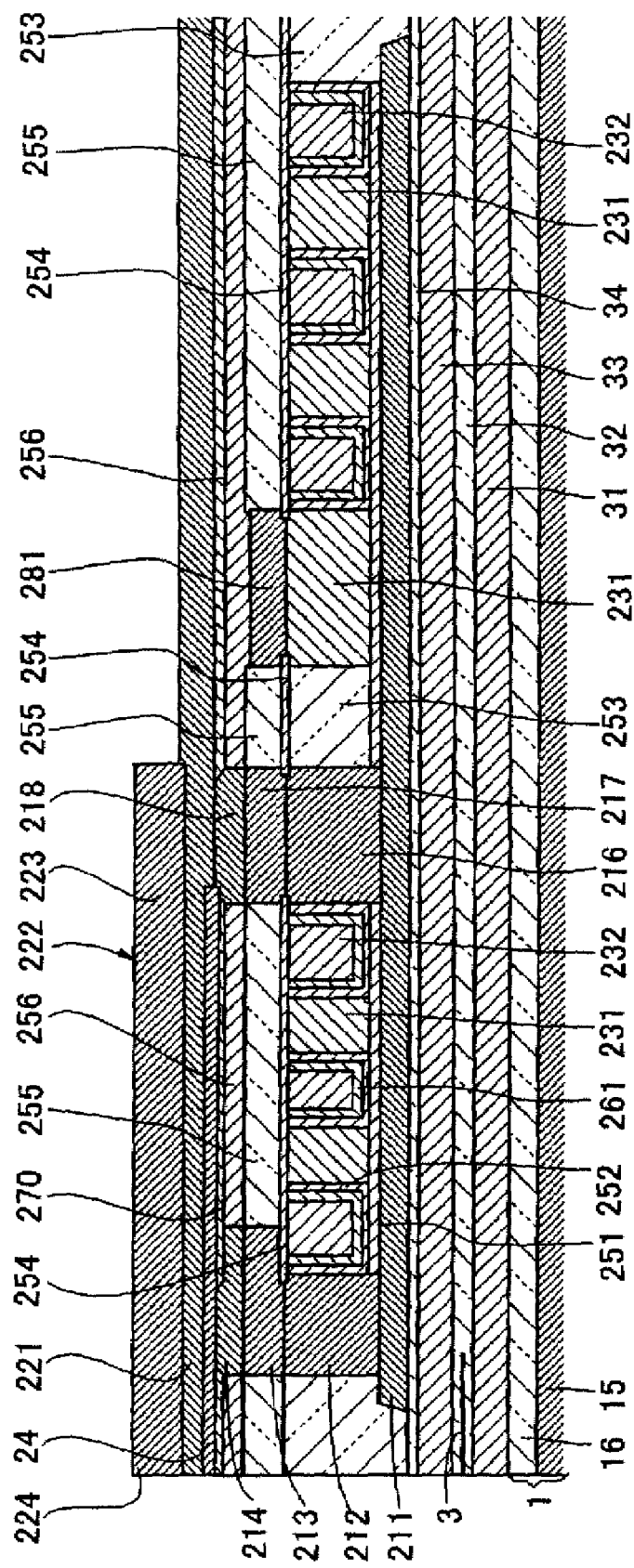
FIG. 26 is a diagram showing a process after the process shown in FIG. 25.
Figure 27:
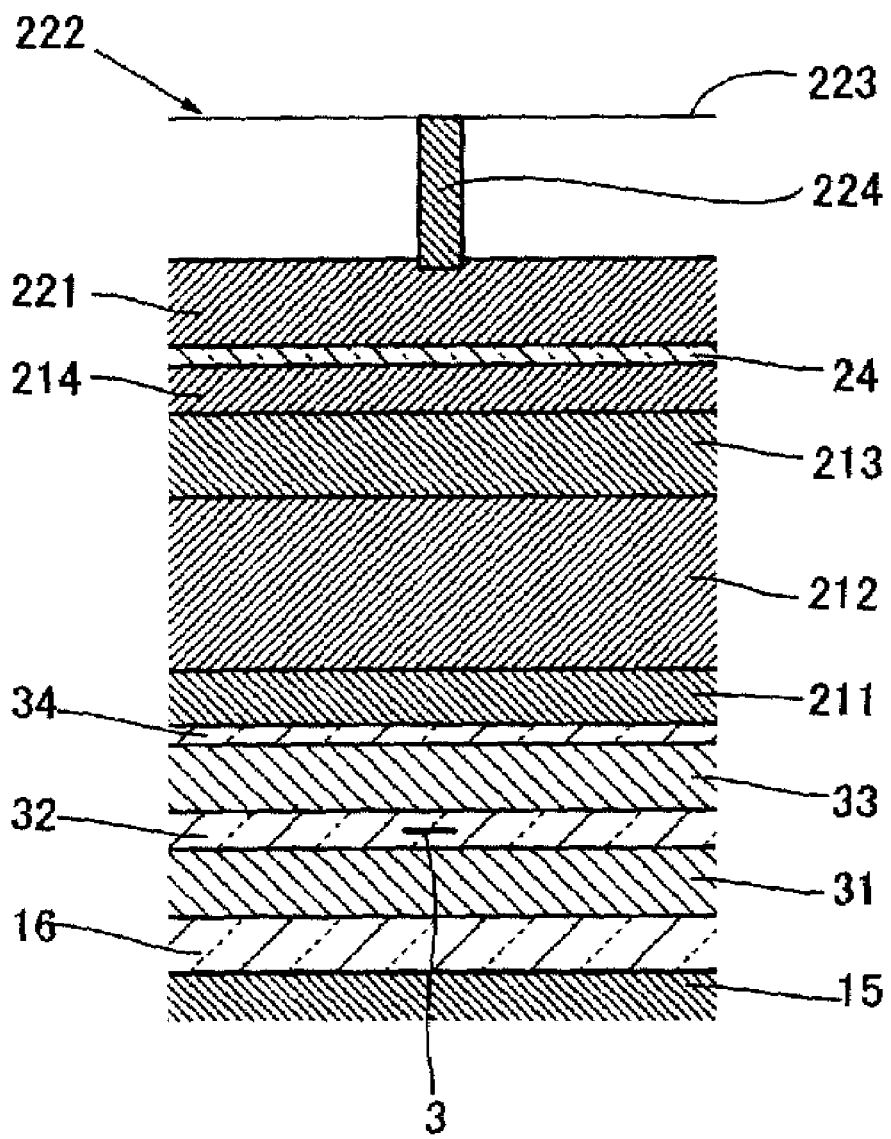
FIG. 27 is a view of the process shown in FIG. 26, seen from the ABS side.

<Process Leading to a State of FIGS. 26 and 27>

The resist mask FR3 is removed by a lift-off method and then, the exposed surface of the fourth pole piece 214, and the front surface of the insulating film 270 in relation to the back gap piece 218 are polished and flattened by CMP. In the embodiment, this CMP is performed by such a small degree as to produce a polishing quantity of 0.01 to 0.02 µm in thickness. After that, a gap film 24 is formed 0.06 to 0.1 µm in thickness on the flattened surface obtained by CMP. The gap film 24 is made of a non-magnetic metal material such as Ru and formed by sputtering or the like.

Next, a second magnetic film 221 to be an upper pole piece is formed, by sputtering, on the surface of the gap film 24 and the flattened surface. The second magnetic film 221 is made of an HiBs material. Specifically, CoFe and CoFeN are particularly suitable among HiBs materials such as FeAlN, FeN, CoFe, CoFeN and FeZrN. The second magnetic film 221, which is used as a seed film in the subsequent plating process for forming a third magnetic film thereon, is formed, for example, 0.5 to 0.8 µm in thickness.

Next, the third magnetic film 222 is formed by a frame-plating method with photoresist, using the second magnetic film 221 as a seed film. The third magnetic film 222 is made of NiFe (composition ratio, 55:45), CoNiFe (composition ratio, approximately 67:15:18, 1.9 T to 2.1 T), CoFe (composition ratio, 40:60, 2.3 T) or the like. The third magnetic film 222 is 1.0 to 1.5 µm in thickness.

The third magnetic film 222 is also formed so as to have a wide portion 223 and a narrow portion 224 as shown in FIG. 27. The narrow portion 224 is, in the embodiment, formed 0.1 to 0.2 µm in width. The wide portion 223 forms the second yoke portion and the narrow portion 224 forms the second pole portion.

Figure 28:
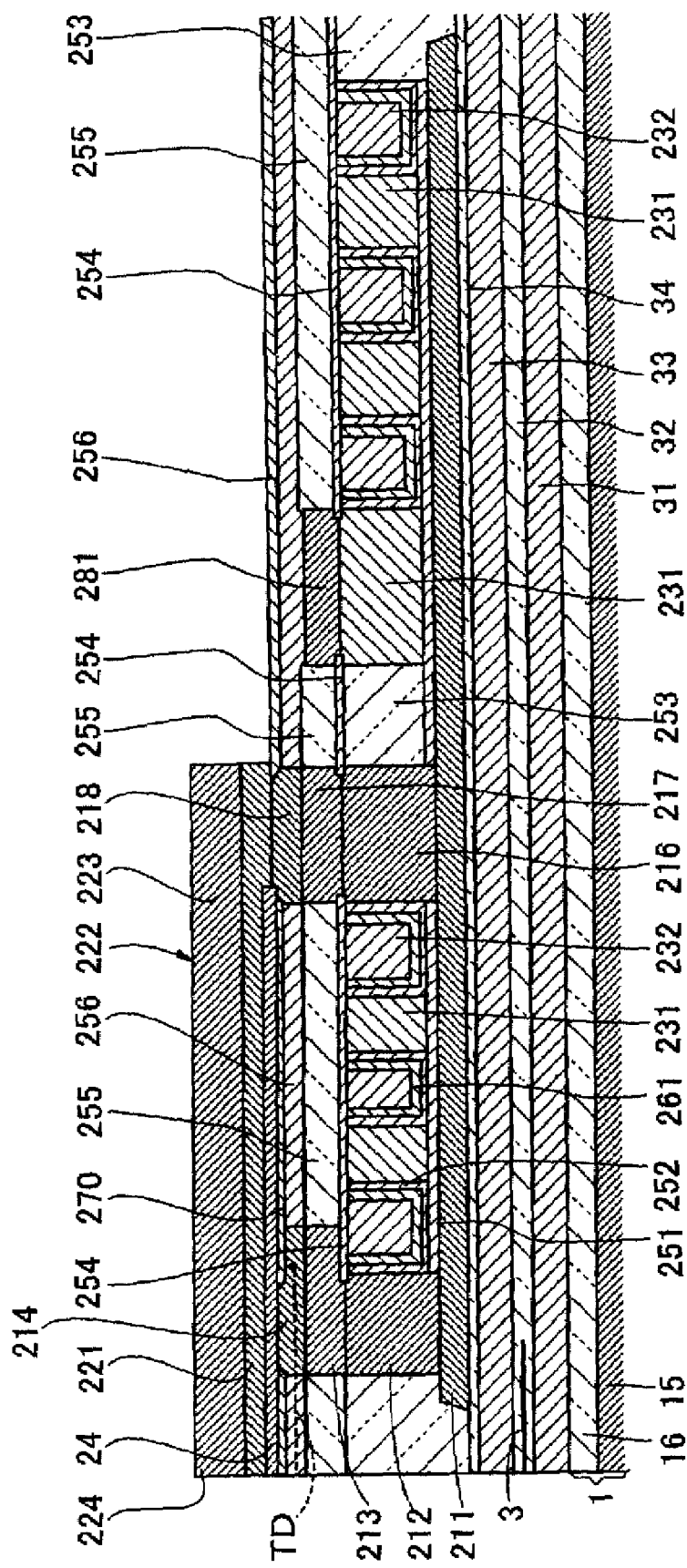
FIG. 28 is a diagram showing a process after the process shown in FIGS. 26 and 27.
Figure 29:
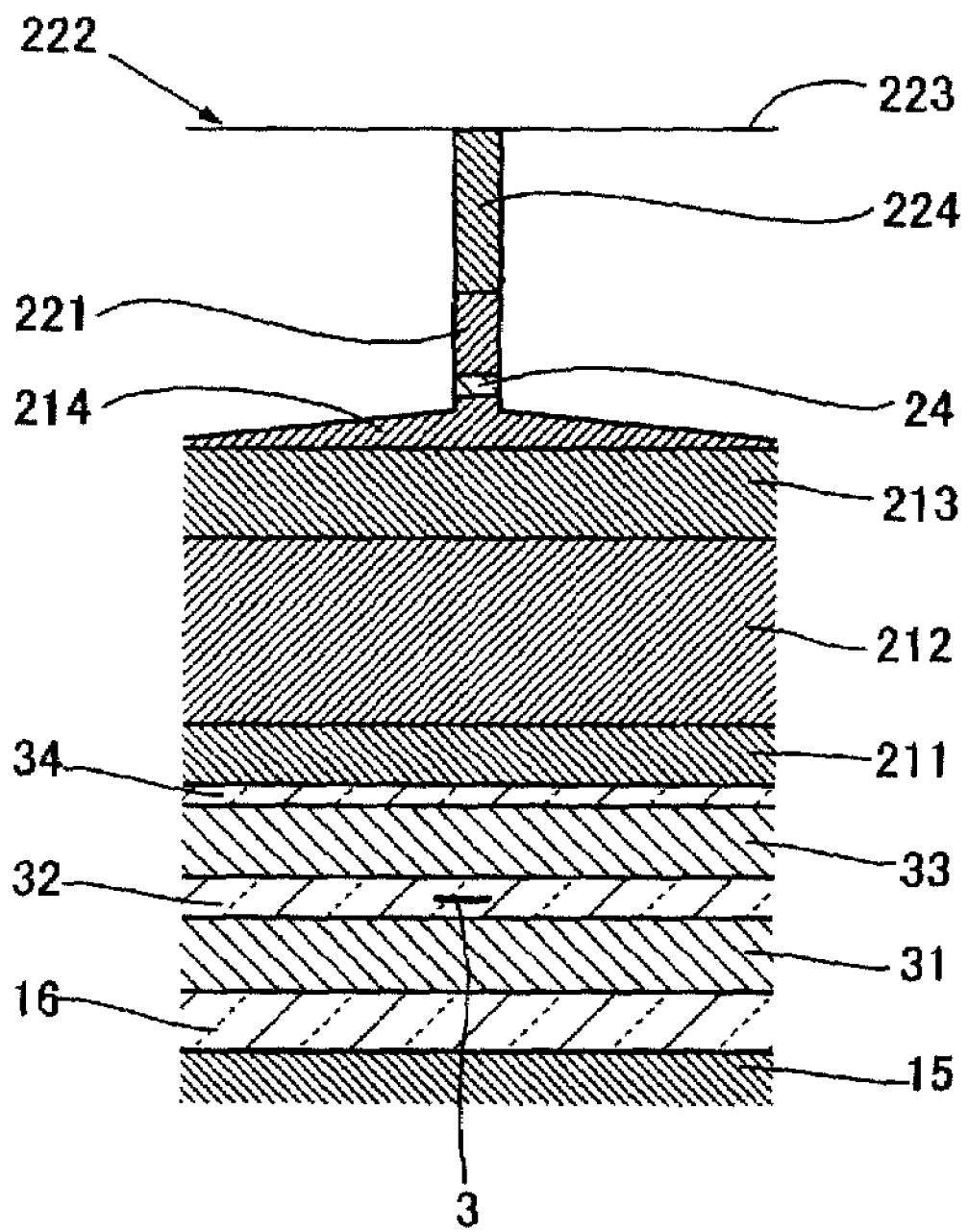
FIG. 29 is a view of the process shown in FIG. 28, seen from the ABS side.

<Process Leading to a State of FIGS. 28 and 29>

Next, an etching process is applied onto the second magnetic film 221, using the third magnetic film 222 as a mask layer. This etching process is performed by, for example, IBE, or RIE (reactive ion etching) with halogen-based gas such as Cl$_2$ or BCl$_3$+Cl$_2$, using the plating mask layer. For example, in case of applying RIE onto the second magnetic film 221 of CoFeN, the RIE is performed in the high temperature range of 50 to 300° C. and the second magnetic film 221 is etched to such some degree that the second magnetic film is reduced in width to 0.1 to 0.2 µm.

The temperature in the RIE process is preferably 50° C. or higher. In the embodiment, the best etching result is achieved in the temperature range of 200 to 250° C. Furthermore, introducing O$_2$ into Cl$_2$-based gas makes it possible to accurately control the etching profile, and mixing O$_2$ with a BCl$_3$+Cl$_2$ gas has the effect of completely removing a deposit of a residual boron gas, so accurate etching on the second magnetic film 221 is achieved. Furthermore, in RIE with the etching gas such as Cl$_2$ gas, BCl$_3$+Cl$_2$ gas, or O$_2$-mixed BCl$_3$+Cl$_2$+O$_2$ gas, the etching rate of RIE is increased and so, the selection ratio with the third magnetic film 222, which is used as a mask layer, is increased by 30 to 50% or more.

After that, a photoresist mask layer for trimming is formed and then, the third pole piece 213 and the fourth pole piece 214 are trimmed. In FIG. 28, the broken line indicated as TD represents the trimming depth. This trimming process is, in the embodiment, performed in the angle range of 35 to 55 degrees and the depth range of 0.2 to 0.4 µm. And in order to obtain a further reduced width of 0.1 µm, an ion milling process is performed in the angle range of 40 to 75 degrees.

Last, over-coating material 271 (protective film) is formed on the upper surface, and the manufacturing process on the wafer is finished. Then, processes of cutting out a head from the wafer and polishing the head on the ABS side thereof are performed to obtain the state shown in FIG. 3.

In order to achieve a thin film magnetic head with a reduced yoke length YL to improve high-frequency characteristic, an easier method might be adopted in that the second pole piece is shortened. In the method, however, the coil might be attacked in the ion milling process, in which the mask layer for trimming recedes.

In the embodiment, the third pole piece 213 and the fourth pole piece 214 extend longer distances than those of the prior art and specifically, extend from the ABS to the area above the first coil 231. This structure makes it possible to eliminate the risk of the coil being attacked in the ion milling process, in which the mask layer for trimming recedes. Consequently, it is possible to solve the problems in short-circuit between the coil-turns or electrical short between the coil and the lower pole, even if the second pole piece is shortened to achieve the reduced yoke length YL.

In the embodiment in which the third and fourth pole pieces 213, 214 extend to the area above the first coil 231, an improvement in over-write characteristics is also achieved on the following viewpoint.

Magnetic flux saturation relates directly to a magnetic volume, which is defined by the following three factors: a track width, the width of pole piece(s) to be trimmed (the second pole piece in the prior art, the third pole piece and/or the fourth pole piece in the present embodiment), and a trimming depth. The smaller the magnetic volume is, the more early the magnetic flux saturation occurs, which leads to degradation in over-write characteristics.

In the prior art, the second pole piece is trimmed and there is a trend toward a smaller length of the second pole piece to achieve a thin film magnetic head with a smaller yoke length YL. As a result, possibility of inadequate over-write characteristics arises.

In the embodiment, the third pole piece 213 and the fourth pole piece 214, which are to be trimmed, are extended to the area above the first coil 231. Consequently, the magnetic volume, which is defined by the above-mentioned three factors, is increased to a value greater than that of the prior art and the increase in magnetic volume suppresses magnetic flux saturation. Specifically, the third pole piece 213 and/or the fourth pole piece 214 has a large magnetic volume in the rear in relation to the throat height zero even after the trimming process. Consequently, it is possible to achieve both of the reduced yoke length YL and the excellent over-write characteristics.

(2) Embodiment 2

Embodiment 2 relates to a method for manufacturing a thin film magnetic head shown in FIGS. 7 and 8. FIGS. 30 to 38 show processes of this manufacturing method. It is notified in advance that processes illustrated in FIGS. 30 to 38 are also performed on a wafer.

Figure 30:
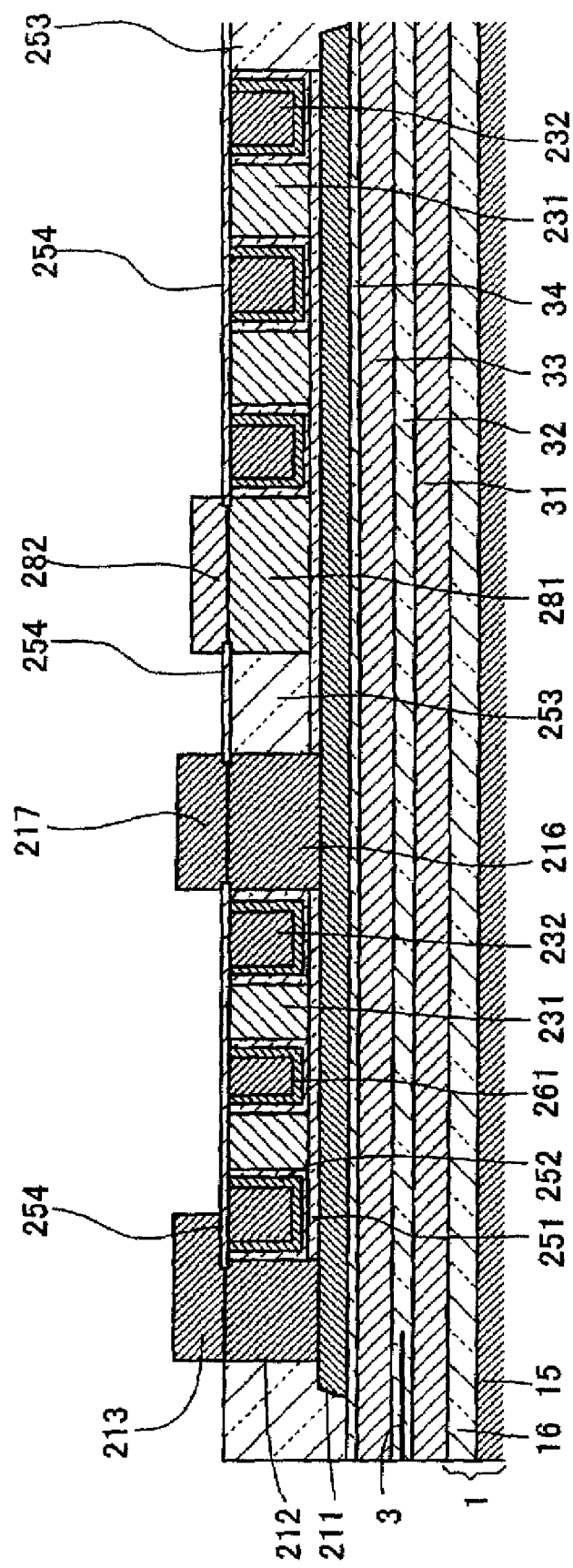
FIG. 30 is a diagram showing a process of manufacturing a thin film magnetic head having the electromagnetic converter portion shown in FIGS. 7 and 8.

<Process Leading to a State of FIG. 30>

In the process leading to the state of FIG. 30, processes illustrated in FIGS. 13 to 19 of embodiment 1 are performed to obtain substantially the same structure as in FIG. 19, and then the following processes are performed.

First, an insulating film 254 covering the surfaces of the first coil 231 and the second coil 232 is deposited thereon. The insulating film 254 is made of $Al_2O_3$ and formed, for example, 0.2 to 0.3 μm in thickness.

Next, a photolithography process is performed on one surface where the insulating film 254 has been formed, so that a resist frame for forming a connecting conductor 282 for connecting the inner end 281 of the first coil 231 with the outer end 283 of the second coil 232 (see FIG. 6) and a resist frame for forming a third pole piece 213 and a back gap piece 217 are formed. According to the patterns defined by the resist frames thus obtained, a frame-plating method is performed. Consequently, as shown in FIG. 30, the connecting conductor 282, the third pole piece 213 and the back gap piece 217 are formed.

The connecting conductor 282 is, in the embodiment, made of Cu, but it may be made of the same material as the third pole piece 213. In the embodiment, the thickness of the connecting conductor 282 is less than the thicknesses of the third pole piece 213 and the back gap piece 217.

The third pole piece 213 and the back gap piece 217 are plating films of CoFe, CoNiFe (1.9 to 2.1T) or NiFe. The thicknesses of the connecting conductor 282, the third pole piece 213 and the back gap piece 217 are in the range of, for example, 1 to 2 μm.

The third pole piece 213 extends so that the far end thereof in relation to the ABS is at a longer distance from the ABS than that of the second pole piece 212. Specifically, the third pole piece 213 extends above the first coil 231, insulated from the first coil 231 by the insulating film 254. More specifically, the third pole piece 213 includes an extending portion that extends so as to cover the upper surface of the second pole piece 212 and one surface of the coil facing the second pole portion P2 (namely, the upper surface of the coil).

Figure 31:
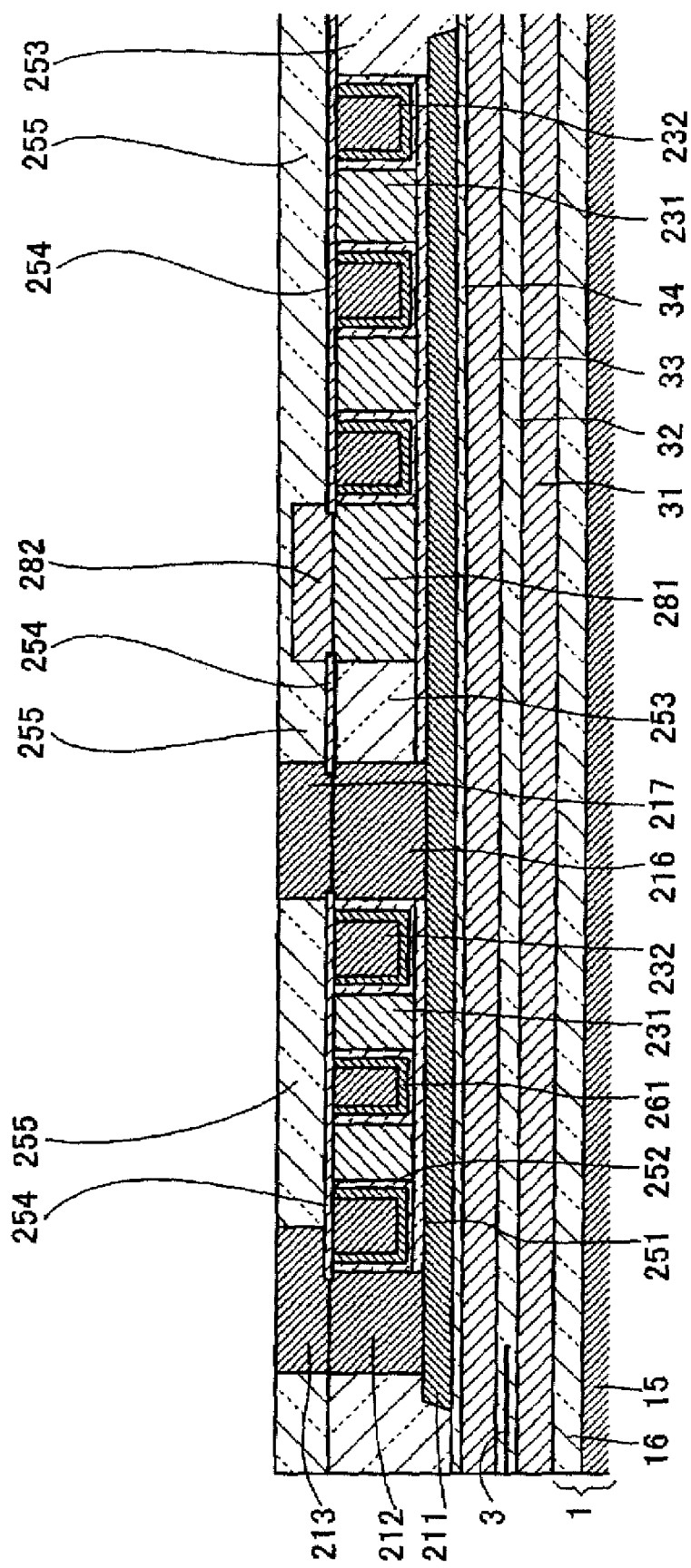
FIG. 31 is a diagram showing a process after the process shown in FIG. 30.

<Process Leading to a State of FIG. 31>

Next, an insulating film 255 of $Al_2O_3$ is deposited, for example, 1 to 2 μm in thickness on the surface where the connecting conductor 282, the third pole piece 213 and the back gap piece 217 have been formed. After that, the surfaces of the insulating film 255, the third pole piece 213 and the back gap piece 217 are polished by CMP, and the insulating film, the third pole piece, the back gap piece and the connecting conductor are reduced in thickness to 1 to 2 μm in the finished state. Even after the CMP, the upper surface of the connecting conductor 282 remains covered with the insulating film 255 since the thickness of the connecting conductor 282 is less than the thicknesses of the third pole piece 213 and the back gap piece 217 as described above. FIG. 31 shows a state in which the CMP has been performed.

Figure 32:
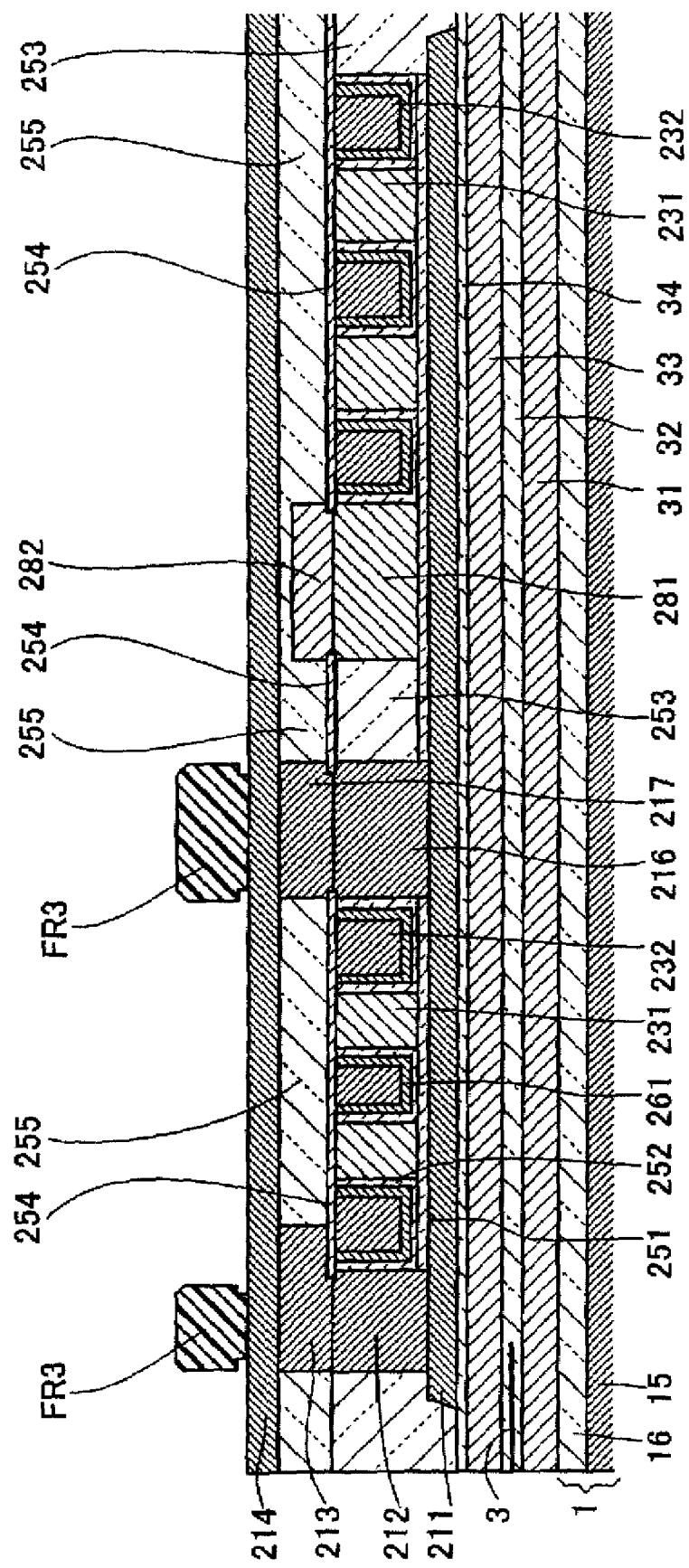
FIG. 32 is a diagram showing a process after the process shown in FIG. 31.

<Process Leading to a State of FIG. 32>

Next, as shown in FIG. 32, a magnetic film 214 to be the fourth pole piece 214 (see FIG. 7) is sputter-formed, for example, 0.2 μm to 1 μm in thickness on the polished surfaces of the insulating film 255, the third pole piece 213 and the back gap piece 217. The magnetic film 214 can be made of CoFeN (2.4 T), FeAlN, FeN, FeCo or FeZrN. In the embodiment, the magnetic film 214 is made of CoFeN (2.4 T).

In addition, a photolithography process is applied onto the upper surface of the magnetic film 214 so that a resist mask FR3 is formed on the areas where the fourth pole piece 214 and the back gap piece 218 are to be formed. In the embodiment, since the fourth piece 214 is made to determine the throat height, the resist mask FR3 is formed shorter than the third pole piece 213, not so as to cover the rear portion of the fourth pole piece 213.

Figure 33:
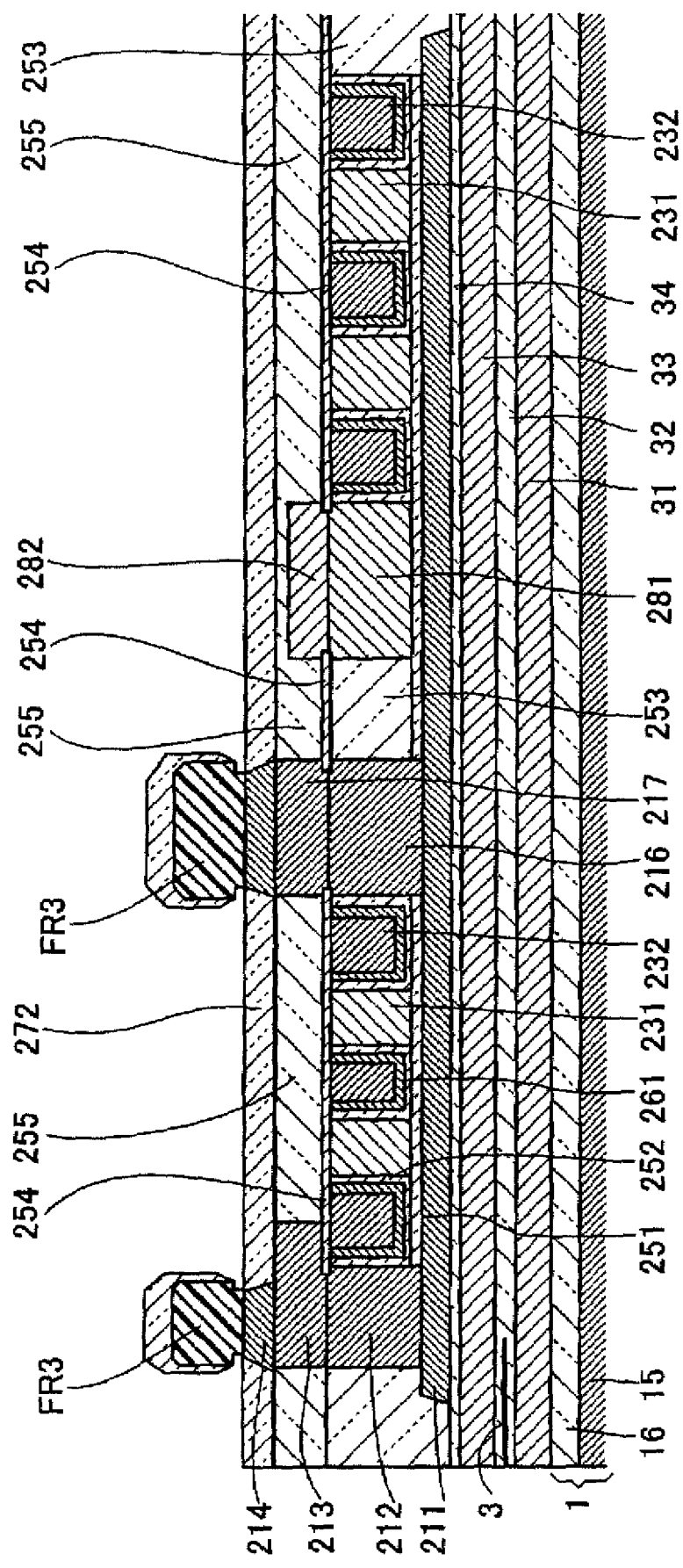
FIG. 33 is a diagram showing a process after the process shown in FIG. 32.

<Process Leading to a State of FIG. 33>

Next, the magnetic film 214 is etched by IBE with the resist mask FR3. The fourth pole piece 214, which is obtained by the etching, has a major length throughout its thickness, which is determined by the resist mask FR3. And, the fourth pole piece functions throughout its thickness to determine the throat height. In the embodiment, the fourth pole piece 214 extends not so far as the area above the coil, and the extending portion that extends so as to cover the upper surface of the coil is only at all levels in the height of the third pole piece 213.

After that, an insulating film 272 of $Al_2O_3$ is self-aligned and deposited thereon by means of sputtering, using the resist mask FR3, and then the resist mask FR3 is lifted off. The insulating film 270 is 0.3 to 0.4 μm in thickness.

Figure 34:
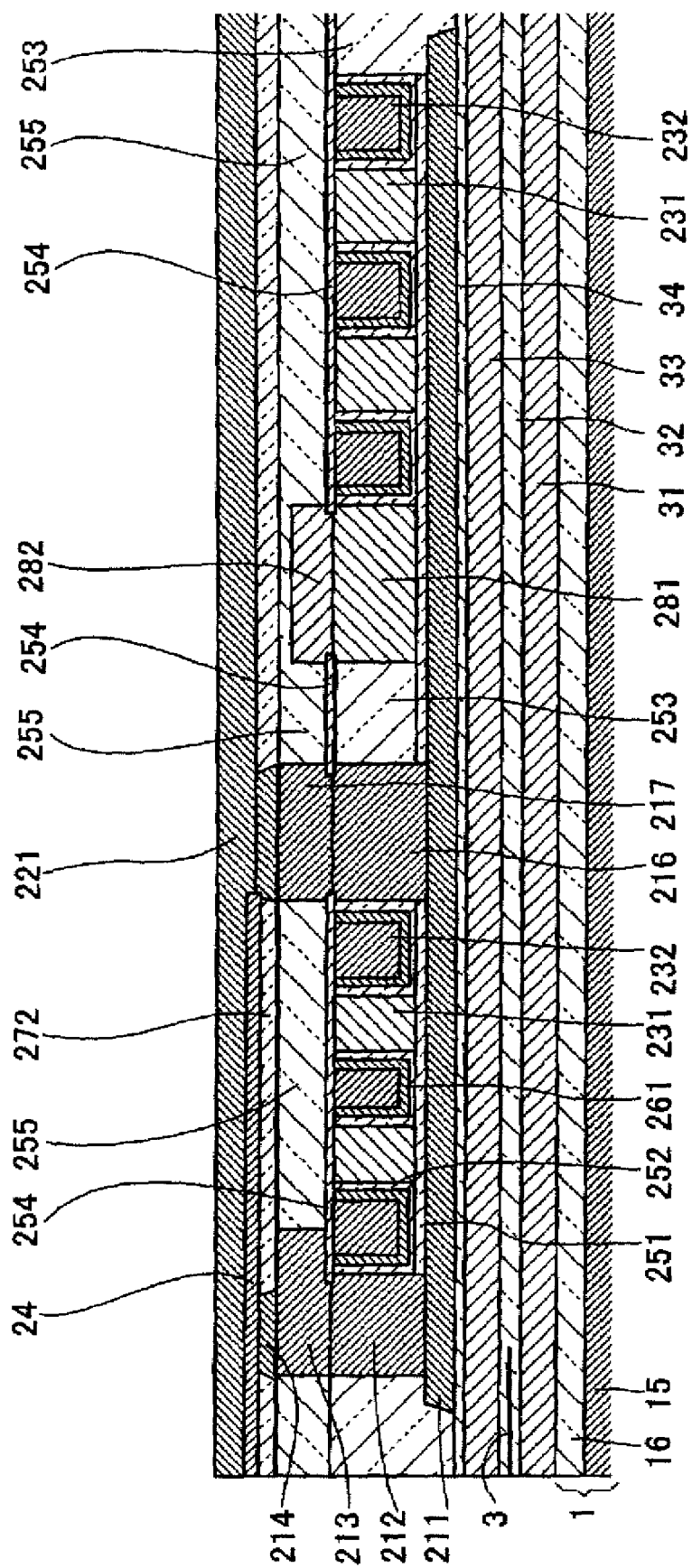
FIG. 34 is a diagram showing a process after the process shown in FIG. 33.

<Process Leading to a State of FIG. 34>

After lifting off the resist mask FR3, the exposed surface of the fourth pole piece 214 and the surface of the insulating film 270 are polished and flattened by CMP with a slight degree of about 0.1 μm. After that, a gap film 24 is deposited 0.07 to 0.1 μm in thickness on the flattened surface obtained by the CMP. The gap film 24 is made of a non-magnetic metal material such as Ru, Ni, Cu or Ta, or an insulating material such as $SiO_2$ or $Al_2O_3$ and is formed by sputtering or the like.

Next, a second magnetic film 221 to be an upper pole piece is formed by sputtering, on the surface of the gap film 24 and the flattened surface. The second magnetic film 221 is made of an HiBs material. Specifically, CoFe and CoFeN (2.4T) are particularly suitable among HiBs materials such as FeAlN, FeN, CoFe, CoFeN and FeZrN. The second magnetic film 221, which is used as a seed film in the subsequent plating process for forming a third magnetic film thereon, is formed, for example, 0.3 to 0.6 μm in thickness.

Figure 35:
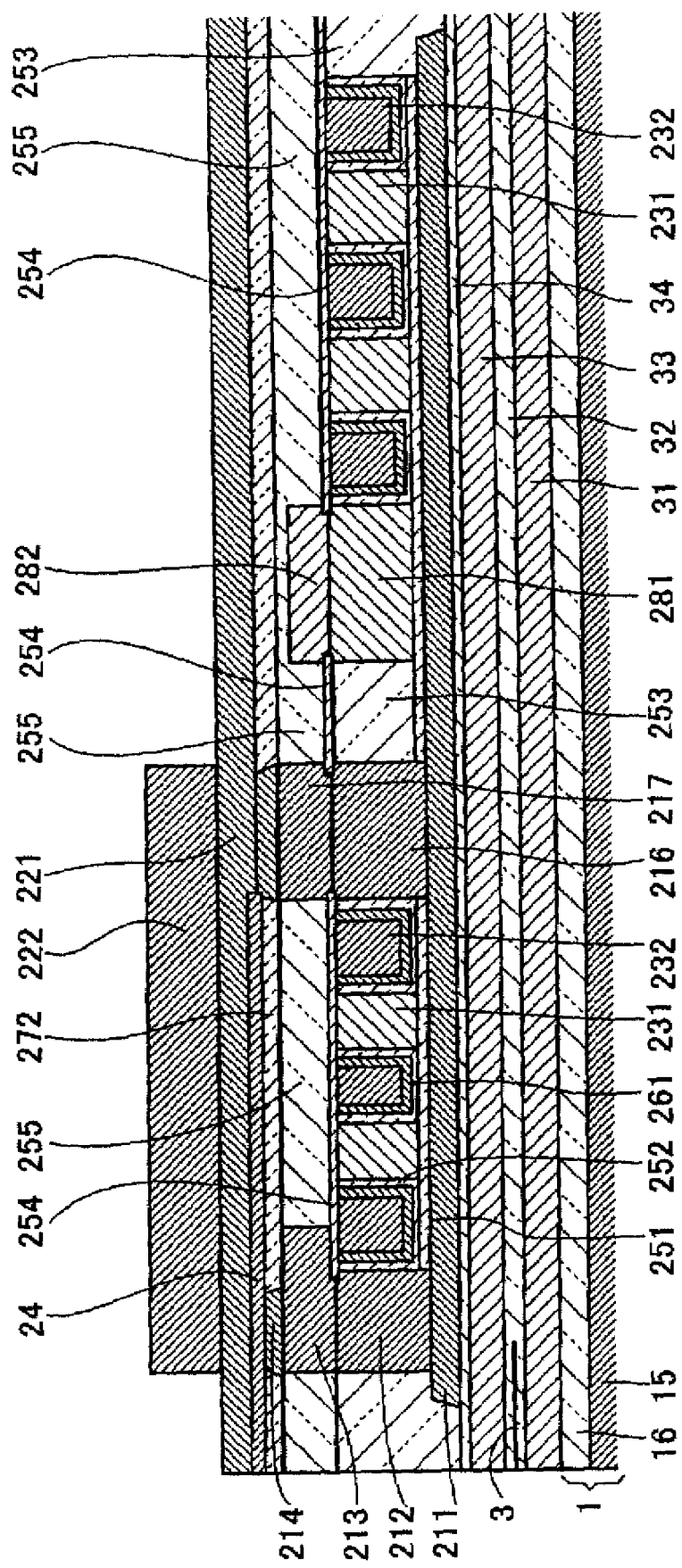
FIG. 35 is a diagram showing a process after the process shown in FIG. 34.
Figure 36:
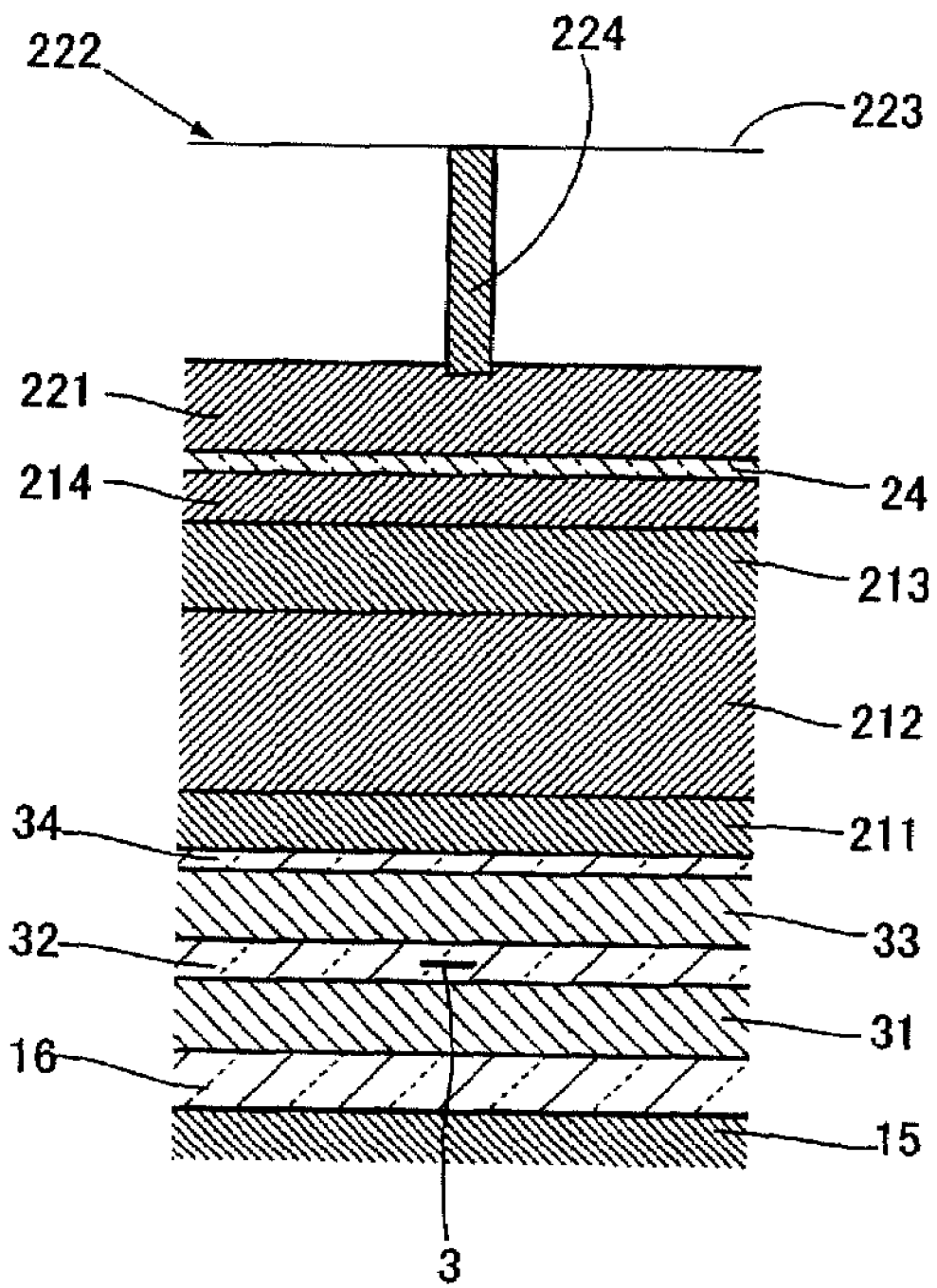
FIG. 36 is a view of the process shown in FIG. 35, seen from the ABS side.

<Process Leading to a State of FIGS. 35 and 36>

Next, the third magnetic film 222 is formed by a frame-plating method with photoresist, using the second magnetic film 221 as a seed film. The third magnetic film 222 is made of NiFe (composition ratio, 55:45), CoNiFe (composition ratio, approximately 67:15:18, 1.9 T to 2.1 T), CoFe (composition ratio, 40:60, 2.3 T) or the like. The third magnetic film 222 is 3.0 to 3.5 μm in thickness.

The third magnetic film 222 is formed so as to have a wide portion 223 and a narrow portion 224 as in the above-mentioned embodiment 1. The narrow portion 224 is, in the present embodiment, formed 0.1 to 0.2 μm in width. The wide portion 223 forms the second yoke portion and the narrow portion 224 forms the second pole portion.

Figure 37:
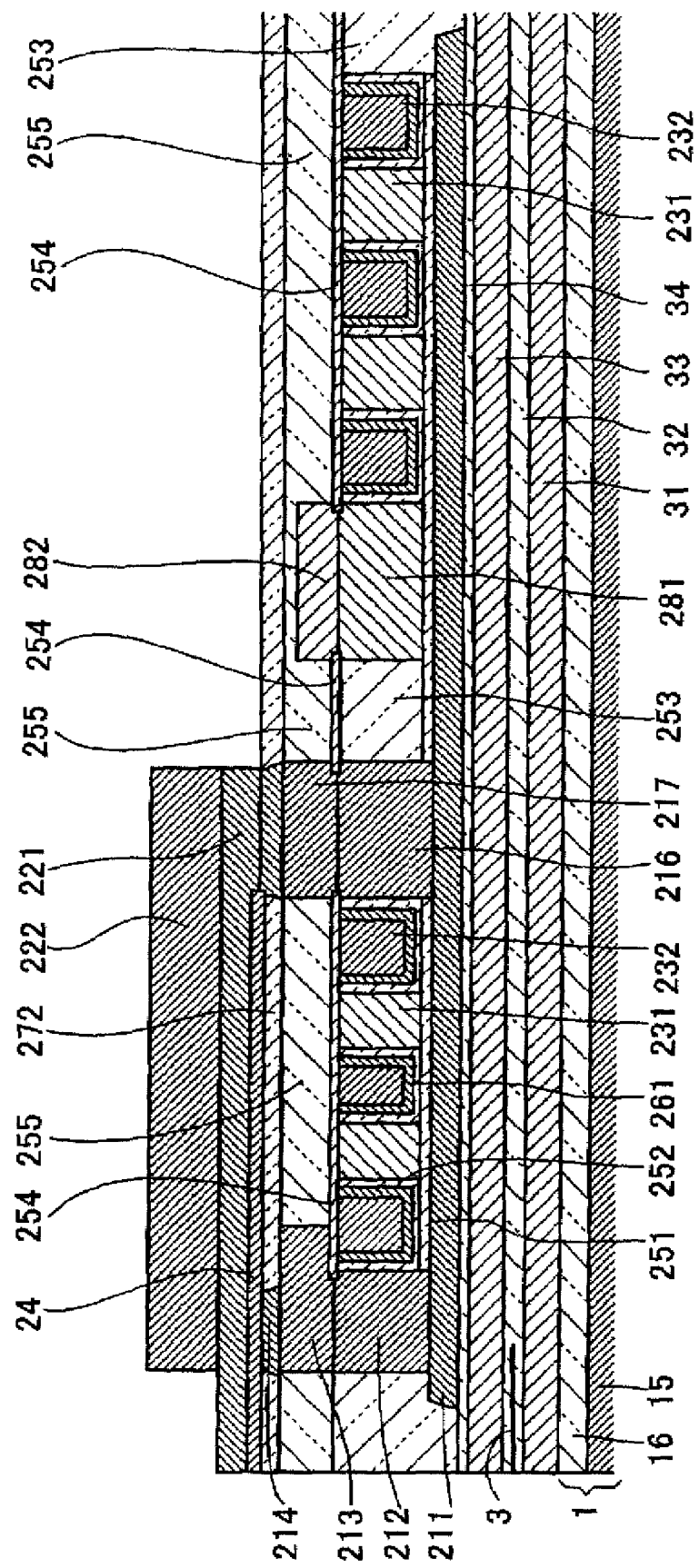
FIG. 37 is a diagram showing a process after the process shown in FIGS. 35 and 36.
Figure 38:
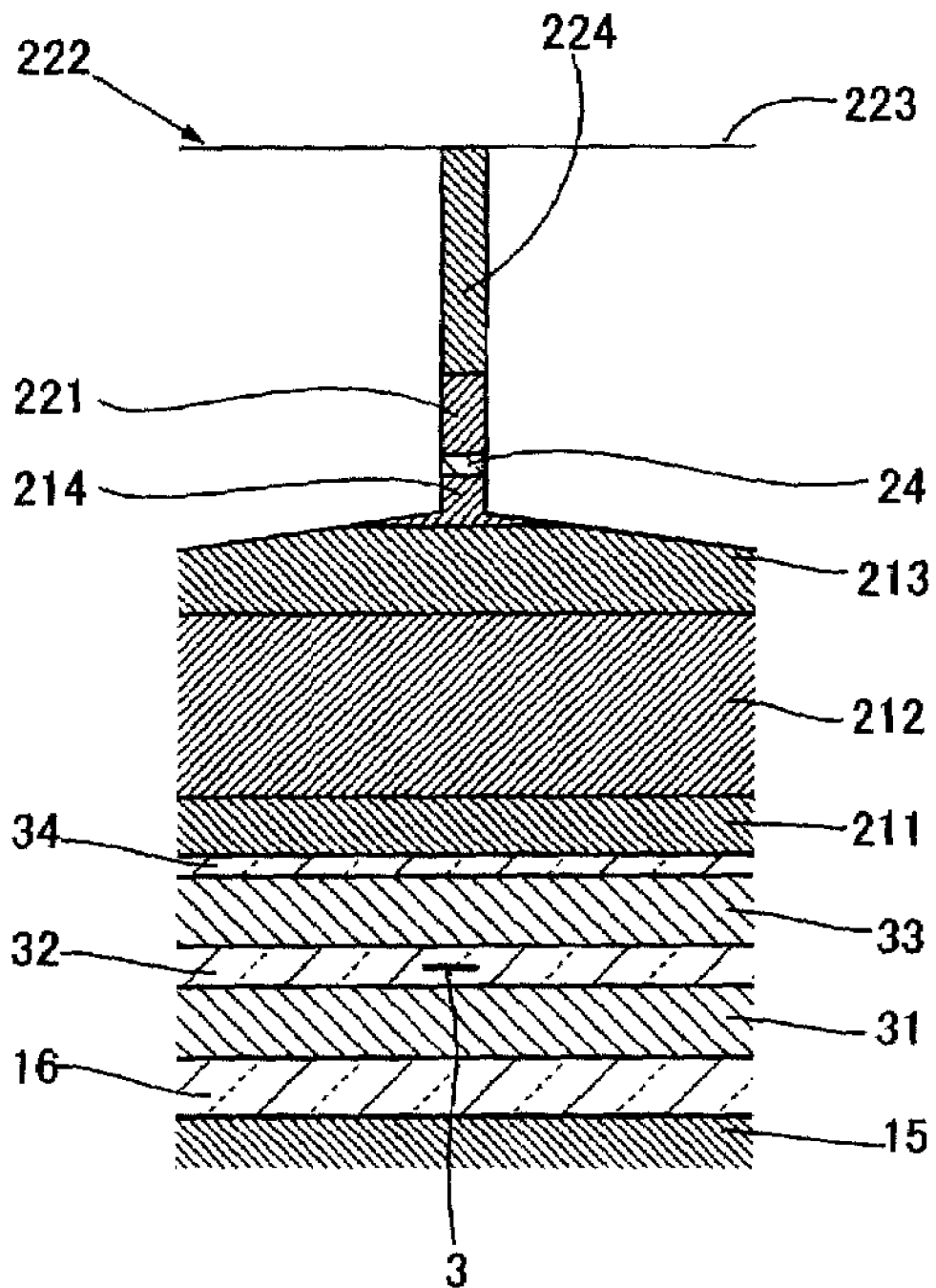
FIG. 38 is a view of the process shown in FIG. 37, seen from the ABS side.

<Process Leading to a State of FIGS. 37 and 38>

Next, an etching process is applied with an angle of, for example, 35 to 50 degrees onto the second magnetic film 22, using the third magnetic film 222 as a mask layer. This etching process is performed by, for example, IBE, or RIE with halogen-based gas such as $Cl_2$ gas or $BCl_3+Cl_2$ gas, using the plating mask layer.

For example, in case of applying RIE onto the second magnetic film 221 of CoFeN, the RIE is performed in the high temperature range of 50 to 300° C. and the second magnetic film 221 is etched to such some degree that the second magnetic film is reduced in width to 0.1 to 0.2 μm.

The temperature in the RIE process is preferably 50° C. or higher. In the embodiment, the best etching result is achieved in the temperature range of 200 to 250° C.

Furthermore, introducing $O_2$ into $Cl_2$-based gas makes it possible to accurately control the etching profile and specifically, mixing $O_2$ with $BCl_3+Cl_2$ gas has the effect of completely removing a deposit of a residual boron gas. Consequently, accurate etching on the second magnetic film 221 is achieved.

Furthermore, in RIE with the etching gas such as $Cl_2$ gas, $BCl_3+Cl_2$ gas, or $O_2$-mixed $BCl_3+Cl_2+O_2$ gas, the etching rate of RIE is increased and so, the selection ratio with the third magnetic film 222, which is used as a mask layer, is increased by 30 to 50% or more.

After that, IBE is performed on the residual third magnetic film 222 to apply additional etching to it. The IBE on the residual third magnetic film 222 is performed in the angle range of, for example, 40 to 75 degrees.

After that, a photoresist mask layer for trimming is formed and then, the third pole piece 213 and the fourth pole piece 214 are trimmed. In the embodiment, the trimming process is performed in the angle range of 45 to 55 degrees and in a depth of 0.2 to 0.4 μm, namely, the depth that reaches the extending portion of the third pole piece, which extends so as to cover the upper surface of the coil. And in order to obtain a further reduced width of 0.1 μm, an ion milling process is performed in the angle range of 40 to 75 degrees.

As a result, the second pole portion P2 is formed into the narrow-track structure with a track width of 0.1 μm, and the defect that the end of the second pole portion P2 might be reduced in film thickness as in the prior art is eliminated. In addition, another defect that the end of the second pole portion P2 might be reduced into a triangle shape is eliminated.

And, even if the residual gas after the RIE, for example, $Cl_2$ or $BCl_3$, is deposited on the second pole portion P2, the residual gas can be completely removed by side etching in the ion milling process, which is in the above-mentioned trimming process. As a result, the corrosion on the second pole P2 is completely prevented.

Generally $Cl_2$-based etching gas has a small etching rate with CoFe-based material. Especially with CoFeN material, there is a possibility that the etching profile comes into a taper shape and it is impossible to form accurate and narrow pattern. In the present invention, after the RIE with etching gas, ion milling with an irradiation angle of 45 to 70 degrees, preferably of 45 to 50 degrees is applied to the second pole portion P2 of CoFeN (a HiBs material of 2.4 T). As a result of the ion milling, the second pole portion P2, which has been formed into a taper shape because of the RIE, is formed into a nearly perpendicular shape in the finished state. Specifically, the ion milling makes it possible to control the process of forming the accurate track width.

While the embodiment shows the example in that the second magnetic film 221 is etched by RIE, the present invention is not limited to this example, and the second magnetic film may be etched only by IBE.

Last, overcoat material 271 (protective film) is formed 20 to 40 μm in film thickness on the upper surface, and the manufacturing process on the wafer is finished. Then, processes of cutting out a head from the wafer and polishing the head on the ABS side thereof are performed to obtain the state shown in FIGS. 7 and 8.

(3) Embodiment 3

Embodiment 3 is a manufacturing process for a thin film magnetic head shown in FIGS. 9 and 10, and is illustrated in FIGS. 39 to 47. Processes, which have been illustrated and described in embodiment 1 or 2 and are also applied to embodiment 3, are referred to the description of embodiment 1 or 2 and the illustrations of the processes may be omitted.

Figure 39:
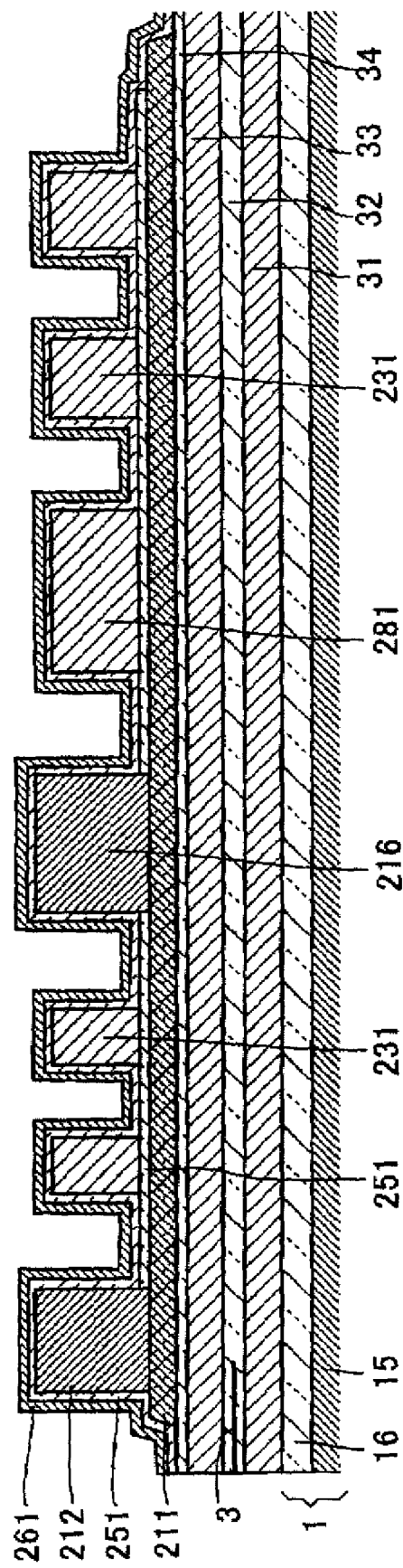
FIG. 39 is a diagram showing a process of manufacturing a thin film magnetic head having the electromagnetic converter portion shown in FIGS. 9 and 10.

<Process Leading to a State of FIG. 39>

In the process leading to the state of FIG. 39, processes illustrated in FIGS. 13 to 15 of embodiment 1 are performed to obtain substantially the same structure as in FIG. 15, and then the following processes are performed.

First, the photoresist film RS2 is removed and then, an insulating film 252 of about 0.1 to 0.15 μm in thickness is deposited on the surfaces and side surfaces of the insulating film 251, the first coil 231, the second pole piece 212 and the back gap piece 216. In case of forming the insulating film 252 as an $Al_2O_3$ film, it is possible to adopt an alumina-CVD film forming method in which $Al(CH_3)_3$ and $AlCl_3$ are sprayed in an alternate and intermittent way at a temperature of 100° C. or more under a low-pressure atmosphere of $H_2O$, $N_2$, $N_2O$ or $H_2O_2$.

Next, a seed film 261 is deposited 0.05 to 0.1 μin thickness on the surface of the insulating film 252 by Cu-CVD. The seed film 261 is obtained by sputtering Cu to form a thickness of, for example, 50 nm and applying CVD thereon to form a Cu film of, for example, 50 nm in thickness. This method provides film-forming with an excellent step coverage in a small area.

Figure 40:
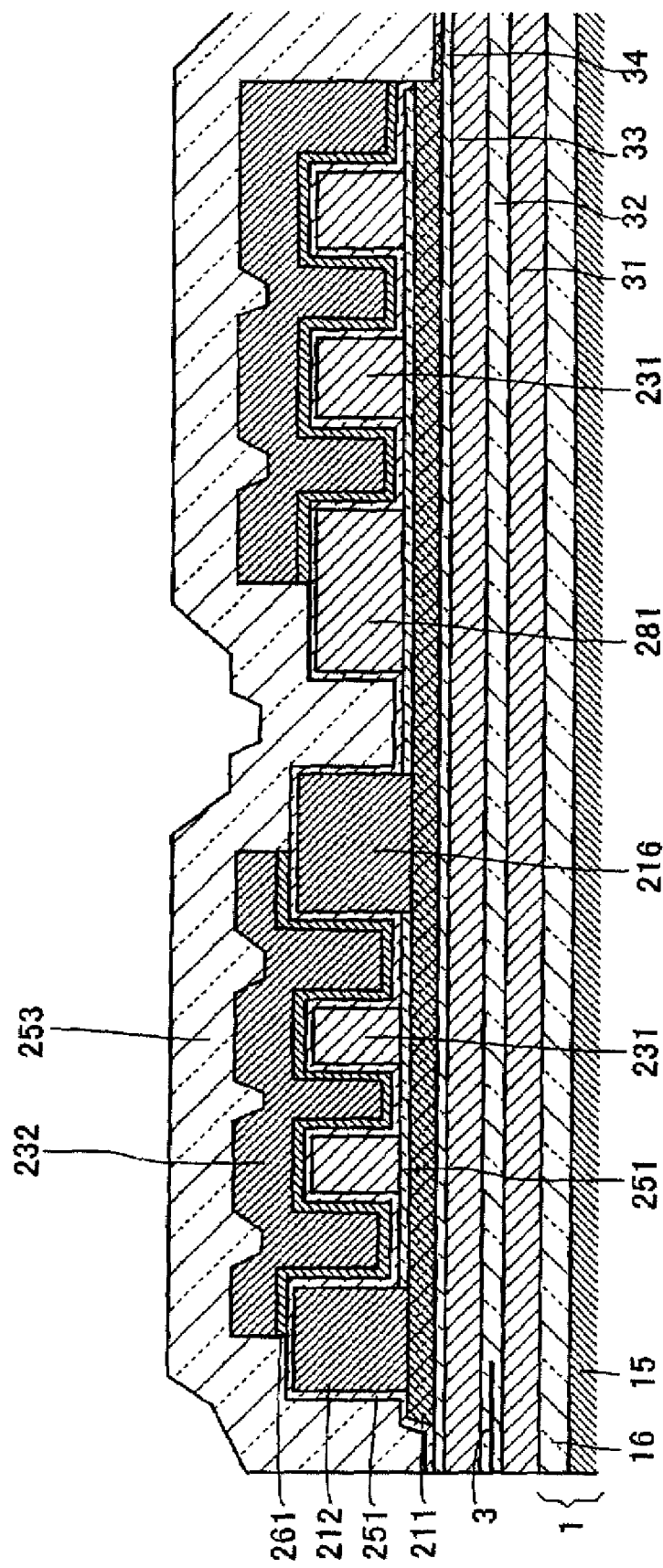
FIG. 40 is a diagram showing a process after the process shown in FIG. 39.

<Process Leading to a State of FIG. 40>

Next, a plating film 232 to be the second coil is formed, for example, 3 to 4μm in thickness on the seed film 261. The plating film 232, which comprises Cu as its main constituent, is selectively formed in the vicinity of the first coil 231. Then, the outside portion of the seed film 261, which is outside the plating film 232, is removed by wet etching with dilute hydrochloric acid, dilute sulfuric acid, copper sulfate or the like, or by dry etching such as ion milling. Then, an insulating film 253 of alumina or the like is formed, for example, 3 to 5 μm in thickness thereon.

Figure 41:
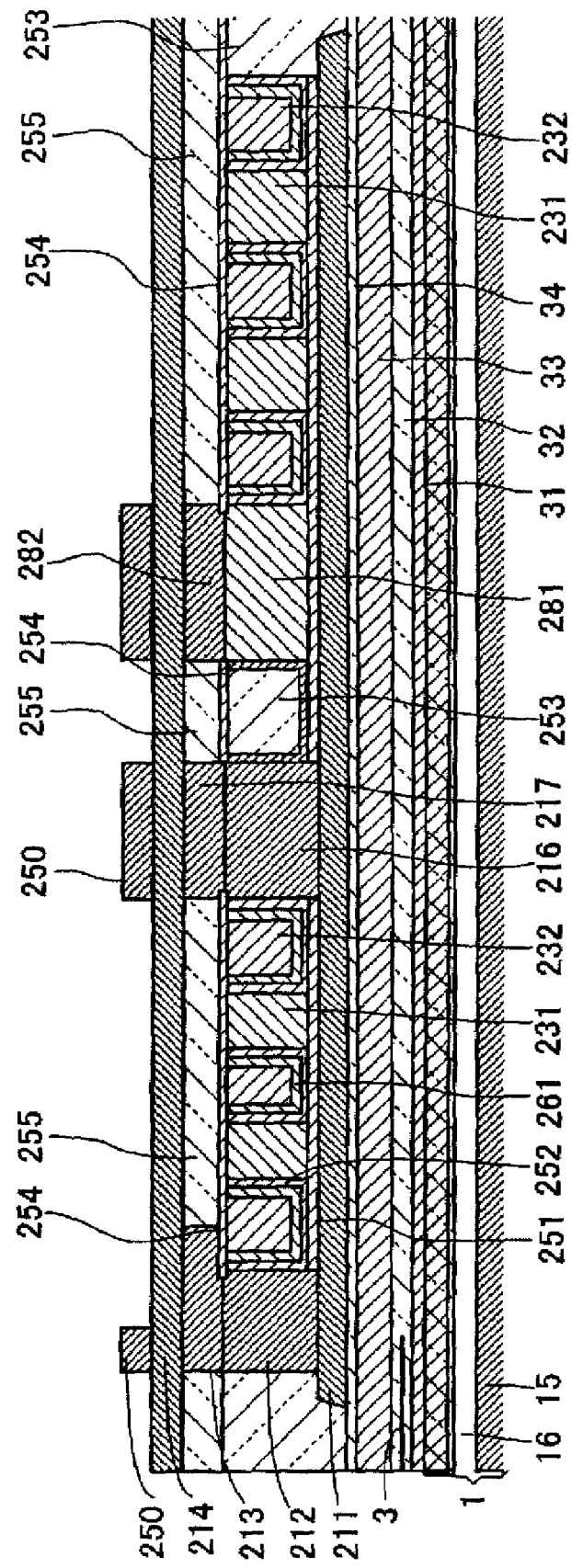
FIG. 41 is a diagram showing a process after the process shown in FIG. 40.

<Process Leading to a State of FIG. 41>

Next, processes illustrated in FIGS. 19 to 21 of embodiment 1 are performed to obtain substantially the same structure as in FIG. 21, and then the following processes are performed.

As shown in FIG. 41, a magnetic film 214 to be the fourth pole piece 214 (see FIG. 3) is sputter-formed, for example, 0.5 to 1 μm in thickness on the polished surfaces of the insulating film 255, the third pole piece 213 and the back gap piece 217. The magnetic film 214 can be made of CoFeN (2.4 T), FeAlN, FeN, FeCo or FeZrN. In the embodiment, the magnetic film 214 is made of CoFeN (2.4 T). Furthermore, pattern-plating films 250 of NiFe, CoNiFe or the like are formed on the surface of the magnetic film 214 by a frame-plating method. The pattern-plating films 250 are formed right above the back gap pieces 216 and 217 and right above the third pole piece 213.

Figure 42:
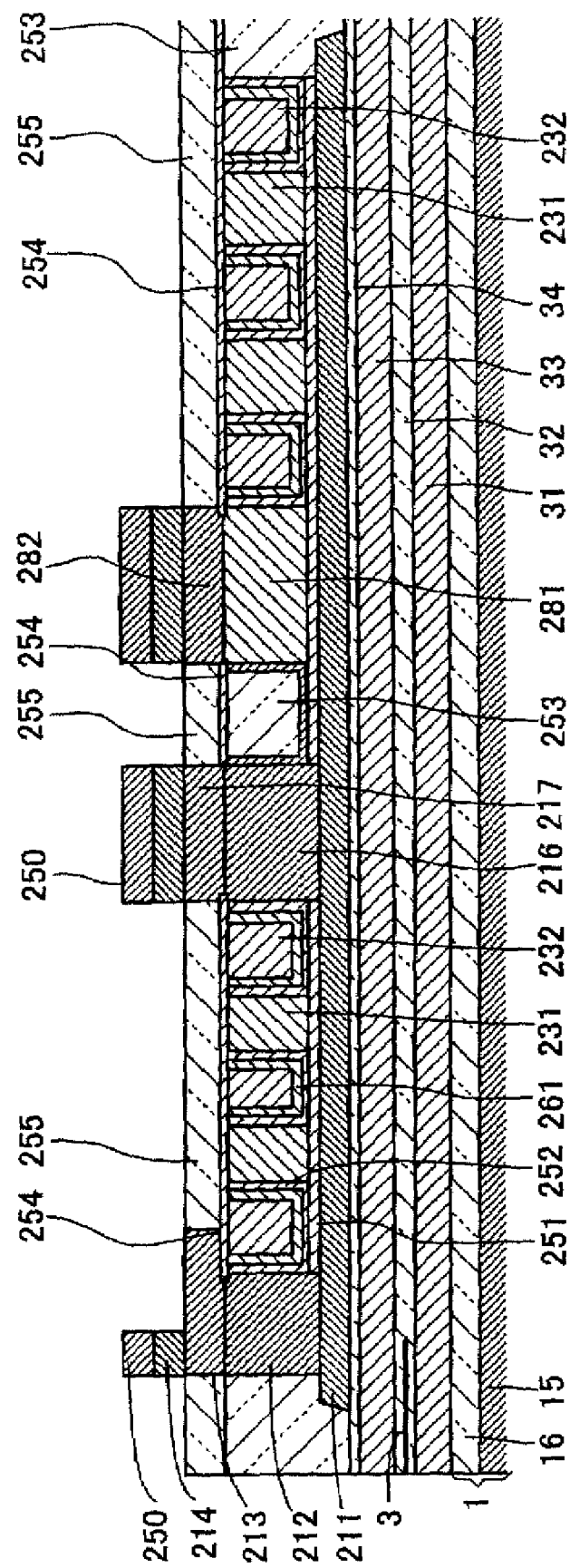
FIG. 42 is a diagram showing a process after the process shown in FIG. 41.

<Process Leading to a State of FIG. 42>

Next, as shown in FIG. 42, the magnetic film 214 is etched by RIE and ion beam, using the pattern-plating films 250 as a mask. This etching process can be performed in the same way as the process of etching the second magnetic film 221, and can provide the same advantages as it.

In this way, the forth pole piece 214 is formed at a distance from the coil. Consequently, the throat height can be determined by the forth pole piece 214 in an accurate process, in which the height distance can be adjusted to any appropriate value, for example, 0.1 to 0.5 μm or 0.2 to 0.7 μm. As a result, a write head with a quick rise of a write current and excellent over-write characteristics is obtained.

The smaller the distance between the ABS and the coil edge is, the smaller the yoke length in the magnetic head is achieved. However, in the smaller distance, steep inclination is necessary to determine the throat height. As a result, there is a possibility of flux-saturation areas and flux leakages in the steep inclination portion, which hinders sufficient over-write characteristic.

In the present invention, the throat height is determined by the second pole piece 212, the third pole piece 213 having a wide equal to or less than the second pole piece 212, and the fourth pole piece 214 having a wide less than the third pole piece 213, in relation to the distance from the ABS to the coil. Consequently, the step differences on the second to fourth pole pieces 212 to 214 are small in flux passage for writing data into medium, and there are no steep step differences. As a result, there is no possibility of halfway leakage even in case of sufficient magnetic flux. Consequently, the problems are solved in that a magnetic record might be given to a track adjacent to the appropriate track, magnetic records on a track adjacent to the appropriate track might be erased, or the like.

<Process Leading to States of FIGS. 43 to 46>

Figure 43:
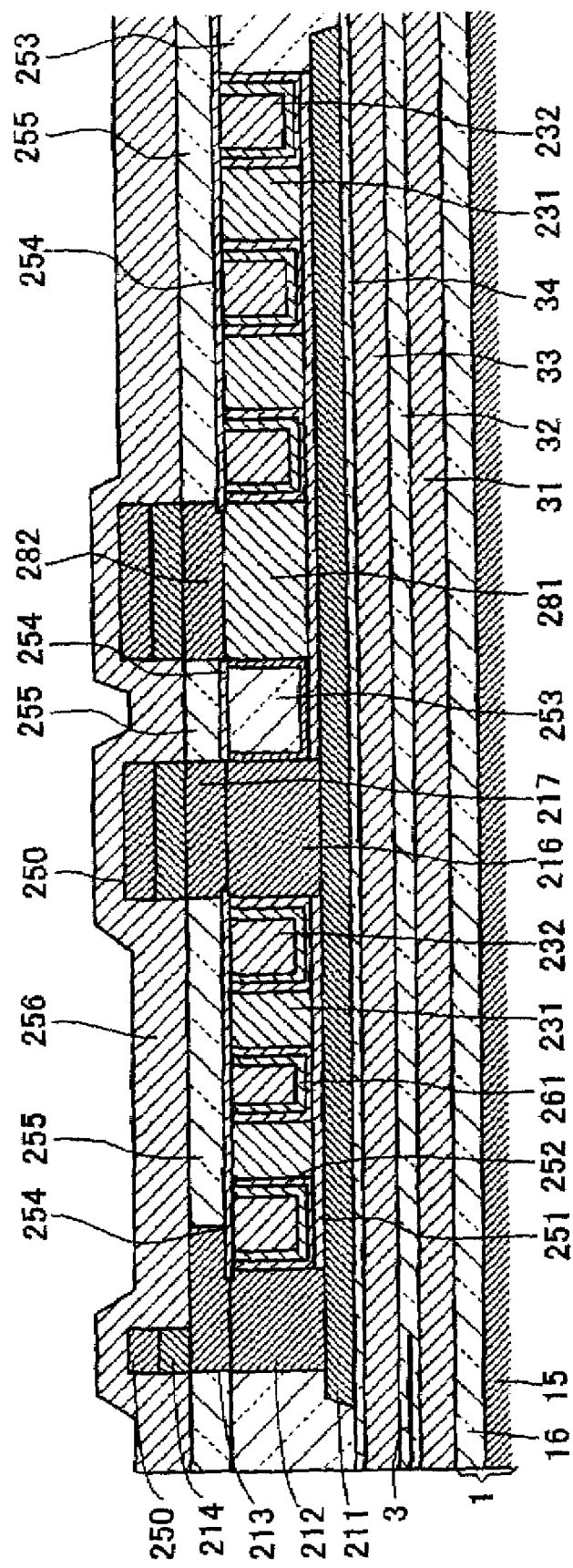
FIG. 43 is a diagram showing a process after the process shown in FIG. 42.
Figure 44:
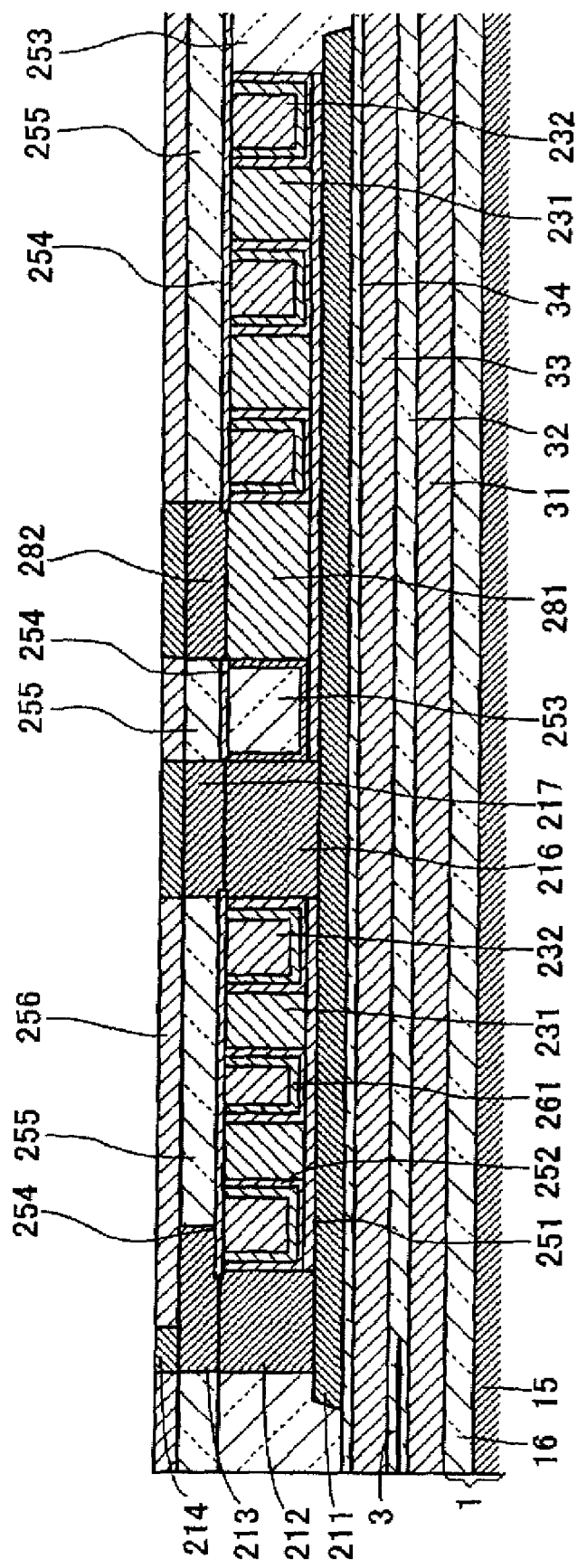
FIG. 44 is a diagram showing a process after the process shown in FIG. 43.

Next, as shown in FIG. 43, an insulating film 256 of alumina or the like is sputter-formed and then, as shown in FIG. 44, the insulating film 256 is polished and flattened by CMP. Then, a gap film 24 is formed 0.06 to 0.1 μm in thickness on the flattened surface obtained by CMP. The gap film 24 is made of, for example, non-magnetic metal material such as Ru, and can be formed by sputtering or the like.

Next, a second magnetic film 221 to be an upper pole piece is formed by sputtering, on the surface of the gap film 24 and the flattened surface. The second magnetic film 221 is made of an HiBs material. Specifically in the embodiment, the second magnetic film is made of CoFeN (2.4 T), which is selected from HiBs materials such as FeAlN, FeN, CoFe, CoFeN and FeZrN. The second magnetic film 221, which is to be used as a seed film in the subsequent plating process for forming a third magnetic film thereon, is formed, for example, 0.8 to 1.5 μm in thickness.

Next, the third magnetic film 222 is formed by a frame-plating method, using the second magnetic film 221 as a seed film. The third magnetic film 222 is made of NiFe (composition ratio, 55:45), CoNiFe (composition ratio, approximately 67:15:18, 1.9 T to 2.1 T), CoFe (composition ratio, 40:60, 2.3 T) or the like. The third magnetic film 222 is 3.0 to 3.5 μm in thickness.

Figure 46:
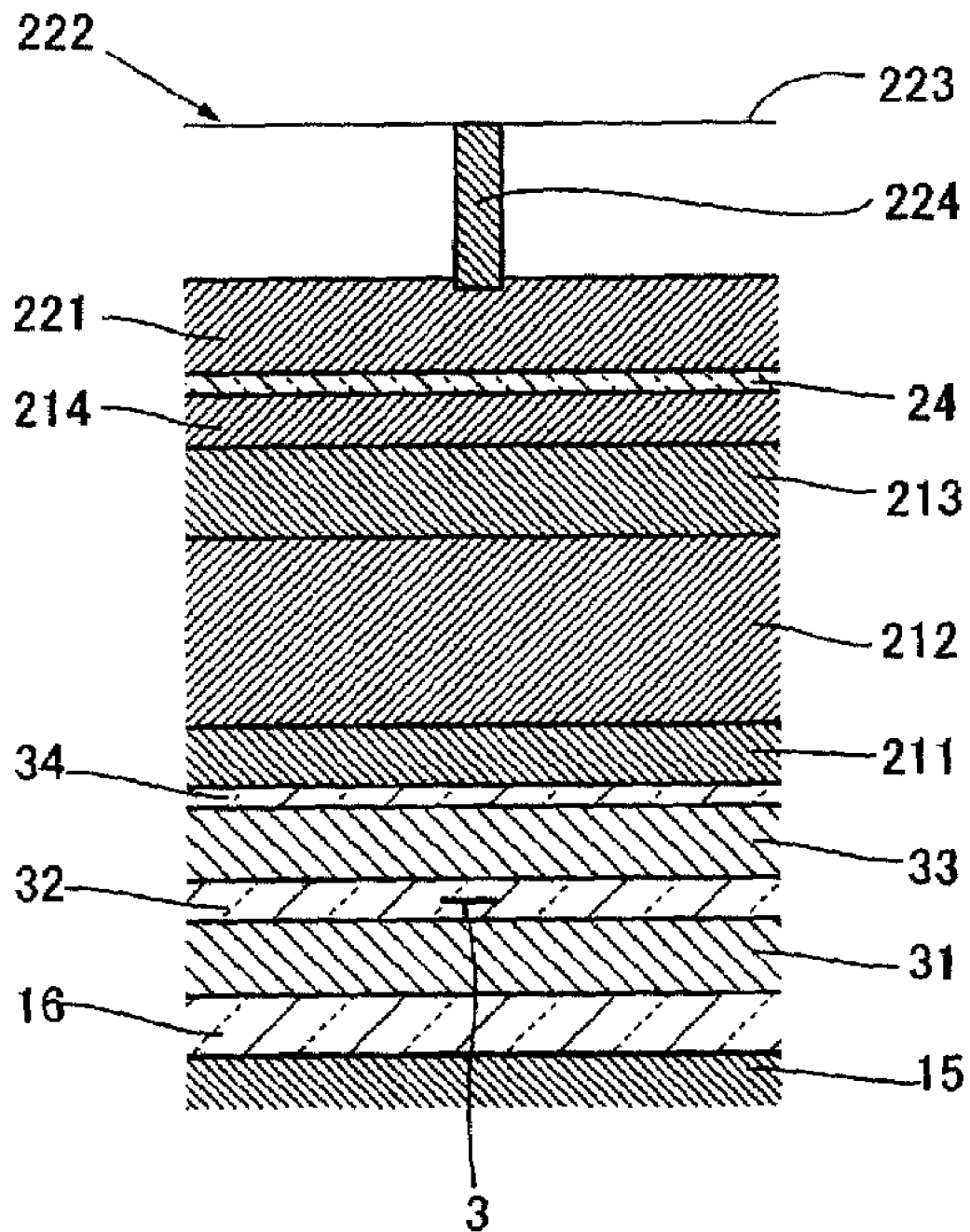
FIG. 46 is a view of the process shown in FIG. 45, seen from the ABS side.

The third magnetic film 222 also is formed so as to have a wide portion 223 and a narrow portion 224 as shown in FIG. 46. The narrow portion 224 is, in the embodiment, formed 0.1 to 0.2 μm in width. The wide portion 223 forms the second yoke portion and the narrow portion 224 forms the second pole portion.

Figure 45:
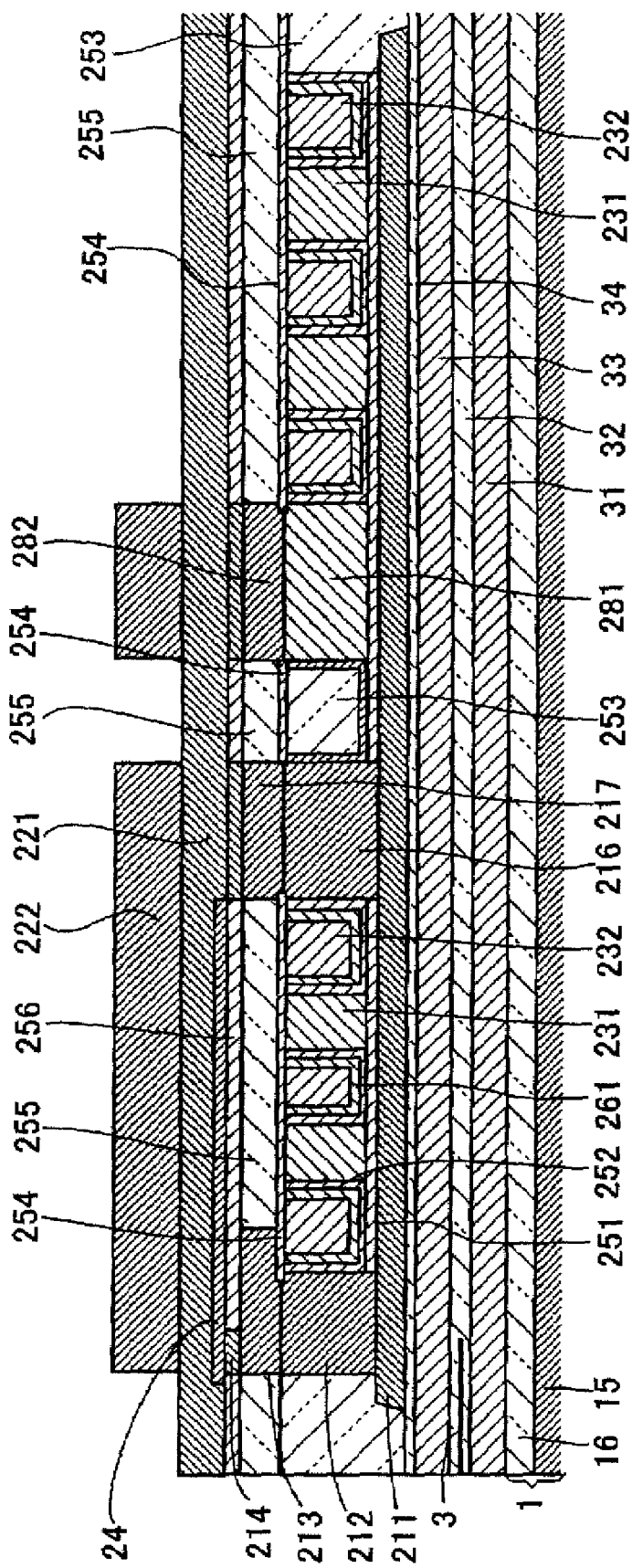
FIG. 45 is a diagram showing a process after the process shown in FIG. 44.

FIGS. 45 shows a state in which the third magnetic film 222 has been formed.

Figure 47:
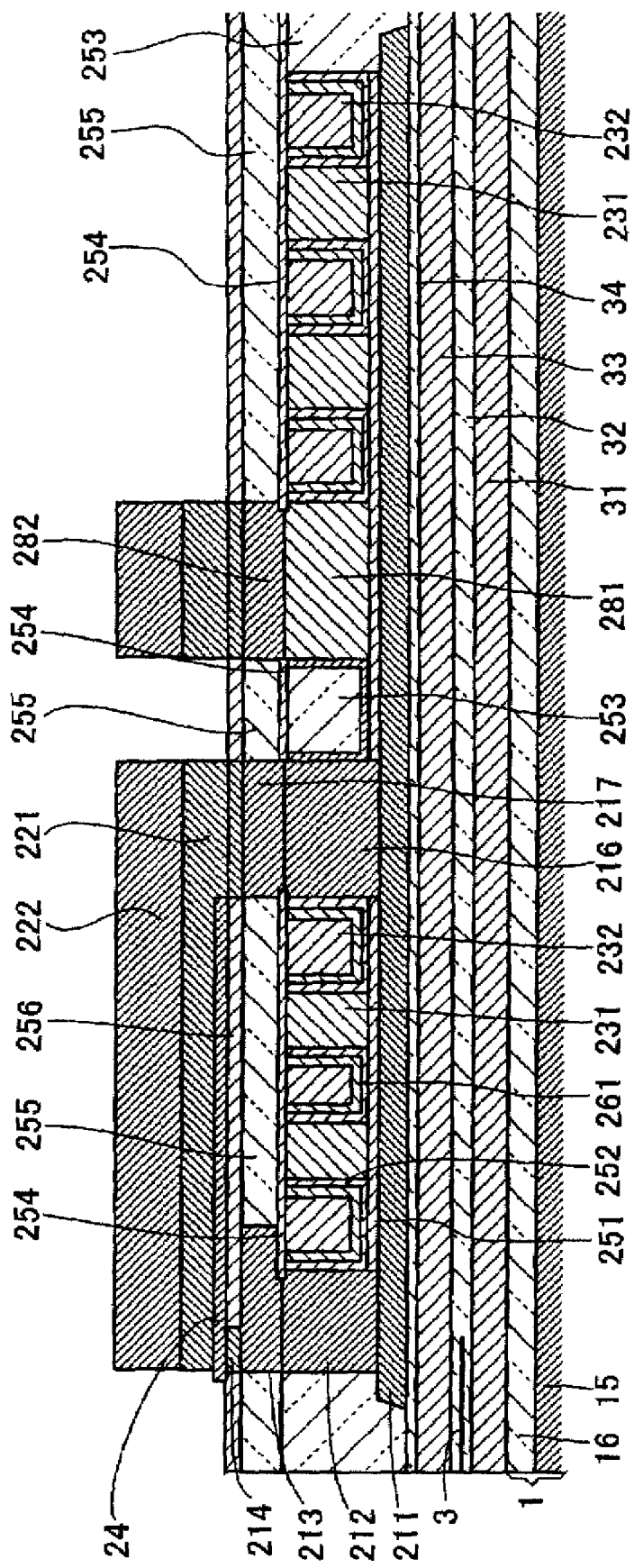
FIG. 47 is a diagram showing a process after the process shown in FIGS. 45 and 46.
Figure 48:
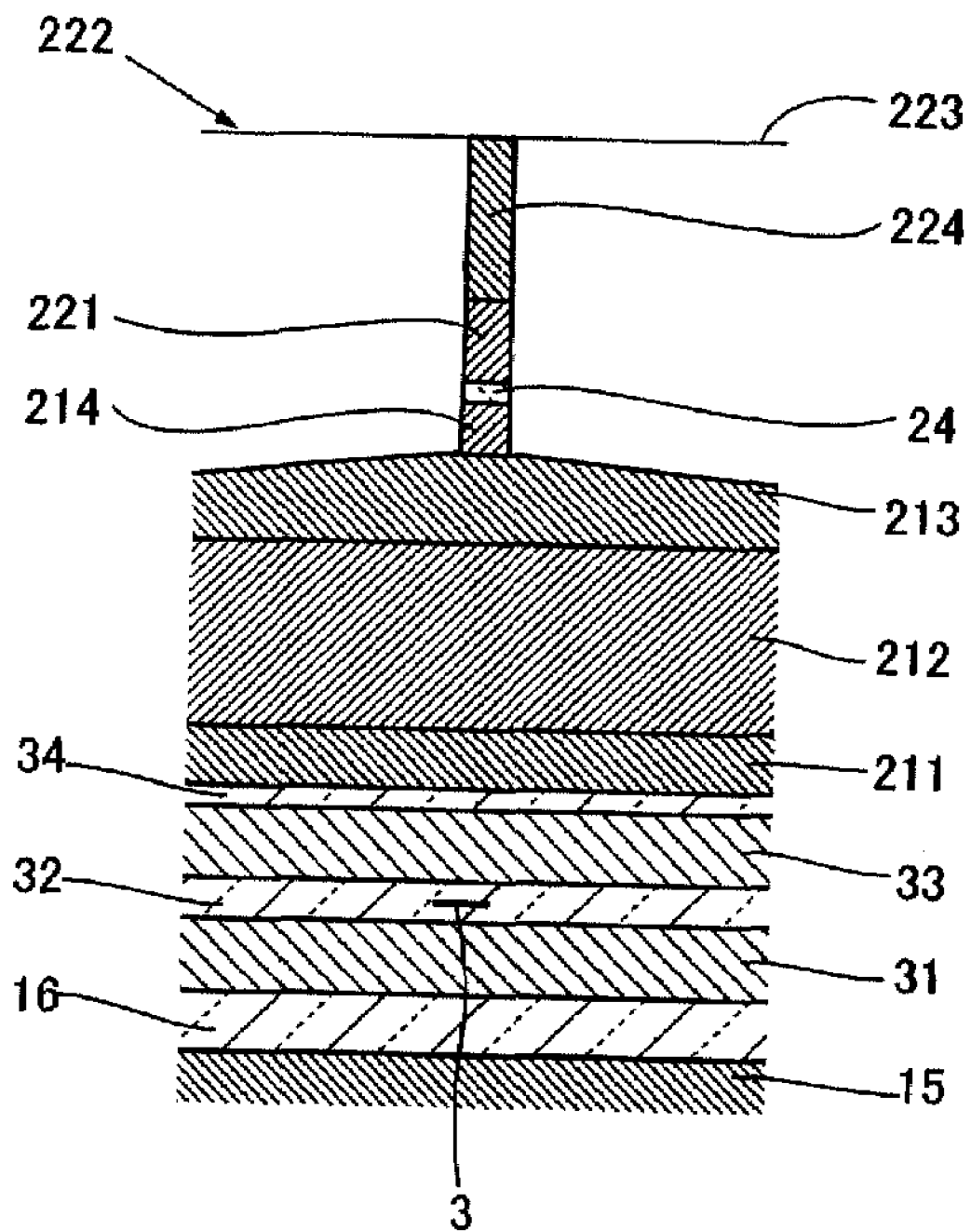
FIG. 48 is a view of the process shown in FIG. 47, seen from the ABS side.

<Process Leading to a State of FIGS. 47 and 48>

Next, the second magnetic film 221 is etched by ion milling, using the third magnetic film 222 as a mask layer. This etching process is performed by, for example, IBE, or RIE with halogen-based gas such as $Cl_2$ or $BCl_3+Cl_2$, using the plating mask layer.

In the embodiment, RIE is performed in the high temperature range of 50 to 300° C. and the second magnetic film 221 is etched to such some degree that the second magnetic film is reduced in width to 0.1 to 0.2 μm. The temperature in the RIE process is preferably 50° C. or higher. In the embodiment, the best etching result is achieved in the temperature range of 200 to 250° C.

Furthermore, introducing $O_2$ into $Cl_2$-based gas makes it possible to accurately control the etching profile and specifically, mixing $O_2$ with $BCl_3+Cl_2$ gas has the effect of completely removing a deposit of a residual boron gas. Consequently, accurate etching on the second magnetic film 221 is achieved.

Furthermore, in RIE with the etching gas such as $Cl_2$ gas, $BCl_3+Cl_2$ gas, or $O_2$-mixed $BCl_3+Cl_2+O_2$ gas, the etching rate of RIE is increased and so, the selection ratio with the third magnetic film 222, which is used as a mask layer, is increased by 30 to 50% or more.

After that, IBE is performed on the residual second magnetic film 221 to apply additional etching to it. The IBE on the residual second magnetic film 221 is performed in the angle range of, for example, 40 to 75 degrees.

After that, a photoresist mask layer for trimming is formed and then, the third pole piece 213 and the fourth pole piece 214 are trimmed. In the embodiment, the trimming process is performed in the angle range of 45 to 55 degrees and the depth range of 0.3 to 0.4 μm. And in order to obtain a further reduced width of 0.1 μm, an ion milling process is performed in the angle range of 40 to 75 degrees.

Last, over-coating material 271 (protective film) is formed on the upper surface, and the manufacturing process on the wafer is finished. Then, processes of cutting out a head from the wafer and polishing the head on the ABS side thereof are performed to obtain the state shown in FIG. 9.

(4) Embodiment 4

Embodiment 4 relates to a method for manufacturing a thin film magnetic head shown in FIGS. 11 and 12. FIGS. 49 to 52 show processes of this manufacturing method. It is notified in advance that processes illustrated in FIGS. 49 to 52 are also performed on a wafer.

Figure 49:
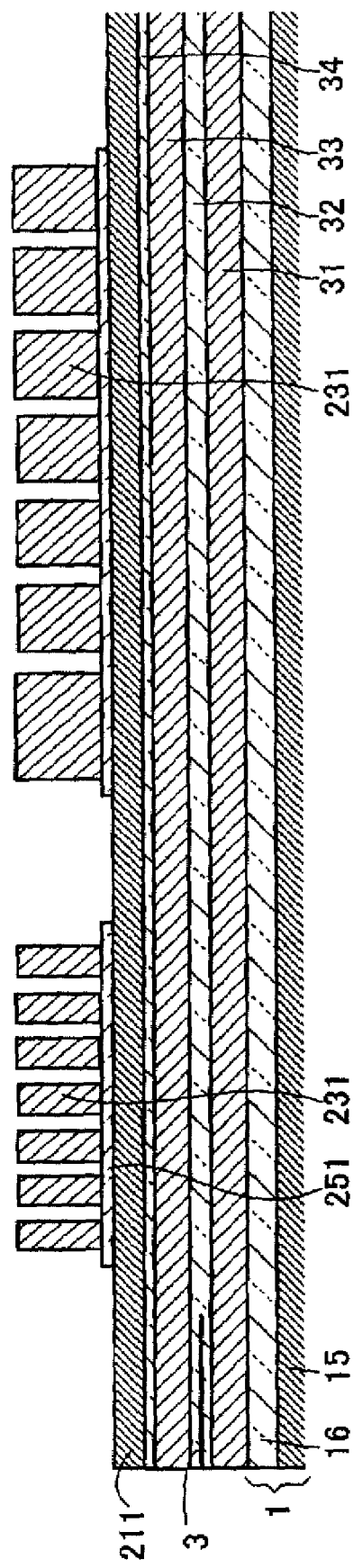
FIG. 49 is a diagram showing a process of manufacturing a thin film magnetic head having the electromagnetic converter portion shown in FIGS. 11 and 12.

<Process Leading to a State of FIG. 49>

On an insulating film 16 deposited on a base body 15 there are formed a first shield film 31, a read element 3, an insulating film 32, a second shield film 33, an insulating film 34 and a first magnetic film 211 by means of publicly known processes.

In a specific example, the insulating film 16 is an alumina film, formed in a thickness of, for example, about 3 μm. The first shield film 31 is made of a magnetic material such as NiFe and formed 2 to 3 μm in thickness by a frame-plating method.

The insulating film 32 is, in general, formed by the following two steps. In the first step, an alumina film of 3 to 4 μm in thickness is formed, and then the surface of the alumina film is flattened by CMP, and after that an GMR element 3 to be the read element is formed. In the second step, an alumina film covering the GMR element 3 is formed. The second shield film 33 is made of a magnetic material such as NiFe and formed 1.0 to 1.5 μm in thickness. The insulating film 34 is formed as an alumina film of 0.3 μm in thickness.

The first magnetic film 211 is made of CoNiFe (2.1 T) or CoFeN (2.4T) and formed 3.0 to 4.0 μm in thickness. On an end to be the first pole piece, of the first magnetic film 211, there may be formed a plating film of NiFe (80%:20%) or NiFe (45%:55%), or a sputtering film of FeAlN, FeN, FeCo, CoFeN or FeZrN, which is formed 0.5 to 0.6 μm in thickness.

After that, an insulating film 251 is formed, for example, 0.2 μm in thickness on the flat surface of the first magnetic film 211 and openings in the insulating film 251 are selectively formed, and then a first coil 231 is formed on the insulating film 251.

Figure 50:
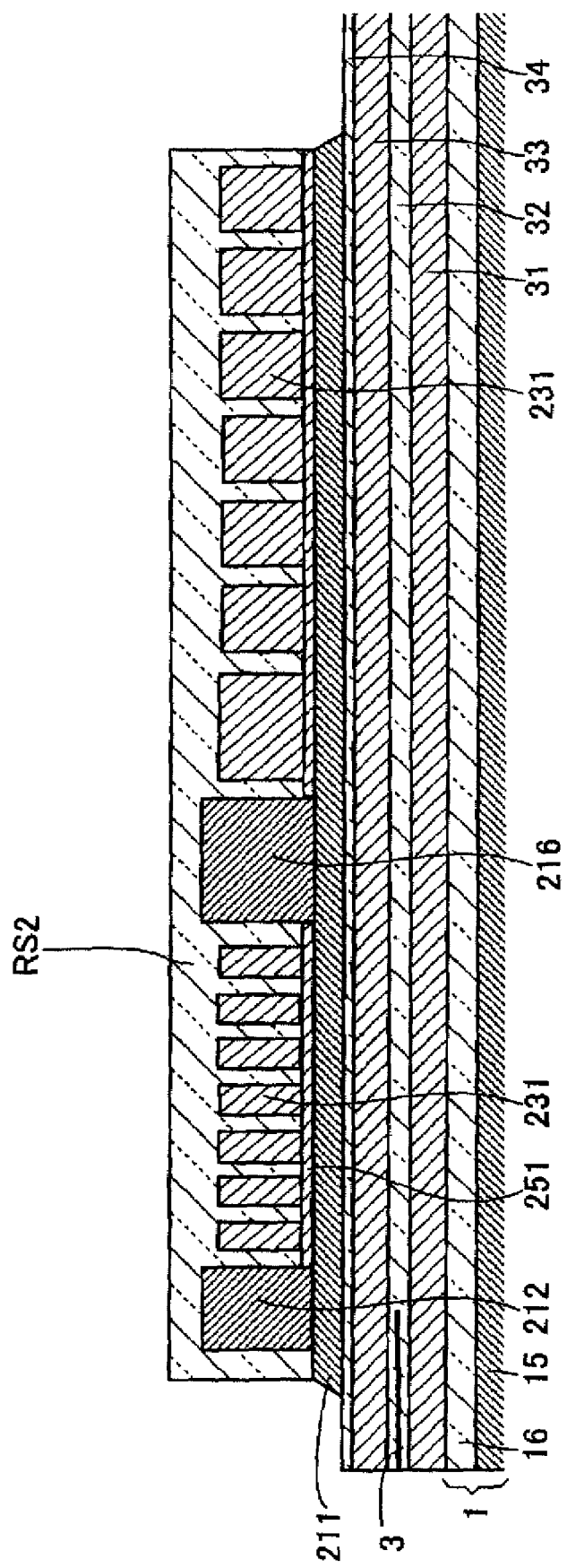
FIG. 50 is a diagram showing a process after the process shown in FIG. 49.

<Process Leading to a State of FIG. 50>

Next, a photolithography process for forming a second pole piece 212 and a back gap piece 216 is performed so that a resist frame for forming the second pole piece 212 and the back gap piece 216 is formed.

Next, a selective plating process is performed so that the second pole piece 212 and the back gap piece 216 are grown on the first magnetic film 211, and then the resist frame is removed by means of chemical etching or the like. Consequently, as shown in FIG. 50, the second pole piece 212 and the back gap piece 216 are formed with a space between them on one surface of the first magnetic film 211. The second pole piece 212 and the back gap piece 216 are made of, for example, CoNiFe (composition ratio, approximately 67:15: 18, 1.8 to 1.9 T) or CoFe (composition ratio, approximately 60:40, 2.4 T) and formed 3.5 μm in thickness.

After that, a photoresist film RS2 covering the first coil 231, the pole piece 212 and the back gap piece 216 is formed. Then, a dry-etching such as reactive ion etching (hereinafter, referred to as RIE) or ion beam etching (hereinafter, referred to as IBE) is applied onto the first magnetic film 211, using the photoresist film RS2 as a mask, so as to pattern the first magnetic film 211.

Figure 51:
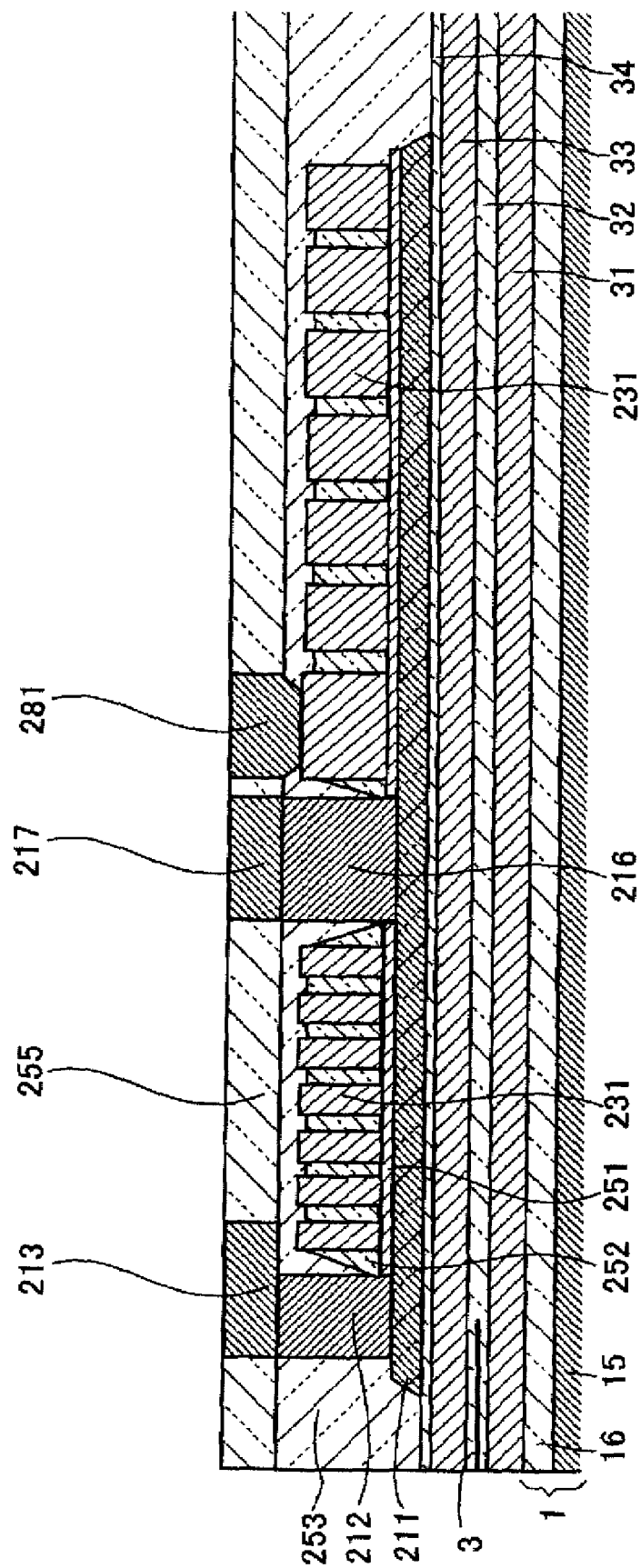
FIG. 51 is a diagram showing a process after the process shown in FIG. 50.

<Process Leading to a State of FIG. 51>

Next, a photolithography process is applied onto the photoresist film RS2 so that an insulating film 252 of photoresist, which is to be a spacer, is formed between coilturns of the first coil 231, and then an insulating film 253 of alumina is formed on the insulating film 252 so as to cover the first coil 231 and the periphery thereof. Then, CMP is applied to flatten the insulating film 253 and the second pole piece 212.

Next, a sputtering film of CoFeN or CoFe, which is a HiBs material, or a plating film of CoNiFe or CoFe (2.3 T) is selectively formed to be the third pole piece 213 on the flattened upper surface. In case of a sputtering film, the third pole piece is formed by depositing a photoresist mask on the sputtering film and applying IBE onto the sputtering film. In case of a plating film, the third pole piece is formed by a pattern of the photoresist mask. The third pole piece may be formed by depositing a mask of a plating layer on the sputtering film and applying IBE onto the sputtering film, which is made of a HiBs material.

As a result, the third pole piece 213 is formed in a prescribed major length. In the embodiment, the third pole piece 213 is a magnetic film of CoFeN or CoFe.

The third pole piece 213 extends so that the far end thereof in relation to the ABS is at a longer distance from the ABS than that of the second pole piece 212. Specifically, the third pole piece 213 extends above the first coil 231, insulated from the first coil 231 by the insulating film 254. More specifically, the third pole piece 213 includes an extending portion that extends so as to cover the upper surface of the second pole piece 212 and one surface of the coil facing the second pole portion P2 (namely, the upper surface of the coil).

Next, as shown in FIG. 51, a back gap piece 217 is formed on the back gap piece 216 and a connecting conductor 281 is formed on the coil in the rear of the back gap piece 217. Then, an insulating film 255 of alumina is formed, for example, 1 to 3 μm in thickness on the remaining parts of the flattened surface. After that, CMP is applied to flatten the third pole piece 213, the back gap piece 217, the connecting conductor 281 and the insulating film 255.

Figure 52:
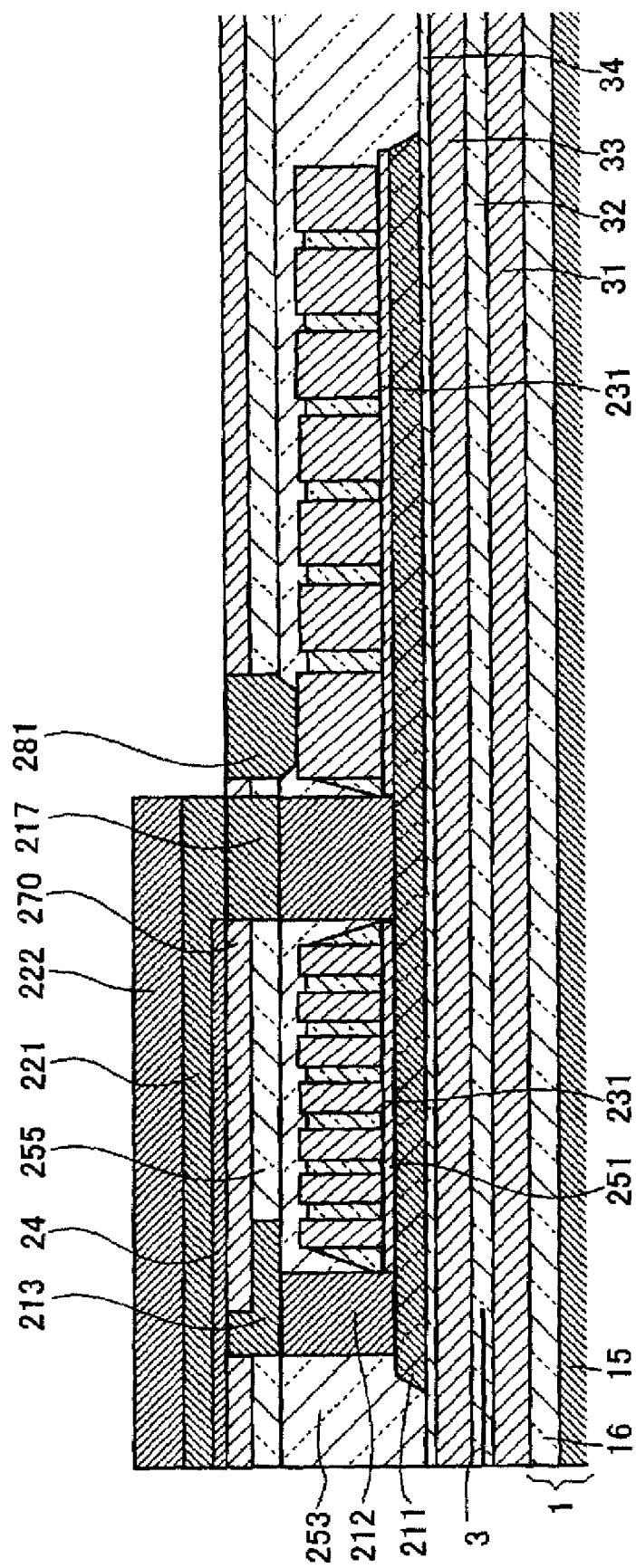
FIG. 52 is a diagram showing a process after the process shown in FIG. 51.

<Process Leading to a State of FIG. 52>

Next, a resist mask (not shown) is formed on at least the third pole piece 213. In the embodiment, since the third pole piece 213 is made to determine the throat height, the resist mask is formed shorter than the second pole piece 212. Then, IBE is applied onto the third pole piece 213 with the resist mask so that the third pole piece is etched, for example, 0.2 to 0.3 μm in depth. As a result, the residual upper portion of the third pole piece 213, which has not been etched, has a length less than the above-mentioned major length and determines the throat height.

The third pole piece 213 has substantially an L-shape in side view as shown in FIG. 52. Consequently, an extending portion in the first pole portion P1 that extends so as to cover the upper surface of the coil are at some levels in the height of the third pole piece 213.

After that, an insulating film 270 of $Al_2O_3$ is self-aligned and deposited by sputtering with the resist mask. The insulating film 270 is 0.3 to 0.4 μm in thickness. And, the resist mask shall be T-shaped so that the resist mask is suitable to be lifted off.

Next, the resist mask is lifted off and then, the exposed surface of the third pole piece 213, and the surface of the insulating film 270 are polished and flattened by CMP with a slight degree. The degree of the CMP, in the embodiment, is as slight as 0.01 μm in film thickness.

After that, a gap film 24 is deposited 0.07 to 0.1 μm in thickness on the flattened surface obtained by the CMP. The gap film 24 is made of a non-magnetic metal material such as Ru, NiCu or Ta, or an insulating material such as $SiO_2$ or $Al_2O_3$ and is formed by sputtering or the like.

Next, a second magnetic film 221 to be an upper pole piece is formed by sputtering, on the surface of the gap film 24 and the flattened surface. The second magnetic film 221 is made of an HiBs material. Specifically in the embodiment, the second magnetic film is made of CoFeN (2.4 T), which is selected from HiBs materials such as FeAlN, FeN, CoFe, CoFeN and FeZrN. The second magnetic film 221, which is used as a seed film in the subsequent plating process for forming a third magnetic film thereon, is formed, for example, 0.8 to 1.5 μm in thickness.

Next, the third magnetic film 222 is formed by a frame-plating method with photoresist, using the second magnetic film 221 as a seed film. The third magnetic film 222 is made of NiFe (composition ratio, 55:45), CoNiFe (composition ratio, approximately 67:15:18, 1.9 T to 2.1 T), CoFe (composition ratio, 40:60, 2.3 T) or the like. The third magnetic film 222 is 3.0 to 3.5 μm in thickness.

Next, the second magnetic film 221 is etched, using the third magnetic film 222 as a mask layer. This etching process is performed by, for example, IBE, or RIE with halogen-based gas such as $Cl_2$ or $BCl_3+Cl_2$, using the plating mask layer.

In the embodiment, RIE is performed in the high temperature range of 50 to 300° C. and the second magnetic film 221 is etched to such some degree that the second magnetic film is reduced in width to 0.1 to 0.2 μ. The temperature in the RIE process is preferably 50° C. or higher. In the embodiment, the best etching result is achieved in the temperature range of 200 to 250° C.

Furthermore, introducing $O_2$ into $Cl_2$-based gas makes it possible to accurately control the etching profile and specifically, mixing $O_2$ with $BCl_3+Cl_2$ gas has the effect of completely removing a deposit of a residual boron gas. Consequently, accurate etching on the second magnetic film 221 is achieved.

Furthermore, in RIE with the etching gas such as $Cl_2$ gas, $BCl_3+Cl_2$ gas, or $O_2$-mixed $BCl_3+Cl_2+O_2$ gas, the etching rate of RIE is increased and so, the selection ratio with the third magnetic film 222, which is used as a mask layer, is increased by 30 to 50% or more.

After that, IBE is performed on the residual second magnetic film 221 to apply additional etching to it. The IBE on the residual second magnetic film 221 is performed in the angle range of, for example, 40 to 75 degrees.

After that, a photoresist mask layer for trimming is formed and then, the third pole piece 213 and the fourth pole piece 214 are trimmed. In the embodiment, the trimming process is performed in the angle range of 45 to 55 degrees and the depth range of 0.3 to 0.4 μm. And in order to obtain a further reduced width of 0.1 μm, an ion milling process is performed in the angle range of 40 to 75 degrees.

Last, over-coating material 271 (protective film) is formed on the upper surface, and the manufacturing process on the wafer is finished. Then, processes of cutting out a head from the wafer and polishing the head on the ABS side thereof are performed to obtain the state shown in FIGS. 10 and 11.

3. Magnetic Head Device and a Magnetic Recording/reproducing Apparatus

Figure 53:
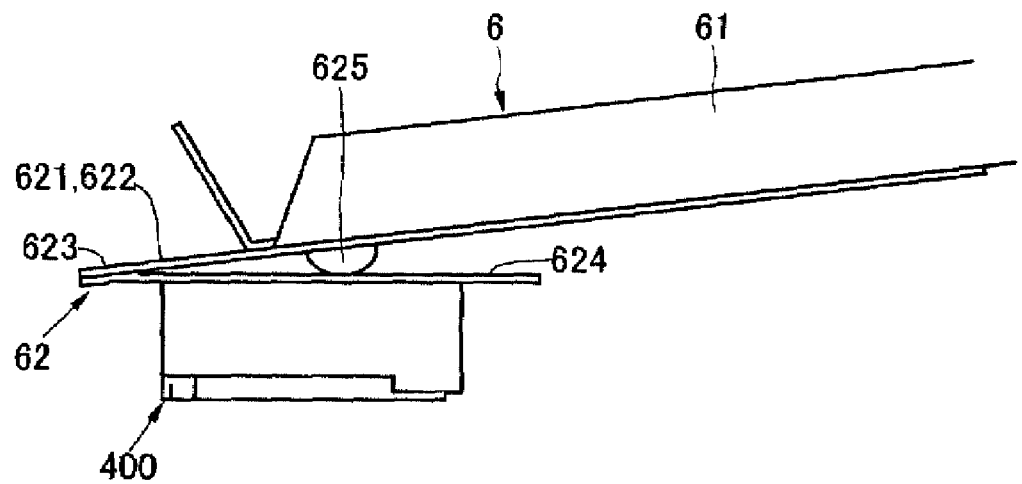
FIG. 53 is a front view of a magnetic head device having a thin film magnetic head according to the present invention.
Figure 54:
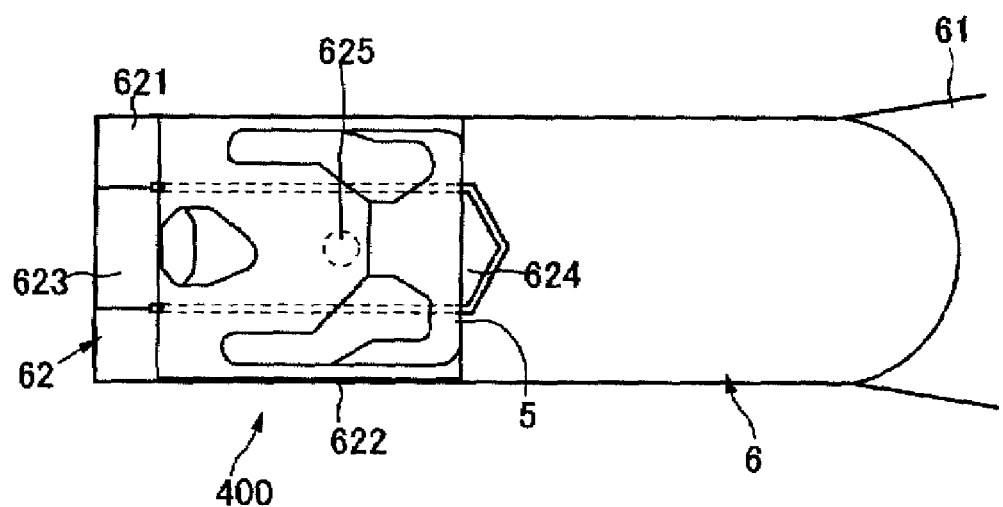
FIG. 54 is a view of the magnetic head device shown in FIG. 53, seen from the bottom side (ABS side)

The present invention also discloses a magnetic head device and a magnetic recording/reproducing apparatus. Referring to FIGS. 53 and 54, a magnetic head device according to the present invention comprises a thin film magnetic head 400 shown in FIGS. 1 to 12 and a head supporting device 6. The structure of the head supporting device 6 is as follows: a flexible member 62 made of a metal sheet is attached to a free end of a supporting member 61 made of a metal sheet, which the supporting member has at one end in the longitudinal direction thereof; and the thin film magnetic head 400 is attached to the lower surface of the flexible member 62.

Specifically, the flexible member 62 comprises: two outer frame portions 621 and 622 extending nearly in parallel with the longitudinal axial line of the supporting member 61; a lateral frame 623 for connecting the outer frame portions 621 and 622 at the end which is distant from the supporting member 61; and a tongue-shaped piece 624 extending nearly from the middle part of the lateral frame 623 nearly in parallel with the outer frame portions 621 and 622 and having a free end at the tip. One end of the flexible member 62 opposite to the lateral frame 623 is joined to the vicinity of the free end of the supporting member 61 by means of welding or the like.

The lower face of the supporting member 61 is provided with a loading projection 625 in the shape of a hemisphere, for example. This loading projection 625 transmits load from the free end of the supporting member 61 to the tongue-shaped piece 624.

The thin film magnetic head 400 is joined to the lower surface of the tongue-shaped piece 624 by means of adhesion or the like. The thin film magnetic head 400 is supported so as to allow pitching and rolling actions.

A head supporting device to which the present invention is applied is not limited to the above-described embodiment. The present invention can also be applied to head supporting devices which have been proposed up to now or will be proposed in the future. For example, the present invention can be applied to a head supporting device obtained by integrating the supporting member 61 and the tongue-shaped piece 624 by a flexible high-molecular wiring sheet such as a TAB tape (TAB: tape automated bonding), and a head supporting device having a publicly known conventional gimbals structure.

Figure 55:
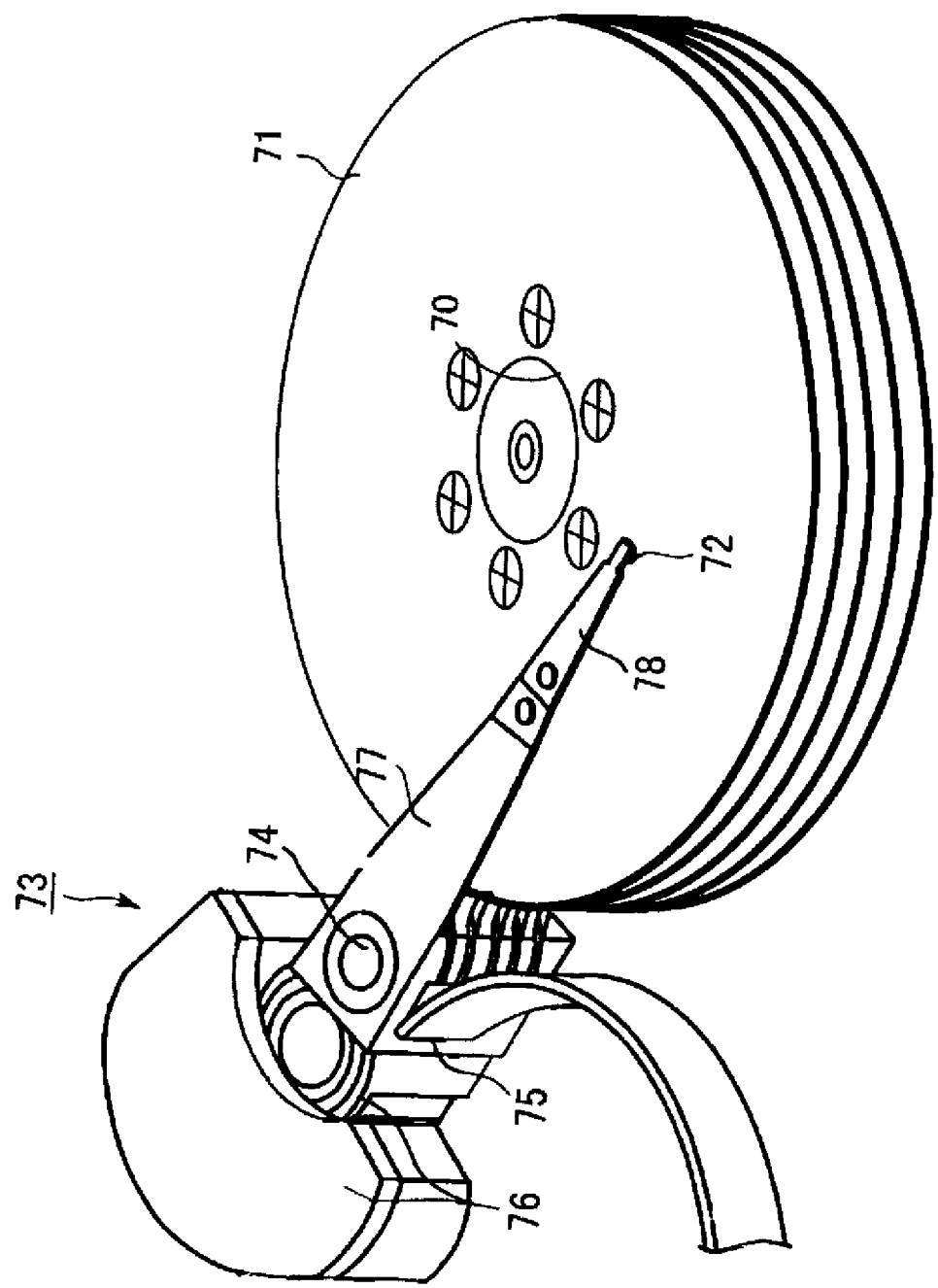
FIG. 55 is a perspective view roughly showing a magnetic recording/reproducing apparatus having a magnetic head device comprising a thin film magnetic head according to the present invention and a magnetic recording medium combined with one another.

Next, referring to FIG. 55, a magnetic recording/reproducing apparatus according to the present invention comprises a magnetic disk 71 provided so as to be capable of turning around an axis 70, a thin film magnetic head 72 for recording and reproducing information on the magnetic disk 71 and an assembly carriage device 73 for positioning the thin film magnetic head 72 on a track of the magnetic disk 71.

The assembly carriage device 73 comprises a carriage 75 capable of turning around an axis 74 and an actuator 76 composed of, for example, a voice coil motor (VCM) for turning this carriage 75, as main components.

The base portion of a plurality of driving arms 77 stacked in the axial direction of the axis 74 is attached to the carriage 75, and a head suspension assembly 78 with a thin film magnetic head 72 is fixedly joined to the tip of each driving arm 77. Each head suspension assembly 78 is joined to the tip of a driving arm 77 so that a thin film magnetic head 72 on the tip of the head suspension assembly 78 faces the surface of each magnetic disk 71.

The driving arm 77, head suspension assembly 78 and thin film magnetic head 72 form the magnetic head device described with reference to FIGS. 53 and 54. The thin film magnetic head 72 has the structure shown in FIGS. 1 to 12. Thus, the magnetic recording/reproducing apparatus shown in FIG. 55 exhibits the action and effect described with reference to FIGS. 1 to 12.

Although the contents of the present invention have been concretely described above with reference to the preferred embodiments, it is obvious that people in this field can take various variations on the basis of the basic technical idea and teachings of the present invention.

What is claimed is:

1. A method for manufacturing a thin film magnetic head with a write element, the method comprising:
   connecting a first yoke portion and a second yoke portion to each other by a back gap portion;
   disposing a first pole portion and a second pole portion in a medium-facing surface side of the first yoke portion and the second yoke portion respectively;
   forming a coil surrounding in a spiral form the back gap portion above the first yoke portion;

forming a part of which the first pole portion is composed of so that said part extends to cover the upper surface of the coil;

forming a gap film on the first pole portion, wherein the gap film is disposed between the first pole portion and the second pole portion and includes a non-magnetic metal film or an inorganic insulating film that extends from the medium-facing surface side and covers one surface of the coil facing the second pole portion; and trimming the first pole portion so as to have a width fitting the second pole portion.

2. The manufacturing method of claim 1, wherein:
the step of trimming the first pole portion has a trimming depth that reaches an extending portion of a material, which extends so as to cover the upper surface of the coil.

3. The manufacturing method of claim 1, further comprising:
forming the first pole portion, which includes
forming a first pole piece at an end of a first magnetic film supporting the coil;
forming a second pole piece on the medium-facing surface side of the coil after forming the coil; and
forming a third pole piece that extends so as to cover the upper surface of the second pole piece and the upper surface of the coil.

4. The manufacturing method of claim 3, wherein the forming the first pole portion further comprises:
forming a fourth pole piece on the upper surface of the third pole piece; and
forming the fourth pole piece comprises:
forming the fourth pole piece in a prescribed major length, and forming a short portion of the fourth pole piece, which has a length less than the prescribed major length and determines a throat height.

5. The manufacturing method of claim 3, wherein:
forming the first pole portion further comprises the step of forming a fourth pole piece on the upper surface of the third pole piece; and
the fourth pole piece is formed in a prescribed major length throughout its thickness and the major length is less than the length of the third pole piece, so that the fourth pole piece determines a throat height.

6. The manufacturing method of claim 3, wherein forming the third pole piece comprises:
forming the third pole piece in a prescribed major length, and;
forming a short portion of the third pole piece, which has a length less than the prescribed major length and determines a throat height.

7. The manufacturing method of claim 3, further comprising a step of:
forming an insulating film between the upper surface of the coil and an extending portion of the third pole piece that extends so as to cover the upper surface of the coil, after forming the second pole piece and before forming the third pole piece.

* * * * *